United States Patent
Sun et al.

(10) Patent No.: US 11,350,452 B2
(45) Date of Patent: May 31, 2022

(54) MULTIPLE COMPONENT WAVEFORM GENERATION FOR PER SUBBAND LISTEN BEFORE TALK

(71) Applicant: QUALCOMM Incorporated, San Diego, CA (US)

(72) Inventors: Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 16/745,293

(22) Filed: Jan. 16, 2020

(65) Prior Publication Data

US 2020/0236710 A1 Jul. 23, 2020

Related U.S. Application Data

(60) Provisional application No. 62/794,480, filed on Jan. 18, 2019.

(51) Int. Cl.
*H04W 74/08* (2009.01)
*H04W 72/04* (2009.01)
(Continued)

(52) U.S. Cl.
CPC ....... *H04W 74/0808* (2013.01); *H04L 5/0016* (2013.01); *H04L 27/0004* (2013.01); *H04L 27/2601* (2013.01); *H04W 72/04* (2013.01)

(58) Field of Classification Search
CPC .............. H04L 27/2601; H04L 5/0016; H04L 27/0004
See application file for complete search history.

(56) References Cited

U.S. PATENT DOCUMENTS 5,583,887 A * 12/1996 Murata .............. H03H 17/0657
375/229
9,780,860 B1 * 10/2017 Sung .................... H04B 7/0617
(Continued)

FOREIGN PATENT DOCUMENTS

WO WO-2018083868 A1 5/2018

OTHER PUBLICATIONS

International Search Report and Written Opinion—PCT/US2020/014127—ISAEPO—dated Jun. 29, 2020.
(Continued)

*Primary Examiner* — Raj Jain
(74) *Attorney, Agent, or Firm* — Holland & Hart LLP

(57) ABSTRACT

A transmitting device (e.g., a base station, a user equipment (UE)) may pre-generate waveform components, for a transmission to be sent subsequent to a listen before talk (LBT) procedure, based on a waveform generation capability of the transmitting device (e.g., based on their memory storage capability, their ability to combine waveform components in the time domain following a per subband LBT procedure, etc.). Further, certain behavior or rules (e.g., which waveform components are generated, how many subbands are included in a waveform component, etc.) may be expected by both a base station and a UE depending on the waveform generation capability of the transmitting device and the resource allocation. Additionally, resource block group (RBG) configurations (e.g., RBG definitions) for improved resource allocation are also described. A bases station may indicate one or more guard band boundaries to a UE to indicate such RBG configurations that account for guard bands.

30 Claims, 23 Drawing Sheets

(51) Int. Cl.
    *H04L 27/00*     (2006.01)
    *H04L 5/00*     (2006.01)
    *H04L 27/26*     (2006.01)

(56) References Cited

U.S. PATENT DOCUMENTS

| | | | |
|---|---|---|---|
| 2008/0207119 A1* | 8/2008 | Chang | H04L 27/0008 455/17 |
| 2013/0114436 A1 | 5/2013 | Dural et al. | |
| 2018/0124790 A1 | 5/2018 | Yerramalli | |
| 2019/0253298 A1* | 8/2019 | Moroga | H04L 27/2636 |
| 2019/0312763 A1* | 10/2019 | Lei | H04L 5/003 |
| 2020/0236710 A1* | 7/2020 | Sun | H04W 74/0808 |
| 2020/0389916 A1* | 12/2020 | Salem | H04W 72/042 |

OTHER PUBLICATIONS

Partial International Search Report—PCT/US2020/014127—ISA/EPO—dated Apr. 17, 2020.

* cited by examiner

MULTIPLE COMPONENT WAVEFORM GENERATION FOR PER SUBBAND LISTEN BEFORE TALK

CROSS REFERENCE

The present application for patent claims the benefit of U.S. Provisional Patent Application No. 62/794,480 by SUN et al., entitled "MULTIPLE COMPONENT WAVEFORM GENERATION FOR PER SUBBAND LISTEN BEFORE TALK," filed Jan. 18, 2019, assigned to the assignee hereof, and expressly incorporated by reference herein.

BACKGROUND

The present disclosure relates generally to wireless communications, and more specifically to multiple component waveform generation for per subband listen before talk (LBT).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a base station may transmit a grant (e.g., a resource allocation in downlink control information (DCI)) that identifies or otherwise conveys an indication of resources for a corresponding downlink or uplink data transmission. For example, a UE may receive a downlink grant and may identify resources for a corresponding downlink data transmission, and may use such information to receive the downlink data transmission. In some wireless communications systems, when the wireless network operates in a licensed radio frequency spectrum band, base stations and the UEs may be able to coordinate such that channel access (e.g., and corresponding uplink and downlink data transmissions) are scheduled. However, when the wireless network is operating in an unlicensed or shared radio frequency spectrum band, conventional techniques may be inadequate due to the requirement that an LBT procedure must be performed on the channel before access.

SUMMARY

A transmitting device (e.g., a base station or a user equipment (UE)) may pre-generate waveform components for a transmission to be sent subsequent to a listen before talk (LBT) procedure. The transmitting device may pre-generate the waveform components based on a waveform generation capability of the transmitting device. The waveform generation capability may represent a number, such as a maximum number, of waveform components that the UE is capable of generating (e.g., pre-generating) in advance of the LBT procedure (e.g., based on the memory storage capability, ability to combine waveform components in the time domain following a per subband LBT procedure, etc., for the transmitting device). For example, in some cases, a transmitting device may prioritize generating waveform components for subbands. For instance, the transmitting device may prioritize generating waveform components for subbands over or instead of generating waveform components for guard bands associated with and between subbands. In some examples, a transmitting device may generate a waveform component that spans two or more subbands, including any guard bands between the included subbands (e.g., and may ultimately generate a transmission waveform, subsequent to the LBT, including the waveform component only if each subband associated with the waveform component passes the LBT procedure). Using the various techniques described, a device may prepare waveform components (e.g., in accordance with the device's waveform generation capabilities) prior to completion of a per subband LBT procedure. The device may then combine some or all of the pre-generated waveform components, based on the per subband results of the LBT procedure, for transmission during a first transmission time interval (TTI) following the LBT procedure. According to other aspects of the described techniques, the device may then generate a second waveform (e.g., including any guard band regions between two contiguous subbands that each passed the LBT procedure), and transmit the second waveform during a second TTI subsequent to the first TTI. In some cases, the second waveform for the second TTI may be generated during the first TTI.

Further, a certain behavior or rule may be expected by both a base station and a UE depending on the waveform generation capability of a transmitting device and the operating bandwidth (e.g., the configured wideband component carrier (CC)). Given the waveform generation capability of a transmitting device, the resource allocation, and the rule or expected behavior, a base station and a UE (e.g., a transmitter and a receiver) may come up with the same set of assumptions or expectations regarding what waveform components will be prepared. As such, given the waveform generation capability of the transmitting device, the receiving device may assume (e.g., identify) one or more waveform hypotheses (e.g., for a blind detection procedure). The receiving device (e.g., a base station in the case that the transmitting device is a UE) may use subband component detection to see which subbands passed the LBT procedure from the transmitting device's perspective, and may then use the rule (e.g., the expected waveform component generation behavior) and waveform hypotheses to determine which waveform components are combined by the transmitting device. In some cases, such rules may be configurable by a base station (e.g., via radio resource control (RRC) signaling) or may be predetermined or preconfigured by the network.

Additionally, resource block group (RBG) configurations (e.g., RBG definitions) for improved resource allocation are also described. For example, when the wireless network is operating in an unlicensed or shared radio frequency spectrum band, a base station may indicate one or more guard band boundaries to indicate RBG configurations that account for such guard bands. A UE may receive a guard band boundary indication from a base station, and may identify an RBG configuration based on the indication. As such, a base station may be able to allocate resources (e.g., of the one or more subbands of a configured CC in shared spectrum) via downlink control information (DCI) and/or RRC signaling based on (e.g., taking into account) guard band regions present between subbands.

A method of wireless communication at a UE is described. The method may include receiving a resource allocation for an uplink transmission by the UE, the resource allocation indicating a set of subbands of a radio frequency spectrum band, identifying a set of waveform components for the uplink transmission based on a waveform generation capability of the UE and the indicated set of subbands, performing a LBT procedure for the set of subbands, selecting, based on a result of the performed LBT procedure, one or more waveform components of the identified set of waveform components, and transmitting a first waveform including the selected one or more waveform components during a first TTI.

An apparatus for wireless communication at a UE is described. The apparatus may include a processor, memory coupled with the processor, and instructions stored in the memory. The instructions may be executable by the processor to cause the apparatus to receive a resource allocation for an uplink transmission by the UE, the resource allocation indicating a set of subbands of a radio frequency spectrum band, identify a set of waveform components for the uplink transmission based on a waveform generation capability of the UE and the indicated set of subbands, perform a LBT procedure for the set of subbands, select, based on a result of the performed LBT procedure, one or more waveform components of the identified set of waveform components, and transmit a first waveform including the selected one or more waveform components during a first TTI.

Another apparatus for wireless communication at a UE is described. The apparatus may include means for receiving a resource allocation for an uplink transmission by the UE, the resource allocation indicating a set of subbands of a radio frequency spectrum band, identifying a set of waveform components for the uplink transmission based on a waveform generation capability of the UE and the indicated set of subbands, performing a LBT procedure for the set of subbands, selecting, based on a result of the performed LBT procedure, one or more waveform components of the identified set of waveform components, and transmitting a first waveform including the selected one or more waveform components during a first TTI.

A non-transitory computer-readable medium storing code for wireless communication at a UE is described. The code may include instructions executable by a processor to receive a resource allocation for an uplink transmission by the UE, the resource allocation indicating a set of subbands of a radio frequency spectrum band, identify a set of waveform components for the uplink transmission based on a waveform generation capability of the UE and the indicated set of subbands, perform a LBT procedure for the set of subbands, select, based on a result of the performed LBT procedure, one or more waveform components of the identified set of waveform components, and transmit a first waveform including the selected one or more waveform components during a first TTI.

In some examples of the method, apparatuses, and non-transitory computer-readable medium described herein, the waveform generation capability represents at least a number of waveform components that the UE may be capable of generating. Some examples of the method, apparatuses, and non-transitory computer-readable medium described herein may further include operations, features, means, or instructions for transmitting, to the base station, a UE capability report indicating the waveform generation capability of the UE.

Some examples of the method, apparatuses, and non-transitory computer-readable medium described herein may further include operations, features, means, or instructions for determining, according to the waveform generation capability, the resource allocation for the uplink transmission, and a LBT requirement for the uplink transmission, a set of waveform components to pre-generate before the LBT procedure may be performed. In some examples of the method, apparatuses, and non-transitory computer-readable medium described herein, each waveform component of the set of waveform components corresponds to allocated resources of the resource allocation in a subband of the set of subbands, or allocated resources of the resource allocation in a guard band between two subbands of the set of subbands, or a combination thereof.

Some examples of the method, apparatuses, and non-transitory computer-readable medium described herein may further include operations, features, means, or instructions for identifying a set of subbands of the set of subbands that may be associated with a successful result of the performed LBT procedure, identifying the selected one or more waveform components based on the identified set of subbands, and combining the selected one or more waveform components, where the first waveform may be based on the combining. Some examples of the method, apparatuses, and non-transitory computer-readable medium described herein may further include operations, features, means, or instructions for including a waveform component corresponding to a resource in a guard band in one waveform component of the identified set of waveform components for the uplink transmission based on a first subband adjacent the guard band and a second subband adjacent the guard band being included in the one waveform component.

In some examples of the method, apparatuses, and non-transitory computer-readable medium described herein, the set of waveform components include a first waveform component, where the first waveform component includes two contiguous subbands of the set of subbands and a guard band between the two contiguous subbands. Some examples of the method, apparatuses, and non-transitory computer-readable medium described herein may further include operations, features, means, or instructions for determining that the two contiguous subbands may be associated with a successful result of the performed LBT procedure, where the selected one or more waveform components includes the first waveform component based on the determining.

In some examples of the method, apparatuses, and non-transitory computer-readable medium described herein, the set of waveform components include, for each subband of the set of subbands, a waveform component corresponding to the subband and exclusive of a guard band. In some examples of the method, apparatuses, and non-transitory computer-readable medium described herein, identifying the set of waveform components for the uplink transmission may include operations, features, means, or instructions for identifying data for the uplink transmission from an upper layer, encoding the identified data, modulating the encoded data to generate the set of waveform components, and storing the generated set of waveform components in a memory of the UE prior to determining the result of the LBT procedure performed for the set of subbands.

In some examples of the method, apparatuses, and non-transitory computer-readable medium described herein, selecting the one or more waveform components of the identified set of waveform components may include operations, features, means, or instructions for identifying that the set of subbands pass the performed LBT procedure and selecting, for each subband of the set of subbands, a waveform component of the identified set of waveform components that corresponds to the subband.

In some examples of the method, apparatuses, and non-transitory computer-readable medium described herein, selecting the one or more waveform components of the identified set of waveform components may include operations, features, means, or instructions for identifying that a first subset of the set of subbands pass the LBT procedure and a second subset of the set of subbands fail the LBT procedure and selecting, for each subband of the first subset of the set of subbands that pass the listen before talk procedure, a waveform component of the identified set of waveform components that corresponds to the subband.

In some examples of the method, apparatuses, and non-transitory computer-readable medium described herein, selecting the one or more waveform components of the identified set of waveform components may include operations, features, means, or instructions for excluding, for each subband of the second subset of the set of subbands that fail the LBT procedure, a waveform component of the identified set of waveform components that corresponds to the subband and excluding, for each subband of the second subset of the set of subbands that fail the LBT procedure, a waveform component of the identified set of waveform components that corresponds to one or more guard bands adjacent to the subband.

In some examples of the method, apparatuses, and non-transitory computer-readable medium described herein, selecting the one or more waveform components of the identified set of waveform components may include operations, features, means, or instructions for selecting, for each set of adjacent subbands of the first subset of the set of subbands that pass the LBT procedure, a waveform component of the identified set of waveform components that corresponds to a guard band between the set of adjacent subbands.

A method of wireless communication at a base station is described. The method may include receiving a UE capability report indicating a waveform generation capability of the UE, transmitting a resource allocation indicating a set of subbands for an uplink transmission, identifying, based on the waveform generation capability of the UE and the transmitted resource allocation, a set of uplink waveform hypotheses, and receiving the uplink transmission based on at least one of the identified set of uplink waveform hypotheses.

An apparatus for wireless communication at a base station is described. The apparatus may include a processor, memory coupled with the processor, and instructions stored in the memory. The instructions may be executable by the processor to cause the apparatus to receive a UE capability report indicating a waveform generation capability of the UE, transmit a resource allocation indicating a set of subbands for an uplink transmission, identify, based on the waveform generation capability of the UE and the transmitted resource allocation, a set of uplink waveform hypotheses, and receive the uplink transmission based on at least one of the identified set of uplink waveform hypotheses.

Another apparatus for wireless communication at a base station is described. The apparatus may include means for receiving a UE capability report indicating a waveform generation capability of the UE, transmitting a resource allocation indicating a set of subbands for an uplink transmission, identifying, based on the waveform generation capability of the UE and the transmitted resource allocation, a set of uplink waveform hypotheses, and receiving the uplink transmission based on at least one of the identified set of uplink waveform hypotheses.

A non-transitory computer-readable medium storing code for wireless communication at a base station is described. The code may include instructions executable by a processor to receive a UE capability report indicating a waveform generation capability of the UE, transmit a resource allocation indicating a set of subbands for an uplink transmission, identify, based on the waveform generation capability of the UE and the transmitted resource allocation, a set of uplink waveform hypotheses, and receive the uplink transmission based on at least one of the identified set of uplink waveform hypotheses.

Some examples of the method, apparatuses, and non-transitory computer-readable medium described herein may further include operations, features, means, or instructions for dividing the set of subbands into one or more groups based on the waveform generation capability of the UE, where the set of uplink waveform hypotheses may be identified based on the one or more groups. Some examples of the method, apparatuses, and non-transitory computer-readable medium described herein may further include operations, features, means, or instructions for performing, on each subband of the set of subbands, a blind detection procedure on the subband, and identifying one or more guard bands for the uplink transmission based on the performed blind detection procedure and the set of uplink waveform hypotheses.

Some examples of the method, apparatuses, and non-transitory computer-readable medium described herein may further include operations, features, means, or instructions for receiving, from the UE, uplink control information indicating a set of subbands of the set of subbands, where the uplink transmission may be received based on the set of the set of subbands. In some examples of the method, apparatuses, and non-transitory computer-readable medium described herein, identifying the set of uplink waveform hypotheses may include operations, features, means, or instructions for identifying the set of uplink waveform hypotheses based on the waveform generation capability of the UE, the transmitted resource allocation, and a set of waveform component generation rules. Some examples of the method, apparatuses, and non-transitory computer-readable medium described herein may further include operations, features, means, or instructions for transmitting, to the UE, an indication of the waveform component generation rules.

A method of wireless communication at a base station is described. The method may include identifying a set of subbands for a downlink transmission, identifying a set of waveform components for the downlink transmission based on a waveform generation capability of the base station and the identified set of subbands, performing a LBT procedure for the set of subbands, selecting, based on a result of the performed LBT procedure, one or more waveform components of the identified set of waveform components, and transmitting a first waveform including the selected one or more waveform components during a first TTI.

An apparatus for wireless communication at a base station is described. The apparatus may include a processor, memory coupled with the processor, and instructions stored in the memory. The instructions may be executable by the processor to cause the apparatus to identify a set of subbands for a downlink transmission, identify a set of waveform components for the downlink transmission based on a waveform generation capability of the base station and the identified set of subbands, perform a LBT procedure for the set of subbands, select, based on a result of the performed LBT procedure, one or more waveform components of the identified set of waveform components, and transmit a first waveform including the selected one or more waveform components during a first TTI.

Another apparatus for wireless communication at a base station is described. The apparatus may include means for identifying a set of subbands for a downlink transmission, identifying a set of waveform components for the downlink transmission based on a waveform generation capability of the base station and the identified set of subbands, performing a LBT procedure for the set of subbands, selecting, based on a result of the performed LBT procedure, one or more waveform components of the identified set of waveform components, and transmitting a first waveform including the selected one or more waveform components during a first TTI.

A non-transitory computer-readable medium storing code for wireless communication at a base station is described. The code may include instructions executable by a processor to identify a set of subbands for a downlink transmission, identify a set of waveform components for the downlink transmission based on a waveform generation capability of the base station and the identified set of subbands, perform a LBT procedure for the set of subbands, select, based on a result of the performed LBT procedure, one or more waveform components of the identified set of waveform components, and transmit a first waveform including the selected one or more waveform components during a first TTI.

In some examples of the method, apparatuses, and non-transitory computer-readable medium described herein, the waveform generation capability represents at least a number of waveform components that the base station may be capable of generating. Some examples of the method, apparatuses, and non-transitory computer-readable medium described herein may further include operations, features, means, or instructions for determining, according to the waveform generation capability, a resource allocation for the downlink transmission, and a LBT requirement for the downlink transmission, a set of waveform components to pre-generate before the LBT procedure may be performed. In some examples of the method, apparatuses, and non-transitory computer-readable medium described herein, each waveform component of the set of waveform components corresponds to allocated resources of the resource allocation in a subband of the set of subbands, or allocated resources of the resource allocation in a guard band between two subbands of the set of subbands, or a combination thereof.

Some examples of the method, apparatuses, and non-transitory computer-readable medium described herein may further include operations, features, means, or instructions for identifying a set of subbands of the set of subbands that may be associated with a successful result of the performed LBT procedure, identifying the selected one or more waveform components based on the identified set of subbands, and combining the selected one or more waveform components, where the first waveform may be based on the combining.

Some examples of the method, apparatuses, and non-transitory computer-readable medium described herein may further include operations, features, means, or instructions for including a waveform component corresponding to a resource in a guard band in one waveform component of the identified set of waveform components for the downlink transmission based on a first subband adjacent the guard band and a second subband adjacent the guard band being included in the one waveform component. In some examples of the method, apparatuses, and non-transitory computer-readable medium described herein, the set of waveform components include a first waveform component, where the first waveform component includes two contiguous subbands of the set of subbands and a guard band between the two contiguous subbands.

Some examples of the method, apparatuses, and non-transitory computer-readable medium described herein may further include operations, features, means, or instructions for determining that the two contiguous subbands may be associated with a successful result of the performed LBT procedure, where the selected one or more waveform components includes the first waveform component based on the determining. In some examples of the method, apparatuses, and non-transitory computer-readable medium described herein, the set of waveform components include, for each subband of the set of subbands, a waveform component corresponding to the subband and exclusive of a guard band.

In some examples of the method, apparatuses, and non-transitory computer-readable medium described herein, identifying the set of waveform components for the downlink transmission may include operations, features, means, or instructions for identifying data for the uplink transmission from an upper layer, encoding the identified data, modulating the encoded data to generate the set of waveform components, and storing the generated set of waveform components in a memory of the base station prior to determining the result of the LBT procedure performed for the set of subbands.

A method of wireless communication at a UE is described. The method may include receiving an indication of one or more guard band boundaries for a set of subbands of a radio frequency spectrum band, determining a resource block group configuration based on the received indication of the one or more guard band boundaries, receiving a resource allocation for a downlink transmission, identifying, based on the received resource allocation, one or more resource block groups of the determined resource block group configuration, and receiving the downlink transmission on the identified one or more resource block groups.

An apparatus for wireless communication at a UE is described. The apparatus may include a processor, memory coupled with the processor, and instructions stored in the memory. The instructions may be executable by the processor to cause the apparatus to receive an indication of one or more guard band boundaries for a set of subbands of a radio frequency spectrum band, determine a resource block group configuration based on the received indication of the one or more guard band boundaries, receive a resource allocation for a downlink transmission, identify, based on the received resource allocation, one or more resource block groups of the determined resource block group configuration, and receive the downlink transmission on the identified one or more resource block groups.

Another apparatus for wireless communication at a UE is described. The apparatus may include means for receiving an indication of one or more guard band boundaries for a set of subbands of a radio frequency spectrum band, determining a resource block group configuration based on the received indication of the one or more guard band boundaries, receiving a resource allocation for a downlink transmission, identifying, based on the received resource allocation, one or more resource block groups of the determined resource block group configuration, and receiving the downlink transmission on the identified one or more resource block groups.

A non-transitory computer-readable medium storing code for wireless communication at a UE is described. The code may include instructions executable by a processor to receive an indication of one or more guard band boundaries for a set of subbands of a radio frequency spectrum band, determine a resource block group configuration based on the received indication of the one or more guard band boundaries, receive a resource allocation for a downlink transmission, identify, based on the received resource allocation, one or more resource block groups of the determined resource block group configuration, and receive the downlink transmission on the identified one or more resource block groups.

In some examples of the method, apparatuses, and non-transitory computer-readable medium described herein, determining the resource block group configuration may include operations, features, means, or instructions for identifying, based on the received indication of the one or more guard band boundaries, a resource block group of the identified one or more resource block groups associated with a guard band, and splitting the resource block group associated with the guardband boundary into a first resource block group including one or more resource blocks of the resource block group in a subband region and a second resource block group including one or more resource blocks of the resource block group in a guard band, where the determined resource block group configuration includes the first resource block group and the second resource block group. In some examples of the method, apparatuses, and non-transitory computer-readable medium described herein, a first bit in the resource allocation assigns the first resource block group and a second bit in the resource allocation assigns the second resource block group.

In some examples of the method, apparatuses, and non-transitory computer-readable medium described herein, determining the resource block group configuration may include operations, features, means, or instructions for identifying, based on the received indication of the one or more guard band boundaries, a resource block group of the identified one or more resource block groups associated with a guard band, reducing the size of the resource block group associated with the guard band boundary to include one or more resource blocks of the resource block group that may be in a subband region, and collecting one or more continuous resource blocks of the resource block group in a guard band into a second set of resource block groups using a same resource block group size with one bit in the resource allocation for each new resource block group in the second set of resource block groups.

In some examples of the method, apparatuses, and non-transitory computer-readable medium described herein, determining the resource block group configuration may include operations, features, means, or instructions for identifying, based on the identified indication for the one or more guard band boundaries, one or more resource blocks associated with a guard band, identifying one or more resource block groups including the one or more resource blocks, and dropping the identified one or more resource block groups, where the determined resource block group configuration excludes the dropped one or more resource block groups. In some examples of the method, apparatuses, and non-transitory computer-readable medium described herein, receiving the indication of the one or more guard band boundaries for the set of subbands may include operations, features, means, or instructions for receiving radio resource control signaling including the indication of the one or more guard band boundaries for the set of subbands.

A method of wireless communication at a base station is described. The method may include identifying a resource block group configuration based on one or more guard band boundaries for a set of subbands of a radio frequency spectrum band, transmitting a resource allocation to a UE, where the resource allocation indicates, based on the identified resource block group configuration, one or more resource block groups for a downlink transmission for the UE, and transmitting, to the UE, the downlink transmission on the indicated one or more resource block groups.

An apparatus for wireless communication at a base station is described. The apparatus may include a processor, memory coupled with the processor, and instructions stored in the memory. The instructions may be executable by the processor to cause the apparatus to identify a resource block group configuration based on one or more guard band boundaries for a set of subbands of a radio frequency spectrum band, transmit a resource allocation to a UE, where the resource allocation indicates, based on the identified resource block group configuration, one or more resource block groups for a downlink transmission for the UE, and transmit, to the UE, the downlink transmission on the indicated one or more resource block groups.

Another apparatus for wireless communication at a base station is described. The apparatus may include means for identifying a resource block group configuration based on one or more guard band boundaries for a set of subbands of a radio frequency spectrum band, transmitting a resource allocation to a UE, where the resource allocation indicates, based on the identified resource block group configuration, one or more resource block groups for a downlink transmission for the UE, and transmitting, to the UE, the downlink transmission on the indicated one or more resource block groups.

A non-transitory computer-readable medium storing code for wireless communication at a base station is described. The code may include instructions executable by a processor to identify a resource block group configuration based on one or more guard band boundaries for a set of subbands of a radio frequency spectrum band, transmit a resource allocation to a UE, where the resource allocation indicates, based on the identified resource block group configuration, one or more resource block groups for a downlink transmission for the UE, and transmit, to the UE, the downlink transmission on the indicated one or more resource block groups.

In some examples of the method, apparatuses, and non-transitory computer-readable medium described herein, a first bit in the resource allocation assigns the first resource block group and a second bit in the resource allocation assigns the second resource block group. Some examples of the method, apparatuses, and non-transitory computer-readable medium described herein may further include operations, features, means, or instructions for transmitting an indication of the one or more guard band boundaries for the set of subbands.

In some examples of the method, apparatuses, and non-transitory computer-readable medium described herein, transmitting the indication of the one or more guard band boundaries for the set of subbands may include operations, features, means, or instructions for transmitting, in radio resource control signaling, the indication of the one or more guard band boundaries for the set of subbands. In some examples of the method, apparatuses, and non-transitory computer-readable medium described herein, a length of the resource allocation may be based on the identified resource block group configuration.

A method of wireless communication at a UE is described. The method may include receiving an indication of a reserved resource set for one or more guard band boundaries for a set of subbands of a radio frequency spectrum band, receiving a resource allocation indicating a set of resource block groups to be used for a first downlink transmission, determining one or more resource block groups for the first downlink transmission based on the reserved resource set and the indicated set of resource block groups, and receiving, on the determined one or more resource block groups, the first downlink transmission during a TTI.

An apparatus for wireless communication at a UE is described. The apparatus may include a processor, memory coupled with the processor, and instructions stored in the memory. The instructions may be executable by the processor to cause the apparatus to receive an indication of a reserved resource set for one or more guard band boundaries for a set of subbands of a radio frequency spectrum band, receive a resource allocation indicating a set of resource block groups to be used for a first downlink transmission, determine one or more resource block groups for the first downlink transmission based on the reserved resource set and the indicated set of resource block groups, and receive, on the determined one or more resource block groups, the first downlink transmission during a TTI.

Another apparatus for wireless communication at a UE is described. The apparatus may include means for receiving an indication of a reserved resource set for one or more guard band boundaries for a set of subbands of a radio frequency spectrum band, receiving a resource allocation indicating a set of resource block groups to be used for a first downlink transmission, determining one or more resource block groups for the first downlink transmission based on the reserved resource set and the indicated set of resource block groups, and receiving, on the determined one or more resource block groups, the first downlink transmission during a TTI.

A non-transitory computer-readable medium storing code for wireless communication at a UE is described. The code may include instructions executable by a processor to receive an indication of a reserved resource set for one or more guard band boundaries for a set of subbands of a radio frequency spectrum band, receive a resource allocation indicating a set of resource block groups to be used for a first downlink transmission, determine one or more resource block groups for the first downlink transmission based on the reserved resource set and the indicated set of resource block groups, and receive, on the determined one or more resource block groups, the first downlink transmission during a TTI.

Some examples of the method, apparatuses, and non-transitory computer-readable medium described herein may further include operations, features, means, or instructions for receiving an indication that the reserved resource set may be unallocated to the UE during the TTI, where the one or more resource block groups for the downlink transmission may be determined based on the received indication that the reserved resource set may be unallocated.

Some examples of the method, apparatuses, and non-transitory computer-readable medium described herein may further include operations, features, means, or instructions for receiving an indication that the reserved resource set may be allocated to the UE during a TTI, where the one or more resource block groups for the downlink transmission may be determined based on the received indication that the reserved resource set may be allocated. In some examples of the method, apparatuses, and non-transitory computer-readable medium described herein, determining the one or more resource block groups for the first downlink transmission may include operations, features, means, or instructions for removing the reserved resource set from the indicated set of resource block groups.

A method of wireless communication at a base station is described. The method may include transmitting, to a UE, an indication of a reserved resource set for one or more guard band boundaries for a set of subbands of a radio frequency spectrum band, determining one or more resource block groups for a first downlink transmission for the UE, transmitting a resource allocation indicating a set of resource block groups to be used for the first downlink transmission, the resource allocation based on the indicated reserved resource set and the determined one or more resource block groups, and transmitting, on the determined one or more resource block groups, the first downlink transmission during a TTI.

An apparatus for wireless communication at a base station is described. The apparatus may include a processor, memory coupled with the processor, and instructions stored in the memory. The instructions may be executable by the processor to cause the apparatus to transmit, to a UE, an indication of a reserved resource set for one or more guard band boundaries for a set of subbands of a radio frequency spectrum band, determine one or more resource block groups for a first downlink transmission for the UE, transmit a resource allocation indicating a set of resource block groups to be used for the first downlink transmission, the resource allocation based on the indicated reserved resource set and the determined one or more resource block groups, and transmit, on the determined one or more resource block groups, the first downlink transmission during a TTI.

Another apparatus for wireless communication at a base station is described. The apparatus may include means for transmitting, to a UE, an indication of a reserved resource set for one or more guard band boundaries for a set of subbands of a radio frequency spectrum band, determining one or more resource block groups for a first downlink transmission for the UE, transmitting a resource allocation indicating a set of resource block groups to be used for the first downlink transmission, the resource allocation based on the indicated reserved resource set and the determined one or more resource block groups, and transmitting, on the determined one or more resource block groups, the first downlink transmission during a TTI.

A non-transitory computer-readable medium storing code for wireless communication at a base station is described. The code may include instructions executable by a processor to transmit, to a UE, an indication of a reserved resource set for one or more guard band boundaries for a set of subbands of a radio frequency spectrum band, determine one or more resource block groups for a first downlink transmission for the UE, transmit a resource allocation indicating a set of resource block groups to be used for the first downlink transmission, the resource allocation based on the indicated reserved resource set and the determined one or more resource block groups, and transmit, on the determined one or more resource block groups, the first downlink transmission during a TTI.

Some examples of the method, apparatuses, and non-transitory computer-readable medium described herein may further include operations, features, means, or instructions for transmitting an indication that the reserved resource set may be unallocated to the UE during the TTI.

Some examples of the method, apparatuses, and non-transitory computer-readable medium described herein may further include operations, features, means, or instructions for transmitting an indication that the reserved resource set may be allocated to the UE during a TTI, where the one or more resource block groups for the downlink transmission may be determined based on the received indication that the reserved resource set may be allocated.

In some examples of the method, apparatuses, and non-transitory computer-readable medium described herein, determining the one or more resource block groups for the first downlink transmission may include operations, features, means, or instructions for excluding the reserved resource set from the set of resource block groups to determine the one or more resource block group.

DETAILED DESCRIPTION

Figure 1:
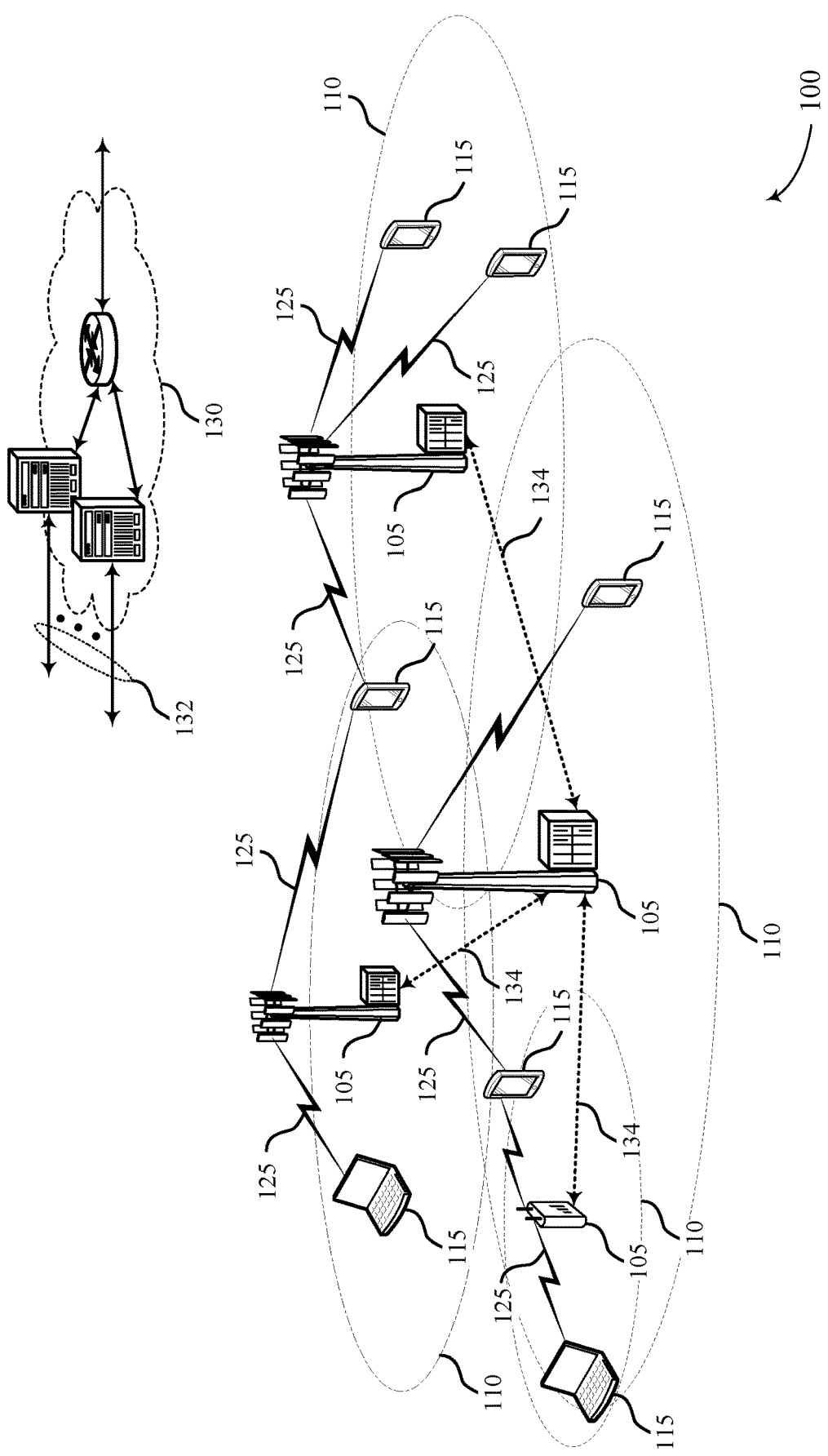
FIG. 1 illustrates an example of a system for wireless communications that supports multiple component waveform generation for per subband listen before talk (LBT) in accordance with aspects of the present disclosure.

A base station may transmit a downlink grant to provide a resource allocation for a downlink transmission to a user equipment (UE). Similarly, a base station may transmit an uplink grant to provide a resource allocation for an uplink transmission from a UE. For example, a downlink grant may indicate time and frequency resources allocated for a downlink transmission that may span one or more transmission time intervals (TTIs) (e.g., such as some set of slots or orthogonal frequency division multiplexing (OFDM) symbols) and a bandwidth that spans a set of subcarriers or subbands. In an example, a downlink grant may identify a set of one or more resource blocks (RBs) for a downlink transmission, and each of the RBs may include a set of resource elements (REs). Each RE may correspond to a single subcarrier (e.g., a tone) and a single OFDM symbol. In some cases, a UE may process the downlink grant to determine allocated resources for a physical downlink shared channel (PDSCH) transmission used for transporting downlink data to the UE.

As such, a base station may transmit downlink signaling (e.g., downlink control information (DCI), radio resource control (RRC) signaling, etc.) that includes a grant indicating a resource allocation for a downlink or uplink transmission. As an example, fields within a DCI may include an RB allocation (e.g., or a resource block group (RBG) allocation), a hybrid automatic repeat request (HARQ) index, a new data indicator (NDI) field, a modulation and coding scheme (MCS) index, a redundancy version (RV), precoding information fields, transmit power control (TPC) (e.g., for uplink grants), etc. For a downlink grant, the RB allocation may be used for demodulation and demapping of a corresponding downlink transmission. For an uplink grant, the RB allocation may be used for generation of a corresponding uplink transmission.

When a wireless network operates in a licensed radio frequency spectrum band, the base station and the UE may be able to coordinate scheduled channel access (and corresponding downlink and uplink data transmissions). However, when the wireless network is operating in an unlicensed or shared radio frequency spectrum band (e.g., including shared licensed radio frequency spectrum bands), conventional techniques may be inadequate due to the requirement that a listen before talk (LBT) procedure must be performed on the channel before access.

For example, a base station operating in shared (e.g., unlicensed or shared licensed) spectrum bands may configure a wideband component carrier (CC) that includes some number of subbands (e.g., to align with Wi-Fi channels). A wideband CC may thus be configured with some bandwidth multiple of, for example, 20 MHz, where each 20 MHz subband of the wideband CC may be associated with a LBT procedure prior to channel or subband access. For example, a base station may allocate an 80 MHz link (e.g., including four 20 MHz subbands) for a downlink transmission, and a per subband LBT procedure may be performed by the base station prior to downlink transmission. The base station may then transmit the downlink transmission using subbands (e.g., of the 80 MHz wideband CC) that are associated with a successful LBT procedure.

In some cases, such wideband CC operation and per subband LBT procedures may result in deficiencies pertaining to medium access latency. For example, a transmitting device (e.g., a base station or a UE) may be expected to transmit over the medium (e.g., over the particular subband) immediately, or in short duration, after completion of an LBT procedure for the subband. However, preparation of the data for transmission may take more time than is acceptable after the completion of an LBT. As such, in advance of the completion of the LBT procedure the transmitting device may prepare (e.g., pre-generate) waveform components corresponding to each subband of the wideband CC, each guard band between the subbands, etc. The transmitting device may then combine a set of the prepared waveform components based on the subbands that pass the LBT procedure, and transmit the generated waveform subsequent to the completion of the per subband LBT procedure.

However, a transmitting device may not have the capability (e.g., in memory and in digital signal processing (DSP) hardware) to store and combine several waveform components for such techniques. For example, in the scenario where an 80 MHz wideband channel includes four 20 MHz subbands, such techniques could result in preparation of seven waveform components (e.g., four waveform components corresponding to the four subbands, and three waveform components corresponding to the three guard bands between the four subbands) prior to completion of the LBT procedure. Some devices may have capability limitations (e.g., based on memory and/or signal processing hardware constraints) in storing such waveform components, adding such waveform components, etc.

According to the described techniques, a transmitting device (e.g., a base station or a UE) may generate a number waveform components based on the capability of the transmitting device. The waveform generation capability may represent the number, such as a maximum number, of waveform components that the UE (e.g., in the case that the UE is the transmitting device) may generate (e.g., pre-generate) in advance of the LBT procedure (e.g., based on a memory storage capability, an ability to combine waveform components in the time domain following a per subband LBT procedure, etc. of the UE). For example, in some cases, the transmitting device may prioritize generating waveform components for subbands For instance, the transmitting device may prioritize generating waveform components for subbands over or instead of generating waveform components for guard bands associated with and between subbands. In some examples, the transmitting device may generate a waveform component that spans two or more subbands, including guard bands between the included subbands (e.g., and may ultimately generate a waveform including the waveform component only if each subband associated with the waveform component passes the LBT procedure). Using the various techniques described, the transmitting device may prepare waveform components (e.g., in accordance with the transmitting device's waveform generation capabilities) prior to completion of a per subband LBT procedure, and may then combine pre-generated waveform components, based on the per subband results of the LBT procedure, for transmission during a first TTI following the LBT procedure. According to other aspects of the described techniques, the device may then generate a second waveform (e.g., including any guard band regions between two contiguous subbands that each passed the LBT procedure) during the first TTI, and transmit the second waveform during a second TTI subsequent to the first TTI.

Further, RBG configurations (e.g., RBG definitions) for improved resource allocation are also described. For example, when the wireless network is operating in an unlicensed or shared radio frequency spectrum band, a base station may indicate one or more guard band boundaries to indicate RBG configurations that account for such guard bands. A UE may receive a guard band boundary indication from a base station, and may identify an RBG configuration based on the indication. As such, a base station may be able to allocate resources (e.g., of the one or more subbands of a configured CC in shared spectrum) via DCI and/or RRC signaling based on (e.g., taking into account) guard band regions present between subbands.

The techniques described herein may provide for improved shared (e.g., unlicensed or shared licensed) spectrum, subband based, medium access. For example, preparation of waveform components of a wideband CC transmission prior to LBT procedure conclusion may reduce channel access latency, and improve system throughput. Aspects of the techniques directed to device waveform generation capabilities (e.g., prioritized waveform component generation, multi-subband waveform component generation, waveform component blind detection hypotheses, etc.) may allow for waveform component preparation and implementation by devices of varying capabilities, and may provide mechanisms to reduce signaling overhead associated with ramifications of such varying waveform generation capabilities. Further, resource allocation (e.g., and RBG configuration) techniques described herein may provide for efficient scheduling of wideband transmissions associated with subband based medium access, while minimizing additional overhead (e.g., associated with guard band indication and guard band influence on RBG configurations) compared to licensed spectrum communication techniques.

Aspects of the disclosure are initially described in the context of a wireless communications system. Example waveform component diagrams, RBG configurations, and process flows illustrating aspects of the described techniques are then discussed. Aspects of the disclosure are further illustrated by and described with reference to apparatus diagrams, system diagrams, and flowcharts that relate to multiple component waveform generation for per subband LBT.

FIG. 1 illustrates an example of a wireless communications system 100 that supports multiple component waveform generation for per subband LBT in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed (or shared licensed) radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both. Devices in wireless communications system 100 may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as $T_f$=307,200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 4125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

For example, in some cases, wireless communications system 100 may operate in shared or unlicensed spectrum bands. A carrier (e.g., a wideband CC) may be associated with a particular bandwidth of the shared or unlicensed radio frequency spectrum. In some cases, a carrier of wireless communications system 100 may be configured with a bandwidth multiple of some subband or channel in the region of the shared or unlicensed radio frequency spectrum. For example, an 80 MHz wideband CC may include four 20 MHz subbands in order to align the wideband CC for coexistence within the shared or unlicensed radio frequency spectrum region. As discussed herein, when operating in shared or unlicensed radio frequency spectrum bands, wireless devices such as base stations 105 and UEs 115 may employ LBT procedures to ensure a frequency channel is clear before transmitting data. As such, when communicating via an 80 MHz wideband CC, a base station 105 or a UE 115 may perform a per subband LBT to determine which subbands (e.g., which 20 MHz subbands) of the wideband CC are available for transmission.

As discussed herein, wireless devices such as base stations 105 and UEs 115 may employ LBT procedures to ensure a frequency channel is clear before transmitting data. LBT is a procedure where radio transmitters (e.g., base stations 105 and UEs 115) first sense the medium and transmit only if the medium is sensed to be idle, which may also be referred to as a clear channel assessment (CCA). An LBT procedure may utilize at least energy detection (ED) to determine the presence of signals on a channel. As used herein, a per subband LBT (e.g., or subband based LBT) may refer to an LBT procedure performed over a wideband CC where regions of the wideband CC (e.g., subbands) associated with sensed energy are identified, an LBT procedure that individually senses each subband or channel associated with a wideband CC, multiple LBT procedures where an LBT procedure is performed on each subband or channel associated with a wideband CC, etc. Throughout the description herein, a per subband LBT may in some cases be generally referred to as an LBT procedure.

Further, a base station 105 may transmit downlink signaling (e.g., DCI, RRC signaling, etc.) that includes a grant indicating a resource allocation for a downlink or uplink transmission. For example, physical downlink control channel (PDCCH) may carry DCI in control channel elements (CCEs), which may consist of nine logically contiguous resource element groups (REGs), where each REG contains four REs. DCI may include information regarding downlink scheduling assignments, uplink resource grants, transmission scheme, uplink power control, HARQ information, an MCS, and other information. The size and format of the DCI message may differ depending on the type and amount of information that is carried by the DCI, as well as factors such as bandwidth, the number of antenna ports, and duplexing mode.

For example, DCI may indicate a resource allocation (e.g., a portion or range, such as a set of subcarriers, RBs, or RBGs) within a carrier in various ways. A type 0 resource allocation (e.g., for more granular resource allocations) may refer to a bitmap including a bit for each RBG. A UE 115 may receive the type 0 resource allocation (e.g., a bitmap indicated via DCI), and may identify which RBGs are included in the grant based on an RBG configuration (e.g., a configuration or indexing of RBGs) and 1's indicated by the bitmap. A type 1 resource allocation may refer to a continuous resource allocation, indicated by a starting RB or RBG and an ending RB or RBG. In some cases, PDCCH may carry DCI messages associated with multiple users, and each UE 115 may decode the DCI messages that are intended for it. For example, each UE 115 may be assigned a cell radio network temporary identifier (C-RNTI) and CRC bits attached to each DCI may be scrambled based on the C-RNTI.

In some cases, wireless communications system 100 may operate in shared or unlicensed spectrum bands, and may employ subband based access. A wideband CC may be configured with a bandwidth corresponding to some multiple of a channel bandwidth or subband bandwidth. For example, a UE 115 may be configured to operate on an 80 MHz wideband CC comprising four 20 MHz subbands. For a downlink transmission, a base station may perform a per subband LBT procedure (e.g., a subband based LBT procedure) to determine whether or not each subband of the wideband CC is usable (e.g., available for downlink transmission to the UE). As such, for each channel occupancy time (COT), various possible subsets of the wideband CC (e.g., various combinations of subbands making up the wideband CC) may be used depending on the results of performed subband based LBT procedures (e.g., depending on which subbands are being used for communications by other devices).

However, transmission data preparation (e.g., transmission waveform generation) may be associated with preparation (e.g., processing) time, and it may be inefficient for a device (e.g., a base station 105 or a UE 115) to prepare a waveform transmission after the results of the LBT have been obtained. For example, for a transmission, a device may obtain data to be transmitted from an upper layer, encode the obtained data, modulate the encoded data (e.g., impress the encoded information on a radio-frequency wave by varying one or more characteristics of the wave in accordance with the intelligence signal), etc. A device may be expected to transmit on (e.g., occupy) the medium immediately, or in short duration, after performing an LBT procedure (e.g., such that radio resources are efficiently utilized, such that the radio resources do not become occupied by another device while the transmitting device prepares a transmission, etc.). However, when preparing data for transmission, the transmitting device may not know what set of subbands will be usable prior to the completion of the per subband LBT.

In some cases, a transmitting device may puncture REs in the frequency domain after the LBT outcome is known (e.g., puncture REs corresponding to subbands, and associated guard bands, that fail or do not pass the per subband LBT procedure). The transmitting device may then perform an inverse fast Fourier transform (IFFT) for transmission waveform generation. However, this may require a fast or quick IFFT (e.g., in order to meet transmission time expectancies following a successful LBT), which in some cases may not be possible implementation wise.

In other cases, a transmitting device may prepare multiple subbands (e.g., waveform components) separately in the time domain, and may add the components corresponding to subbands that have passed the LBT after the LBT outcome is known (e.g., and transmit the combined components following the LBT procedure). However, in order to adhere to guard bands associated with such subbands or channels, such techniques may be associated with intensive memory storage and signal processing demands (e.g., or capabilities). For example, for a wideband CC including four subbands, a transmitting device may prepare 7 waveform components (e.g., four waveform components corresponding to the subbands, and three waveform components corresponding to the guard bands between the four subbands). The transmitting device may then perform linear operations for signal processing in the time domain to add the time domain waveform together based on the results of the LBT (e.g., where the generated waveform includes waveform components corresponding to subbands that pass the LBT, as well as waveform components corresponding to guard bands between two subbands that both pass the LBT).

In some cases, a transmitting device (e.g., base station 105 transmitting a downlink transmission or a UE 115 transmitting an uplink transmission) may be limited in terms of memory, DSP hardware, etc. Therefore, a transmitting device may have certain capabilities (e.g., and limitations) in regard to how many waveform components the transmitting device can prepare, store, combine, etc. A transmitting device waveform generation capability refer to a capability of the transmitting device to prepare (e.g., generate prior to the completion of a per subband LBT) waveform components, a capability of the transmitting device to store waveform components, a capability of the transmitting device to combine or add waveform components, etc. For example, a waveform generation capability may refer to the amount of time a transmitting device takes to generate one or more waveform components, a number of waveform components that may be prepared before or during an LBT procedure duration, an amount of memory or storage the transmitting device includes, a number of waveform components that the transmitting device can store in memory, the amount of time a transmitting device takes to combine or add together some number of waveform components, a number of waveform components that may be combined or added together, etc. In some cases, such waveform generation capabilities may depend on memory space of the transmitting device, DSP hardware of the device (e.g., a multi-branch adder for time domain combining or time domain linear operations), general purpose hardware of the device, etc.

According to techniques described herein, a base station 105 and/or UE 115 may prepare multiple pieces of a waveform (e.g., waveform components) based on the waveform generation capabilities of the device. Further, the described techniques provide for prioritization of certain waveform components (e.g., waveform components corresponding to subbands, rather than guard bands), waveform components that span more than one subband (e.g., multi-subband waveform component generation), and base station blind detection schemes to support and facilitate communications amongst devices with such varying waveform generation capabilities. Additionally, RBG configurations (e.g., RBG definitions) for resource allocation (e.g., grants) of such transmissions are also discussed.

For example, in cases where a transmitting device is limited in the number of waveform components it can generate for a given wideband CC (e.g., in cases where the number of subbands and guard bands associated with a wideband CC exceeds the device's waveform generation capability), a transmitting device may prioritize which waveform components are prepared or generated prior to completion of the per subband LBT procedure. For example, a transmitting device may prepare waveform components corresponding to subbands of the wideband CC, and may not prepare waveform components for guard bands between the subbands, thus reducing the number of waveform components a transmitting device prepares for the transmission in a first TTI following completion of the LBT procedure.

The device may thus combine the prepared subband waveform components that correspond to subbands that pass the LBT, and transmit the generated waveform in a first TTI subsequent to the completion of the LBT procedure. As the guard bands may constitute a relatively small portion of the operating bandwidth (e.g., of the configured wideband CC), occupied channel bandwidth (OCB) requirements, power spectral density (PSD) requirements, etc. may still be satisfied in the first TTI even though the waveform transmitted in the first TTI may not include guard band regions due to waveform generation capabilities of the transmitting device (e.g., as guard band waveform components may not be generated). Guard bands may then be included in subsequent transmission in later slots of the COT (e.g., in a second TTI subsequent to the first TTI). For example, as the transmitting device may know the per subband results of the LBT while the device prepares data for transmission during a second TTI, the transmitting device may generate the second waveform, including any appropriate guard bands, during the first TTI (e.g., during the transmission of the combined waveform components prepared prior to completion of the LBT).

In cases where the number of subbands associated with a wideband CC exceeds the device's waveform generation capability), a transmitting device may generate waveform components covering multiple subbands (e.g., including guard bands between the included subbands). In such cases, a transmitting device may only include the waveform component in the waveform generated after completion of the LBT (e.g., include the waveform component in the combined waveform for transmission) if all subbands associated with the waveform component pass the LBT. If any subbands associated with a multi-subband waveform component fail (e.g., or do not pass) the LBT, the multi-subband waveform component may not be included in the initial waveform transmitted in the first TTI subsequent to the LBT procedure. For example, in cases where a wideband CC includes four subbands and the transmitting device is capable of preparing three waveform components, the transmitting device may generate a waveform component corresponding to a first subband, a waveform component corresponding to a second subband, and a waveform component corresponding to both a third subband and a fourth subband (e.g., and a guard band in between the third and fourth subband). In scenarios where both the third and fourth subband pass the LBT, the third waveform component may be included in the waveform generated post LBT (e.g., the combined waveform). In scenarios where either the third or fourth subband fail the LBT, the third waveform component may not be included in the waveform generated post LBT.

For an uplink transmission from a UE 115 to be a summation of multiple waveform components, a receiving base station 105 may perform detection techniques to determine what is being transmitted. That is, a base station 105 may perform detection techniques to determine which waveform components are being transmitted by the UE 115, as the UE 115 may also perform a per subband LBT procedure prior to uplink transmission (e.g., and thus the waveform components combined and transmitted by the UE 115 may vary depending on the LBT results). To inform detection schemes (e.g., blind detection hypotheses testing) performed by a base station 105, a UE 115 may transmit a UE capability report including an indication of the UE's waveform generation capability. That is, a UE 115 may indicate the number of waveform components it is capable of preparing, such that a base station 105 may efficiently determine detection hypotheses for receiving the uplink transmission (e.g., such that a base station 105 may determine potential uplink waveforms based on the UE waveform generation capability and potential outcomes or potential ramifications of an associated LBT procedure performed by the UE 115 prior to uplink transmission).

For example, a certain behavior or rule may be expected by both a base station 105 and a UE 115 depending on the waveform generation capability of a transmitting device and the operating bandwidth (e.g., the configured wideband CC). Given the waveform generation capability of a transmitting device, the resource allocation, and the rule or expected behavior, a base station 105 and a UE 115 (e.g., a transmitter and a receiver) may come up with the same set of assumptions or expectations regarding what waveform components will be prepared. As such, given the waveform generation capability of a transmitting device, a receiving device may assume (e.g., identify) one or more waveform hypotheses (e.g., for a blind detection procedure). A receiving device (e.g., a base station) may use subband component detection to see which subbands passed the LBT procedure from the transmitting device's perspective, and may then use the rule (e.g., the expected waveform component generation behavior) and the waveform hypotheses to determine which waveform components are combined by the transmitting device.

For example, if a UE 115 has a waveform generation capability of three waveform components, and a base station 105 wants to grant four subbands, there may be some rule defined (e.g., RRC configured, predetermined or preconfigured for wireless communications system 100, etc.) to say that one component covers two subbands (e.g., and the guard band in between) and the other two components each cover one subband (e.g., without guard band). Further, it may be specified which subbands are combined in a waveform component in cases where the transmitting device is allocated with a number of subbands that exceeds the waveform generation capability of the transmitting device. In the example above, it may be specified that the two subbands of the lowest frequency are combined, the two subbands of the highest frequency are combined, etc. Rules or assumptions for any combination of a subband allocation and a transmitting device waveform generation capability may be implemented using the described techniques by analogy, without departing from the scope of the present disclosure. That is, in general, default rules such as these may be used to translate the waveform generation capability of a transmitting device (e.g., a UE) and the resource allocation to an assumption or expected behavior regarding which waveform components are prepared prior to the completion of the LBT procedure, combined subsequent to the LBT and transmitted, etc. In some cases, such rules may be configurable by a base station (e.g., via RRC signaling) or may be predetermined or preconfigured by the network.

Accordingly, a base station 105 may deduce waveform component (e.g., guard band) usage by a UE 115 based on subband detection or sensing (e.g., based on blind detection techniques across allocated subbands). A base station 105 may expect different behavior for multi-subband uplink transmission given the assignment (e.g., the resource allocation) and the waveform generation capability of the UE 115 (e.g., which may be received by the base station via a UE capability report transmitted by the UE 115).

As another example, if the UE capability is 1 and the base station knows the UE cannot perform multi-component preparation of the waveform, the UE will prepare a single component across all of the subbands allocated (e.g., and guard bands in-between) and transmit either all or nothing, depending on the LBT outcome (e.g., if all subbands pass the LBT). If the UE capability is Y and the base station allocated uplink transmission covers X subbands, where $2X-1 \leq Y$, the base station may expect that the UE can prepare waveform components for each subband and each guard band. Then the UE may transmit a waveform component corresponding to each subband independently and the guard band between two subbands may be transmitted if both subbands are transmitted. In some cases, per subband transmission detection may then be implemented at the base station. In other cases, the base station may receive some signaling to indicate which subbands are transmitted (e.g., in the form of some uplink control information (UCI)). If the UE capability is Y and the base station allocated uplink transmission covers X subbands, where $X \leq Y < 2X-1$, the base station may expect that the UE can prepare waveform components for each subband but not for guard bands. The UE may then transmit each component corresponding to each subband independently, but the guard band may not be prepared. Given the rules, the base station may make proper scheduling decisions in the resource allocation as well.

RBG configurations (e.g., RBG definitions) for improved resource allocation are also described. For example, when the wireless network (e.g., wireless communications system 100) is operating in an unlicensed or shared radio frequency spectrum band, a base station 105 may indicate one or more guard band boundaries to indicate RBG configurations that account for such guard bands. A UE 115 may receive a guard band boundary indication from a base station 105, and may identify an RBG configuration based on the indication. As such, a base station 105 may be able to allocate resources (e.g., of the one or more subbands of a configured CC in shared spectrum) via DCI and/or RRC signaling based on (e.g., taking into account) guard band regions present between subbands.

To indicate a resource allocation that avoids one or more guard bands, a base station 105 may employ a type 0 resource allocation (e.g., a type 0 RA). A type 0 RA may use an RBG as unit, but the RBG boundary and subband boundary may not generally be aligned. As such, wireless communications system 100 may employ RBG configurations described herein. For example, for an RBG that spans a guard band boundary (e.g., includes allocable RBs and RBs in a guard band region), the RBG may be split into two RBGs and two bits in the bitmap (e.g., in the DCI or type 0 RA) may be used to assign them. As such, the resource allocation bitmap may increase by one bit for each guard band boundary. In other examples, for RBs in the guard band, a localized RBG grid may be configured. The base station may RRC configure the guard-band boundaries, and the RBG definition may be adjusted using such techniques, as described in more detail with reference to FIG. 4.

Alternatively, a base station 105 may drop or refrain from allocating RBGs that include RBs in a guard band region (e.g., in scenarios where the RBG boundary and subband boundary are not aligned, and the RBG grid is not adjusted). Additionally or alternatively, a base station 105 may use reserved resource sets to support type 1 RA. For example, a base station 105 may use a type 1 RA (e.g., a continuous resource allocation indicating a starting RBG and an ending RBG) with DCI indicating a reserved resource set that includes one or more guard band regions. A UE 115 may receive the type 1 RA and effectively rate match around the indicated reserved resource set (e.g., as further described herein with reference to FIG. 6).

Figure 2A:
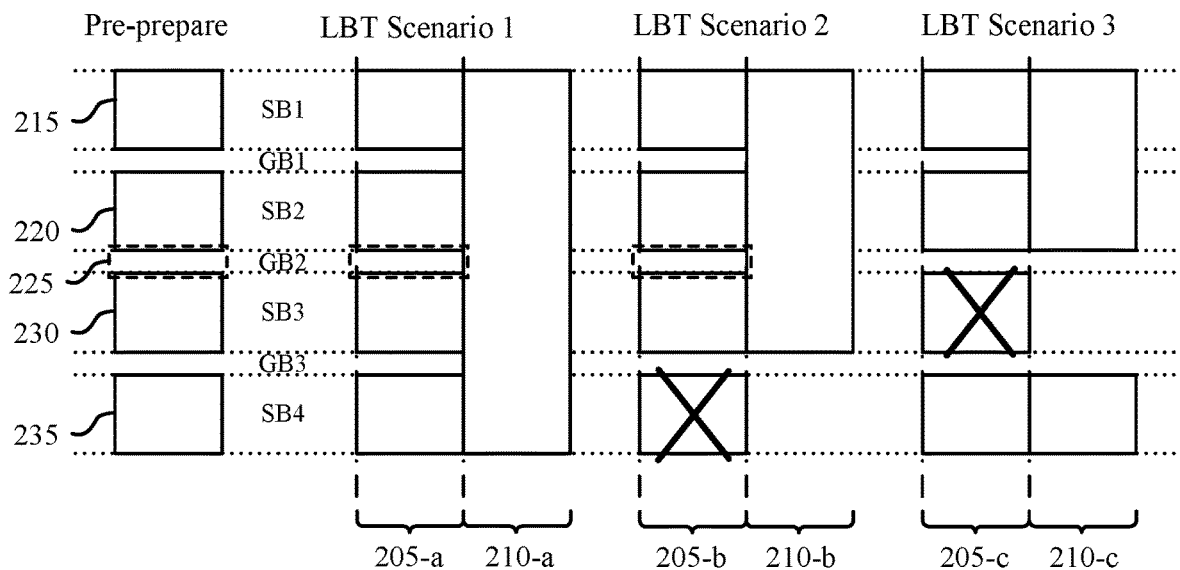
FIGS. 2A and 2B illustrate example waveform component generation diagrams that support multiple component waveform generation for per subband LBT in accordance with aspects of the present disclosure.
Figure 2B:
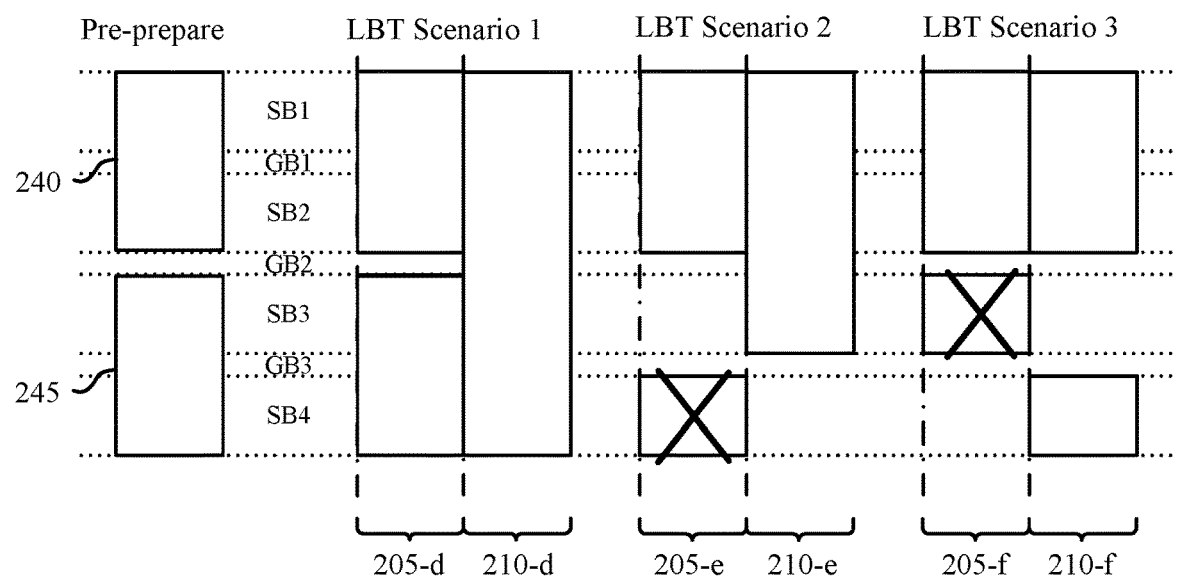

FIGS. 2A and 2B illustrate example waveform component generation diagrams 200 and 201 that each support multiple component waveform generation for per subband LBT in accordance with aspects of the present disclosure. In some examples, waveform component generation diagram 200 and waveform component generation diagram 201 may illustrate aspects of techniques implemented by wireless communication system 100. For example, waveform component generation diagram 200 and waveform component generation diagram 201 may illustrate aspects of waveform component preparation and transmission waveforms generation (e.g., via combination or summation of prepared waveform components) performed by a base station 105 and/or a UE 115. Both waveform component generation diagram 200 and waveform component generation diagram 201 may assume an operating bandwidth (e.g., a wideband CC) that includes four channels or four subbands (SB1, SB2, SB3, and SB4) as well as three guard bands (GB1, GB2, and GB3) between the four subbands, as shown.

Waveform component generation diagram 200 may illustrate preparation of waveform components (e.g., waveform components 215, 220, 230, and 235) prior to completion of an LBT procedure, as well as transmission waveform generation based on three example LBT outcomes (e.g., LBT scenarios 1, 2, and 3). Waveform component generation diagram 200 may illustrate such aspects of the techniques described herein as performed by a device (e.g., a base station or UE) capable of preparing four waveform components, and further illustrates implementation differences if the device were capable of preparing five waveform components (e.g., as illustrated by the dashed lines).

Wireless communications system supporting communications in shared or unlicensed spectrum via an operating bandwidth that exceeds a channel or subband associated with the operating region of the shared or unlicensed spectrum may employ channel or subband based channel access. For example, an operating bandwidth (e.g., a wideband CC) may include four subbands (e.g., such as an 80 MHz wideband CC that includes four 20 MHz subbands), and a device communicating over such a CC may perform a per subband LBT procedure prior to transmitting communications (e.g., for coexistence compliance). A transmitting device may use (e.g., transmit a signal or energy over) subbands of the CC that pass the LBT, and transmit over a COT associated with the LBT. As discussed herein, it may be desirable for a transmitting device to prepare waveform components prior to completion of an LBT procedure, such that the transmitting device may combine and transmit the pre-generated waveform components in order to transmit once the device obtains the results of the LBT.

According to the techniques described herein, a transmitting device (e.g., a base station transmitting downlink or a UE transmitting uplink) may determine (e.g., prepare) waveform components for a transmission based on a resource allocation and the waveform generation capability of the device. In the example of waveform component generation diagram 200, a transmitting device may be allocated with (e.g., as a UE) or may allocate (e.g., as a base station) four subbands, and may have a waveform component generation capability of four waveform components.

For example, a UE 115 may receive a resource allocation transmission from a base station that indicates four subbands (e.g., SB1, SB2, SB3, and SB4) for an uplink transmission. Prior to completion of an LBT procedure (e.g., before an LBT procedure), the UE 115 may determine or prepare four waveform components (e.g., waveform component 215, waveform component 220, waveform component 230, and waveform component 235), and may then combine and transmit waveform components corresponding to subbands that pass a per subband LBT procedure. In other examples, a base station 105 may transmit a resource allocation to a UE that indicates four subbands (e.g., SB1, SB2, SB3, and SB4) for a subsequent downlink transmission. Prior to completion of an LBT procedure, the base station 105 may determine or prepare four waveform components (e.g., waveform component 215, waveform component 220, waveform component 230, and waveform component 235), and may then combine and transmit waveform components corresponding to subbands that pass a per subband LBT procedure. A transmitting device may refer to a UE 115 in the uplink scenario and may refer to a base station 105 in the downlink scenario.

For LBT Scenario 1, all subbands may pass an LBT procedure, and a transmitting device may combine and transmit waveform components corresponding to each subband in the allocated resources. That is, a transmitting device may combine (e.g., select and combine) waveform component 215, waveform component 220, waveform component 230, and waveform component 235 in the time domain, and may transmit the combined waveform (e.g., the transmission waveform) in a first TTI 205-a subsequent to the completion of the LBT. For LBT Scenario 2, a subband (e.g., SB4) may fail the LBT. In such a scenario, a transmitting device may combine waveform components corresponding to subbands that pass the LBT (e.g., waveform component 215, waveform component 220, and waveform component 230), and transmit a waveform comprising the selected waveform components in a first TTI 205-b subsequent to the completion of the LBT. For LBT Scenario 3, a subband (e.g., SB3) may fail the LBT. In such a scenario, a transmitting device may combine waveform components corresponding to subbands that pass the LBT (e.g., waveform component 215, waveform component 220, and waveform component 235), and transmit a waveform comprising the selected waveform components in a first TTI 205-c subsequent to the completion of the LBT.

In a second TTI 210 (e.g., in a TTI 210 subsequent to TTI 205 during the COT), a transmitting device may include guard bands between two subbands that passed the LBT. That is, in preparation of transmission during a second TTI 210, a transmitting device may generate a waveform that includes waveform components associated with subbands that passed the LBT, as well as guard bands between any two subbands that passed the LBT. Any guard bands adjacent to subbands that fail the LBT may still remain unoccupied during the second TTI 210. For example, a transmitting device capable of preparing and storing four waveform components may pre-generate four waveform components for a first TTI 205 subsequent to completion of an LBT procedure. However, during the first TTI 205, a transmitting device may generate a second waveform including subbands that pass the LBT and any appropriate guard bands, as the transmitting device may generate the second waveform during the first TTI 205 and may not need to store any components in memory, as the device may transmit the second waveform in the second TTI 210 as the results of the LBT procedure are already known. As an example, for LBT Scenario 3, a transmitting device may select and combine waveform component 215, waveform component 220, and waveform component 235 for transmission in TTI 205-c. The transmitting device may generate a second waveform, during TTI 205-c, that includes (e.g., or spans) SB1, GB1, SB2, and SB4. GB2 and GB3 may not be included in the generated second waveform, as SB3 failed the LBT, and thus guard bands adjacent to SB3 may remain unoccupied for coexistence compliance with other neighboring devices.

For example, in some cases, a resource allocation may be adjusted during a TTI 205 (e.g., to use or not use certain subbands or guard bands). Guard bands may be used in later slots in scenarios where waveform components are only prepared or pre-generated for the transmission in TTI 205 (e.g., for an initial transmission subsequent to the completed LBT). In other words, a resource allocation may be discontinuous in a first few slot or slots (e.g., in TTI 205), and may be indicated by a type 0 RA. With such a discontinuous resource allocation, PSD requirements, OCB requirements, etc. may still be satisfied in the TTI 205.

A transmitting device may prepare waveform components up to the device's waveform generation capability according to techniques described herein. For example, a transmitting device may prioritize generating waveform components for subbands (e.g., and not generate waveform components for guard bands), a transmitting device may generate a waveform component that spans two or more subbands (e.g., including guard bands between the included subbands), etc. In some examples, a transmitting device may determine or pre-generate as many waveform components as the device is capable of. For example, waveform component generation diagram 200 may illustrate a device with an increased waveform generation capability of 5 waveform components, as shown with the dotted lines. In such cases, a transmitting device may additionally determine or pre-generate a waveform component corresponding to a guard band (e.g., waveform component 225 may correspond to GB2). In LBT Scenario 1 and LBT Scenario 2, the transmitting device may include waveform component 225 in the combined (e.g., generated) transmission waveform transmitted in TTIs 205-a and 205-b. In LBT Scenario 3, the transmitting device may not include waveform component 225, as waveform component 225 may correspond to GB2 which is adjacent to SB3, which failed the LBT procedure in LBT Scenario 3.

Waveform component generation diagram 201 may illustrate preparation of waveform components (e.g., waveform components 240 and 245) prior to completion of an LBT procedure, as well as transmission waveform generation based on three example LBT outcomes (e.g., LBT scenarios 1, 2, and 3). Waveform component generation diagram 201 may illustrate such aspects of the techniques described herein as performed by a device (e.g., a base station or a UE) capable of preparing two waveform components. In cases where a transmitting device is allocated with a number of subbands that exceed the device's waveform generation capability (e.g., in cases where a CC includes four subbands and a device is capable of pre-generating and storing two waveform components), the transmitting device may employ multi-subband waveform component techniques.

For example, waveform component 240 may correspond to two subbands (e.g., SB1 and SB2) as well as the guard band between the two subbands (e.g., GB1). Waveform component 245 may also correspond to two subbands (e.g., SB3 and SB4) as well as the guard band between the two subbands (e.g., GB3). As discussed herein, for multi-subband waveform component techniques, a transmitting device may include a multi-subband waveform component only if each subband associated with the waveform component passes the LBT procedure.

For LBT Scenario 1, all subbands may pass an LBT procedure, and a transmitting device may combine and transmit waveform components corresponding to each subband in the allocated resources. That is, a transmitting device may combine (e.g., select and combine) waveform component 240 and waveform component 245 in the time domain, and may transmit the combined waveform (e.g., the transmission waveform) in a first TTI 205-d subsequent to the completion of the LBT. For LBT Scenario 2, a subband (e.g., SB4) may fail the LBT. In such a scenario, a transmitting device may combine waveform components corresponding to subbands that pass the LBT (e.g., only waveform component 240, and transmit a waveform comprising the selected waveform component 240 in a first TTI 205-e subsequent to the completion of the LBT. Even though SB3 passed the LBT, the transmitting device may not include waveform component 245 in the generated transmission waveform as waveform component 245 includes SB4, which failed the LBT. For LBT Scenario 3, a subband (e.g., SB3) may fail the LBT. In such a scenario, a transmitting device may generate a transmission waveform with waveform components corresponding to subbands that pass the LBT (e.g., waveform component 240), and transmit a waveform comprising the selected waveform component 240 in a first TTI 205-f subsequent to the completion of the LBT.

In a second TTI 210 (e.g., in a TTI 210 subsequent to TTI 205 during the COT), a transmitting device may include any appropriate subbands or guard bands. That is, in preparation of transmission during a second TTI 210, a transmitting device may generate a waveform that includes waveform components associated with subbands that passed the LBT, as well as guard bands between any two subbands that passed the LBT. Any guard bands adjacent to subbands that fail the LBT may still remain unoccupied during the second TTI 210. For example, a transmitting device capable of preparing and storing two multi-subband waveform components may pre-generate two multi-subband waveform components for a first TTI 205 subsequent to completion of an LBT procedure. However, during the first TTI 205, a transmitting device may generate a second waveform including subbands that pass the LBT and any appropriate guard bands, as the transmitting device may generate the second waveform during the first TTI 205 and may not need to store any components in memory, as the device may transmit the second waveform in the second TTI 210 as the results of the LBT procedure are already known. As an example, for LBT Scenario 2, a transmitting device may select waveform component 240 for transmission in TTI 205-e. The transmitting device may generate a second waveform, during TTI 205-e, that includes (e.g., or spans) SB1, GB1, SB2, GB2, and SB3. GB3 and SB4 may not be included in the generated second waveform, as SB4 failed the LBT.

Generally, if a transmitting device is capable, the transmitting device may prepare waveform components for all subbands and guard bands. In the example waveform component generation diagrams 200 and 201 of FIG. 2, if a transmitting device has a waveform component generation capability of 7 or more waveform components, the transmitting device may generate a waveform component corresponding to each subband and guard band (e.g., each of SB1, GB1, SB2, GB2, SB3, GB3, and SB4). However, in cases where a transmitting device is allocated with a number of subbands (e.g., and guard bands) that exceed the waveform component generation capability of the device, the device may employ techniques described herein in determining which waveform components to generate.

Further, as described herein, certain behavior or rules may be expected by both a base station and a UE depending on the waveform generation capability of a transmitting device and the operating bandwidth (e.g., the number of allocated subbands). Given the waveform generation capability of a transmitting device, the resource allocation, and the rule or expected behavior, a base station and UE (e.g., a transmitter and a receiver) may come up with (e.g., determine) the same set of assumptions or expectations regarding what waveform components will be prepared. As such, given the waveform generation capability of a transmitting device, a receiving device may assume (e.g., identify) one or more waveform hypotheses (e.g., for a blind detection procedure). A receiving device (e.g., a base station) may use subband component detection to see which subbands passed the LBT procedure from the transmitting device's perspective, and may then use the rule (e.g., expected waveform component generation behavior) and the waveform hypotheses to determine which waveform components are combined by the transmitting device.

Figure 3:
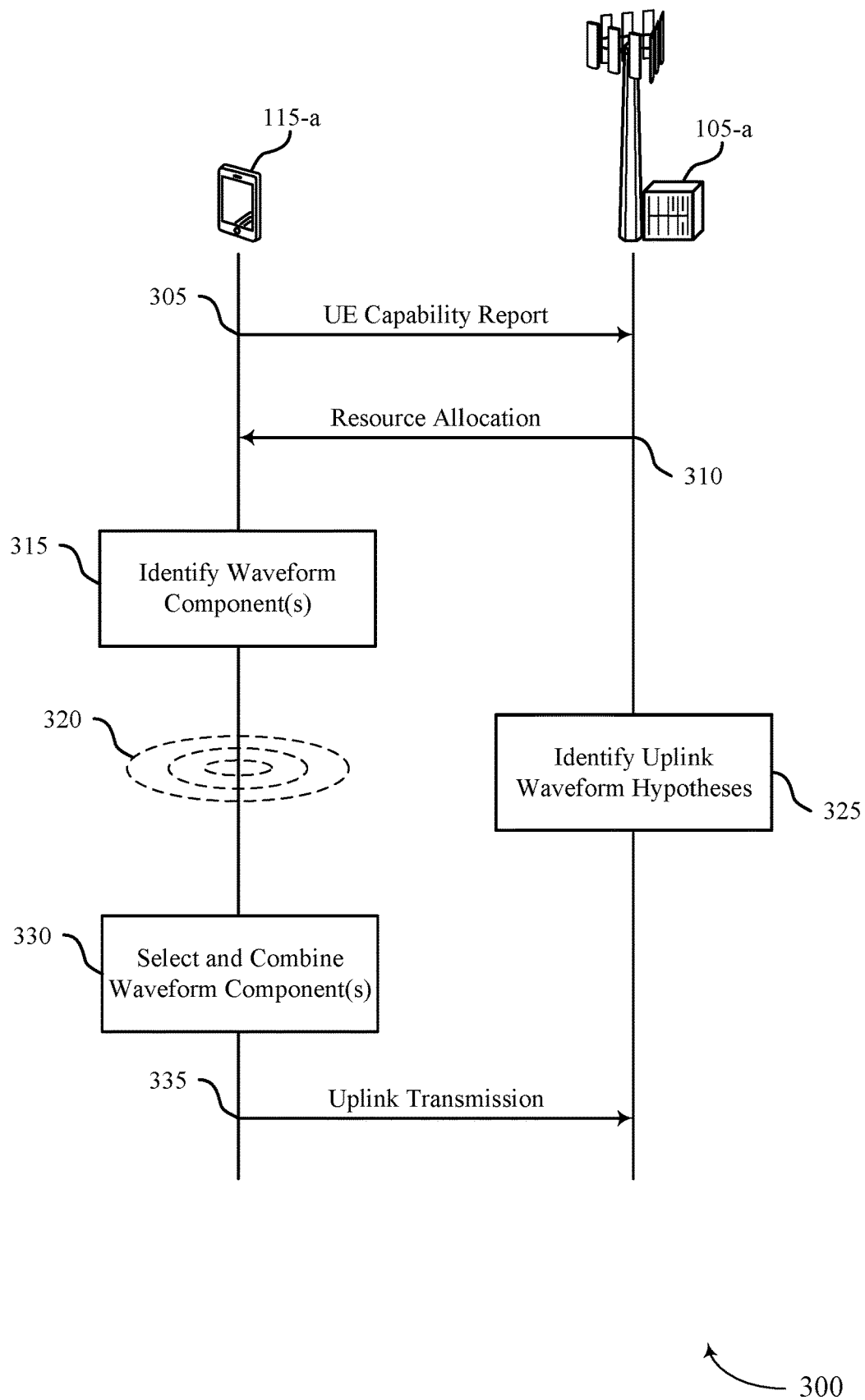
FIG. 3 illustrates an example of a process flow that supports multiple component waveform generation for per subband LBT in accordance with aspects of the present disclosure.

FIG. 3 illustrates an example process flow 300 that supports multiple component waveform generation for per subband LBT in accordance with aspects of the present disclosure. In some examples, process flow 300 may implement aspects of wireless communication system 100. Process flow 300 illustrates aspects of techniques performed by a base station 105-a and a UE 115-a, which may be an example of a base station 105 and a UE 115 described with reference to FIG. 1. In the following description of the process flow 300, the operations between the base station 105-a and the UE 115-a may be transmitted in a different order than the exemplary order shown, or the operations performed base station 105-a and UE 115-a may be performed in different orders or at different times. In some cases, certain operations may also be left out of the process flow 300, or other operations may be added to the process flow 300.

At 305, UE 115-a may transmit a UE capability report indicating a waveform generation capability (e.g., of UE 115-a) to base station 105-a. The waveform generation capability may represent a number of waveform components that the UE 115-a is capable of generating.

At 310, base station 105-a may transmit a resource allocation indicating a plurality of subbands for an uplink transmission.

At 315, UE 115-a may identify a plurality of waveform components for the uplink transmission based at least in part on the waveform generation capability of the UE 115-a and the indicated plurality of subbands. In some cases, a waveform component may correspond to a subband, a resource in a guard band, or some combination thereof.

At 320, UE 115-a may perform an LBT procedure (e.g., a per subband LBT) for the plurality of subbands.

At 325, base station 105-a may identify set of uplink waveform hypotheses based on the waveform generation capability of the UE and the transmitted resource allocation.

The base station 105-a may receive the uplink transmission at 330 based on at least one of the identified set of uplink waveform hypotheses. For example, in some cases, the base station 105-a may divide the plurality of subbands into one or more groups based at least in part on the waveform generation capability of the UE. The base station 105-a may perform a blind detection procedure on one or more subbands of the plurality of subband, and identify one or more guard bands for the uplink transmission based on the performed blind detection procedure and the set of uplink waveform hypotheses. In some cases, the uplink waveform hypotheses may be based on a set of waveform component generation rules (e.g., that may be configured by the base station 105-a or preconfigured by the network).

At 330, UE 115-a may select, based on results of the performed LBT procedure, one or more waveform components of the identified plurality of waveform components. For example, the UE 115-a may identify a set of subbands of the plurality of subbands that are associated with a successful result of the performed LBT, identify one or more waveform components based at least in part on the identified set of subbands, then select and combine the identified one or more waveform components.

At 335, UE 115-a may transmit a first waveform comprising the selected (e.g., combined) one or more waveform components during a first transmission time interval.

In some cases, as described herein, aspects of process flow 300 may be implemented by a base station 105-a for downlink transmission. For example, a base station 105-a may perform aspects of operations 315-325 for downlink transmissions (e.g., PDSCH transmissions) to UE 115-a.

Figure 4:
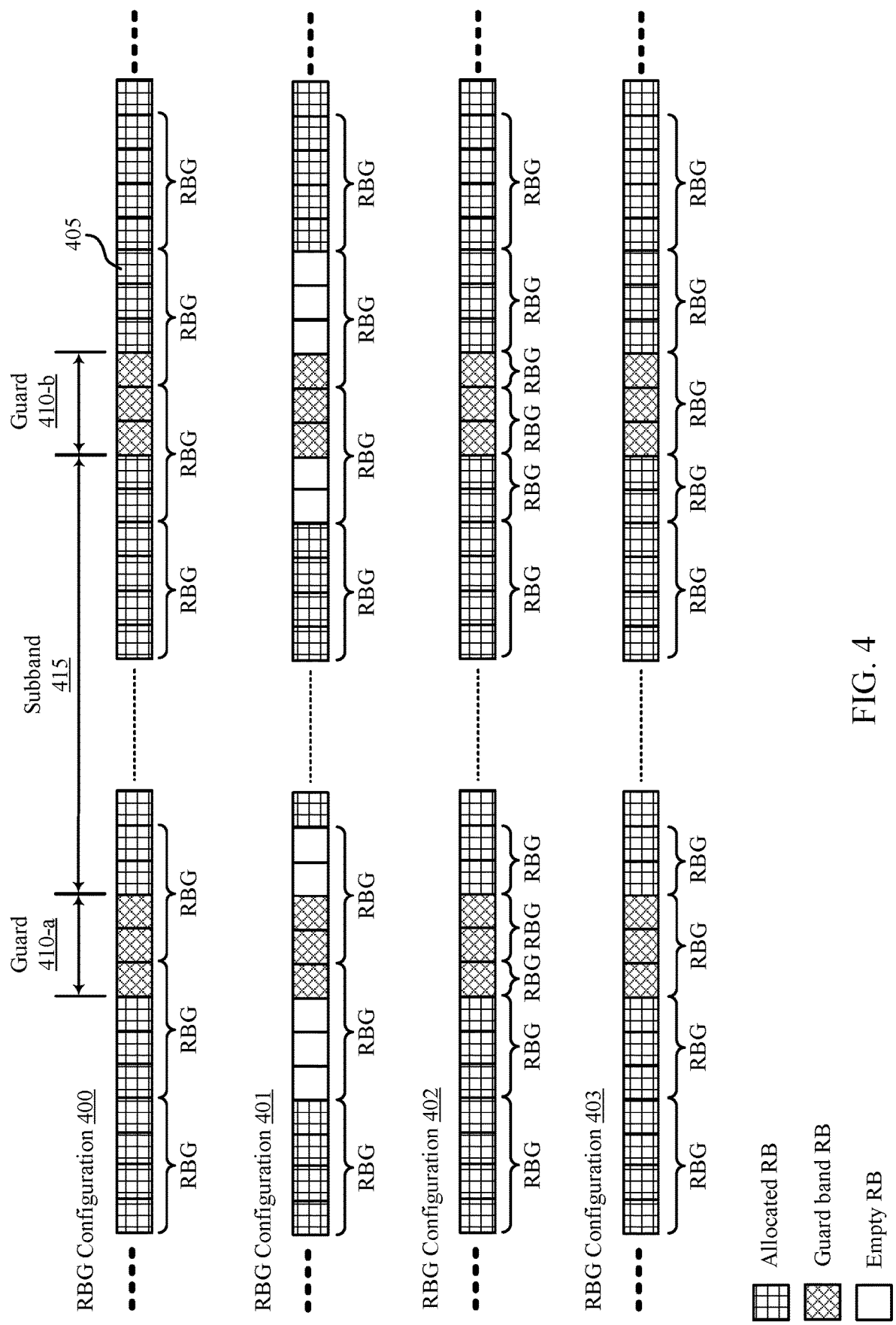
FIG. 4 illustrates example resource block group (RBG) configurations that support multiple component waveform generation for per subband LBT in accordance with aspects of the present disclosure.

FIG. 4 illustrates example RBG configurations 400, 401, 402, and 403 that support multiple component waveform generation for per subband LBT in accordance with aspects of the present disclosure. In some examples, RBG configurations 400, 401, 402, and 403 may be implemented or employed by wireless communications system 100. For example, RBG configurations 400, 401, 402, and/or 403 may be used within wireless communications system 100 to grant resources for, for example, PDSCH in accordance with various waveform components that may be transmitted by a base station 105. In some cases, a UE 115 may receive downlink signaling from a base station 105 that includes an uplink grant providing a resource allocation (e.g., according to RBG configuration 400, 401, 402, or 403) for an uplink transmission. The grant may indicate time and frequency resources (e.g., RBGs within an RBG configuration 400, 401, 402, or 403) allocated for an uplink transmission. In an example, the grant may identify a set of one or more RBGs for an uplink transmission, and each of the RBGs may include a set of RBs 405 (e.g., four RBs 405).

RBG configuration 400 may illustrate how one or more (e.g., three) RBs 405 may correspond to a guard band region (e.g., guard region 410-a and guard region 410-b which may separate subband 415 from adjacent subbands). In RBG configuration 400, an RBG may include RBs 405 that correspond to (e.g., overlap in frequency with) a guard band region. RBGs that include such guard band RBs 405 may thus not be allocable, as a device may be discouraged or not allowed to transmit in a guard band region.

As such, RBG configuration 401 may illustrate a configuration where RBGs that include guard band RBs 405 are not dropped from the resource allocation (e.g., are not allocated for a downlink or uplink transmission). For example, the remainder of RBGs that include guard band RBs 405 may be left empty (e.g., with empty RBs 405). Such an RBG configuration 401 may be a conservative approach where RBs are dropped (e.g., left empty, not allocated, etc.) in an RBG if the RBG includes RBs in a guard band that cannot be used (e.g., if the RBG includes guard band RBs 405).

RBG configuration 402 may illustrate a configuration where an RBG that would otherwise be across a guard band boundary (e.g., include RBs corresponding to a guard band region) is split into two RBGs. In such cases, a resource allocation may include an additional bit in a bitmap to assign, or not assign, the additional RBGs of the RBG definition (e.g., of the RBG configuration 402). In general, the RA bitmap may increase by one bit for each guard band boundary.

RBG configuration 403 may illustrate a configuration of a localized grid that is used for RBs 405 within a guard band region. For example, RBs 405 corresponding to a guard band region may be associated with their own RBG. That is, RBG configuration 403 may include RBGs including some number of RBs 405 (e.g., four) throughout a subband 415 up until a guard band boundary, where RBGs adjacent to either side of the guard band boundary may be truncated such that a localized RBG may comprise the guard band RBs 405.

In general, a base station may identify (e.g., and indicate to a UE) a guard band boundary, and the base station and UE may identify and employ an RBG configuration based on the guard band boundary indication (e.g., based on the location of the guard band, the number of RBs in a guard band, etc.). A base station may then grant resources (e.g., uplink or downlink resources) according to the RBG configuration that accounts for guard bands. In some cases, a base station may RRC configure the guard band boundaries (e.g., the location of the guard band, the number of RBs in a guard band, etc.), and the RBG definition may be adjusted (e.g., or identified, looked up, etc.) based on RBG configuration 402, RBG configuration 403, or some analogous RBG configuration. The length of the resource allocation field may also be determined based on the guard band boundary indication (e.g., as for each guard band, a new RBG may be added, and thus an additional bit may be included in the resource allocation indication). For example, a type 0 RA may use a bitmap with 1 bit to indicate each RBG (e.g., '1' for allocated, '0' for empty or not allocated). Each RBG may thus correspond to one bit in the resource allocation in DCI.

An RBG may be defined for the entire CC. In some cases, the RBG size may depend on the number of RBs 405 in the CC or bandwidth part (BWP). In FIG. 4, the x-axis may represent the frequency domain, and each block may represent an RB 405. In some cases, the location and/or size of a guard band may depend on the frequency or range of the operating bandwidth.

Figure 5:
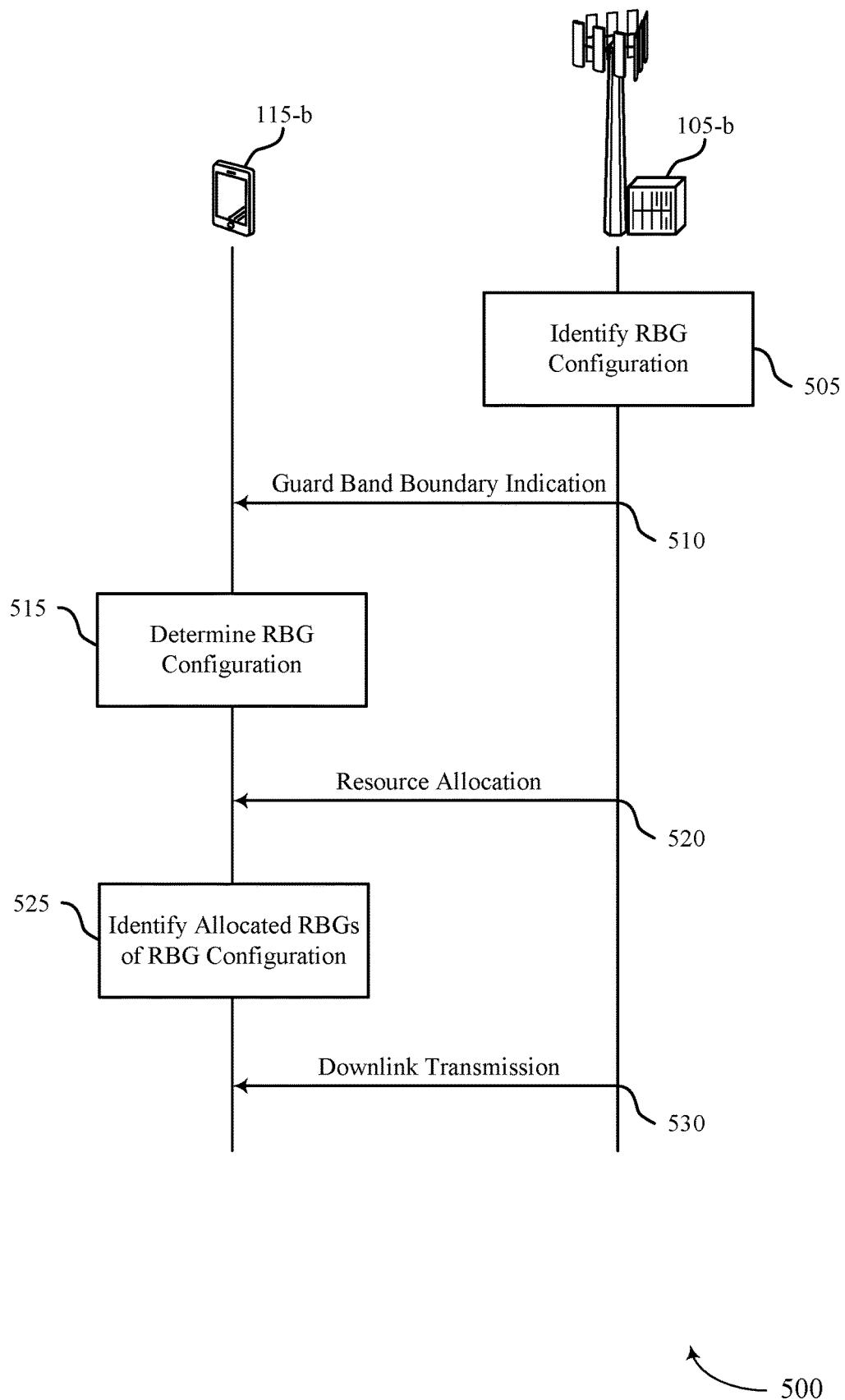
FIG. 5 illustrates an example of a process flow that supports multiple component waveform generation for per subband LBT in accordance with aspects of the present disclosure.

FIG. 5 illustrates an example process flow 500 that supports multiple component waveform generation for per subband LBT in accordance with aspects of the present disclosure. In some examples, process flow 500 may implement aspects of wireless communication system 100. Process flow 500 illustrates aspects of techniques performed by a base station 105-b and a UE 115-b, which may be an example of a base station 105 and a UE 115 described with reference to FIG. 1. In the following description of the process flow 500, the operations between the base station 105-b and the UE 115-b may be transmitted in a different order than the exemplary order shown, or the operations performed base station 105-b and UE 115-b may be performed in different orders or at different times. In some cases, certain operations may also be left out of the process flow 500, or other operations may be added to the process flow 500.

At 505, a base station 105-*b* may identify an RBG configuration based at least in part on one or more guard band boundaries for a plurality of subbands of a radio frequency spectrum band.

At 510, base station 105-*b* may transmit an indication of the one or more guard band boundaries. In some cases, the indication of the one or more guard band boundaries may be transmitted via RRC signaling.

At 515, UE 115-*b* may determine an RBG configuration based on the received indication of the one or more guard band boundaries.

At 520, base station 105-*b* may transmit a resource allocation to UE 115-*b*, where the resource allocation indicates one or more RBGs (e.g., based on the identified RBG configuration) for a downlink transmission for the UE 115-*b*. In some cases, a first bit in the resource allocation assigns a first RBG and a second bit in the resource allocation assigns a second RBG.

At 525, UE 115-*b* may identify one or more RBGs of the determined RBG configuration based on the received resource allocation (e.g., and the determined RBG configuration).

At 530, base station 105-*b* may transmit the downlink transmission on the indicated one or more RBGs, to the UE 115-*b*.

Figure 6:
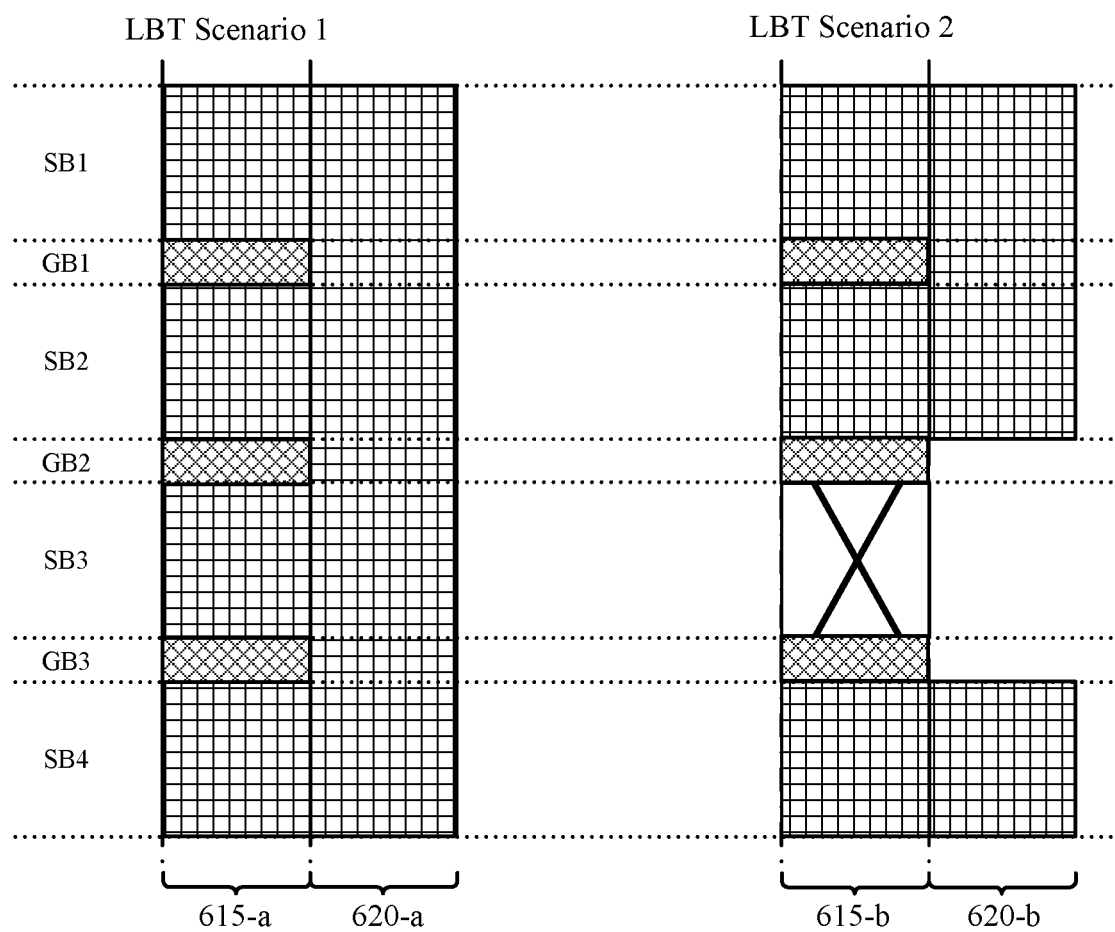
FIG. 6 illustrates an example of a transmission diagram that supports multiple component waveform generation for per subband LBT in accordance with aspects of the present disclosure.

FIG. 6 illustrates an example of a transmission diagram 600 that supports multiple component waveform generation for per subband LBT in accordance with aspects of the present disclosure. In some examples, transmission diagram 600 may be implemented by aspects of wireless communication system 100. As shown, transmission diagram 600 illustrates examples of reserved resource set usage for discontinuous resource allocation (e.g., due to the presence of guard bands).

To support type 1 RA, instead of changing the RBG definition around the guard band, a wireless communications system (e.g., a base station) may use a reserved resource set feature. For example, guard bands may be defined or indicated in a reserved resource set 605, and DCI may indicate the reserved resource set 605 is not used for the transmission (e.g., for the PDSCH). The UE may automatically remove the reserved resource set 605 from the resource allocation (e.g., an effectively rate match around the guard bands). Such techniques may be applicable for both type 0 RA and type 1 RA. A base station may preconfigure the reserved resource set 605 to the UE. For an initial slot (e.g., TTI 615) when the guard band is not prepared, the base station may indicate in the DCI that the reserved resource set 605 is not used (e.g., that the reserved resource set 605 is in effect, or is reserved). In a later slot (e.g., TTI 620), when the LBT result is known, the reserved resource set 605 may be used. In some cases, one reserved resource set 605 may be indicated for each guard band if separate control is needed.

For example, in cases where all subbands pass the LBT (e.g., LBT Scenario 1), PDSCH may be transmitted in a TTI 615-*a* without using reserved resource set 605 (e.g., and the base station may indicate that the reserved resource set 605 is not used in the DCI). In a second TTI 620-*a*, a base station may indicate the reserved resource set 605 is being used, and may allocate resources across the guard bands (e.g., allocated resource set 610 may span the entire CC, as all subbands passed the LBT). In LBT Scenario 2, a third subband may fail the LBT. In such cases, PDSCH may be transmitted in a TTI 615-*b* without using reserved resource set 605 (e.g., and the base station may indicate the reserved resource set 605 is not used in the DCI), and without subband 3 (e.g., as subband 3 failed the LBT). In a second TTI 620-*b*, a base station may indicate the reserved resource set 605 is being used, and may allocate resources across subbands 1 and 2, with the guard band in between, as well as across subband 4 (e.g., allocated resource set 610 may span subbands 1 and 2, with the guard band in between, as well as subband 4, as subbands 1, 2, and 4 passed the LBT).

Figure 7:
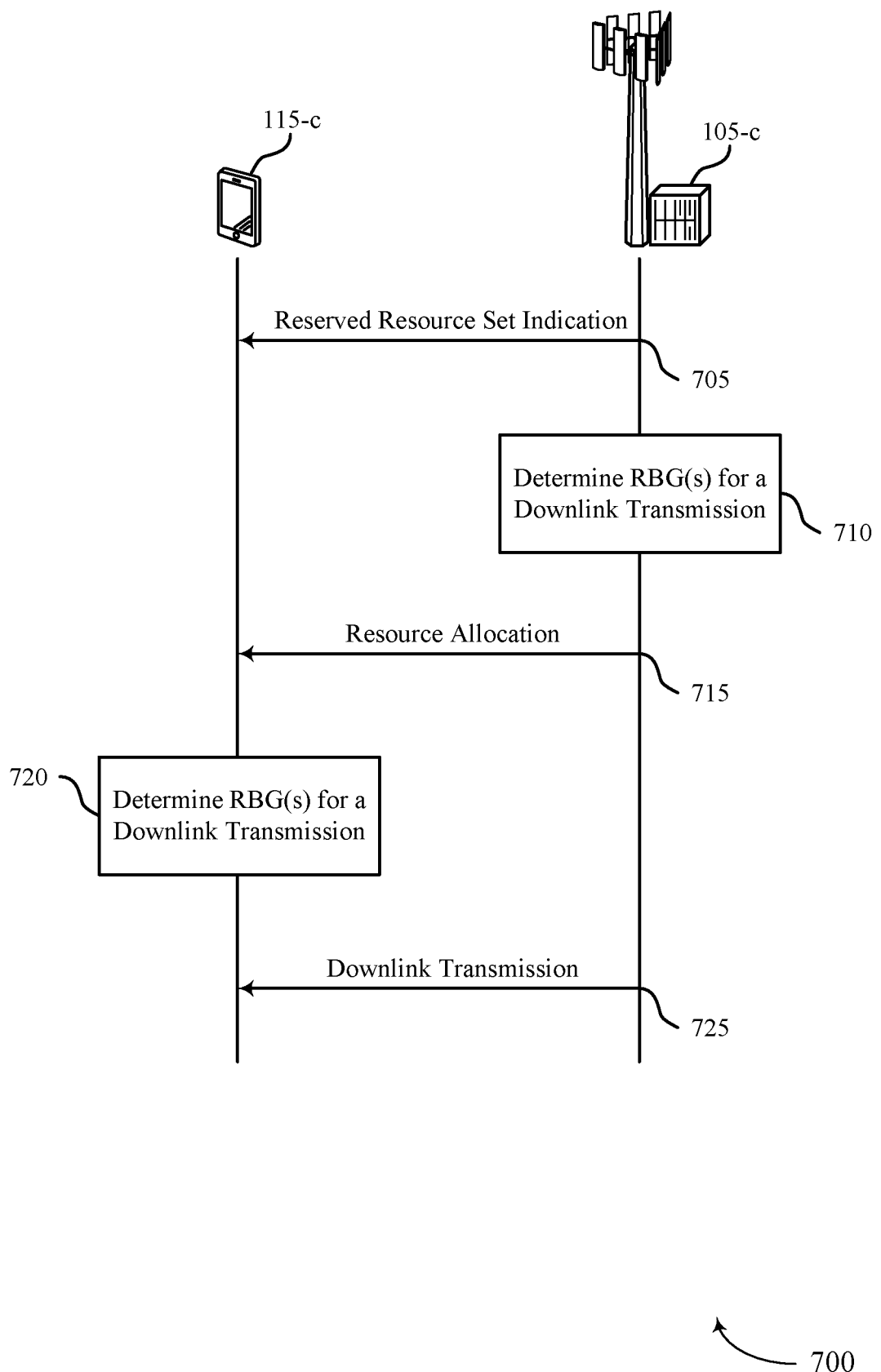
FIG. 7 illustrates an example of a process flow that supports multiple component waveform generation for per subband LBT in accordance with aspects of the present disclosure.

FIG. 7 illustrates an example process flow 700 that supports multiple component waveform generation for per subband LBT in accordance with aspects of the present disclosure. In some examples, process flow 700 may implement aspects of wireless communication system 100. Process flow 700 illustrates aspects of techniques performed by a base station 105-*c* and a UE 115-*c*, which may be an example of a base station 105 and a UE 115 described with reference to FIG. 1. In the following description of the process flow 700, the operations between the base station 105-*c* and the UE 115-*c* may be transmitted in a different order than the exemplary order shown, or the operations performed base station 105-*c* and UE 115-*c* may be performed in different orders or at different times. In some cases, certain operations may also be left out of the process flow 700, or other operations may be added to the process flow 700.

At 705, base station 105-*c* may transmit (e.g., to UE 115-*c*) an indication of a reserved resource set for one or more guard band boundaries for a plurality of subbands of a radio frequency spectrum band.

At 710, base station 105-*c* may determine one or more RBGs for a first downlink transmission for the UE 115-*c*. In some cases (e.g., for a TTI subsequent to a per subband LBT performed for a PDSCH transmission), the base station 105-*c* may exclude the reserved resource set from the determined one or more RBGs.

At 715, base station 105-*c* may transmit (e.g., to UE 115-*c*) a resource allocation indicating a set of RBGs to be used for the first downlink transmission, the resource allocation based on the indicated reserved resource set and the determined one or more RBGs.

At 720, UE 115-*c* may determine one or more RBGs for the first downlink transmission based on the reserved resource set and the indicated set of RBGs. In some cases, the UE 115-*c* may receive an indication (e.g., in DCI) that the reserved resource set is unallocated to the UE 115-*c* during a TTI, where the one or more RBGs for the downlink transmission may be determined based on the received indication that the reserved resource set is unallocated. In other cases, the UE 115-*c* may receive indication that the reserved resource set is allocated to the UE 115-*c* during a TTI, where the one or more RBGs for the first downlink transmission are determined based on the received indication that the reserved resource set is allocated.

At 725, base station 105-*c* may transmit the first downlink transmission during the TTI, on the determined one or more RBGs, to UE 115-*c*. In some cases, the one or more RBGs may include, or not include, the reserved resource set depending on whether or not the base station 105-*c* indicates the reserved resource set is allocated to the UE 115-*c* for the particular TTI.

Figure 8:
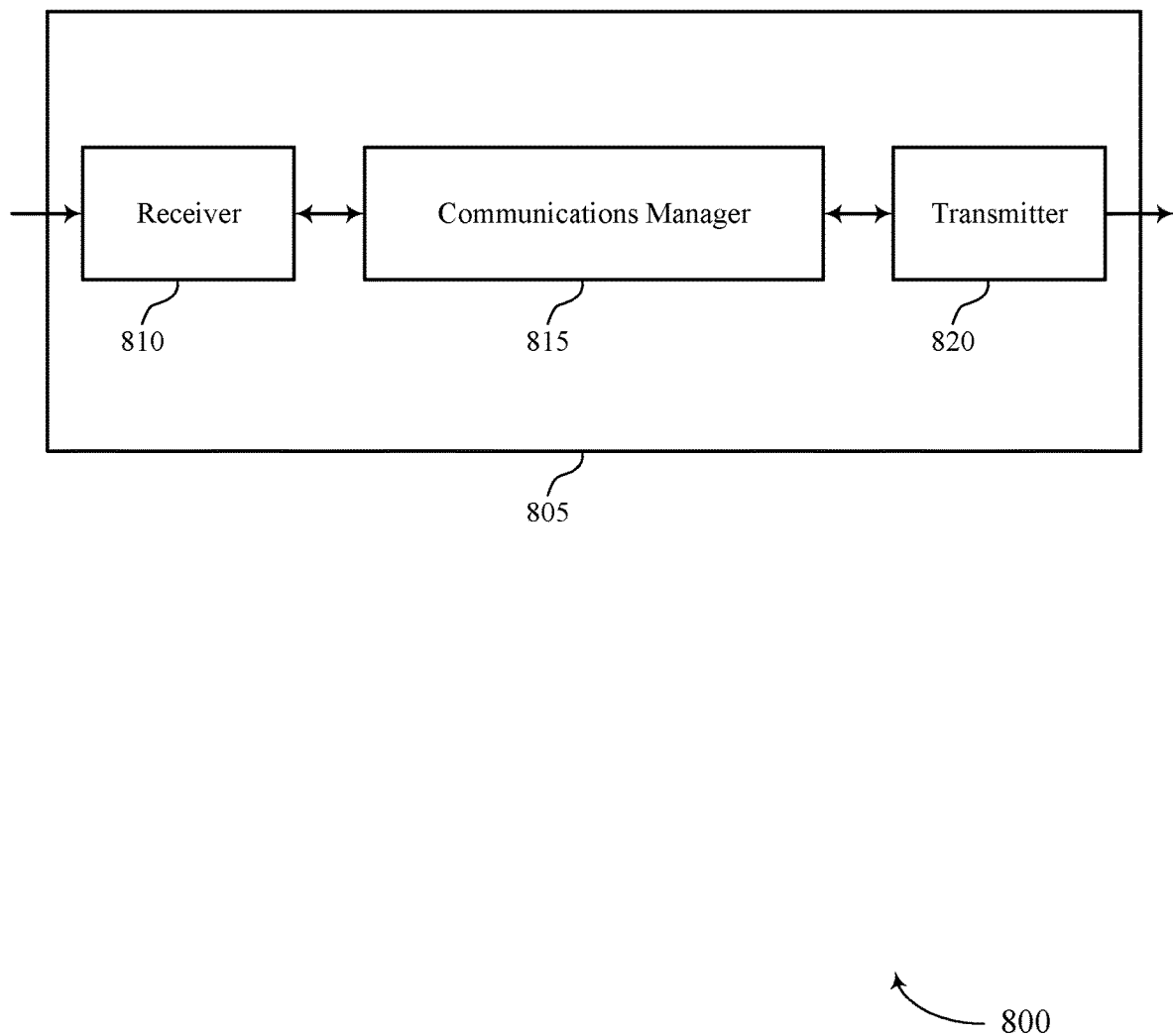
FIGS. 8 and 9 show block diagrams of devices that support multiple component waveform generation for per subband LBT in accordance with aspects of the present disclosure.

FIG. 8 shows a block diagram 800 of a device 805 that supports multiple component waveform generation for per subband LBT in accordance with aspects of the present disclosure. The device 805 may be an example of aspects of a UE 115 as described herein. The device 805 may include a receiver 810, a communications manager 815, and a transmitter 820. The device 805 may also include one or more processors, memory coupled with the one or more processors, and instructions stored in the memory that are executable by the one or more processors to enable the one or more processors to perform the waveform generation features discussed herein. Each of these components may be in communication with one another (e.g., via one or more buses).

The receiver 810 may receive information such as packets, user data, or control information associated with various information channels (e.g., control channels, data channels, and information related to multiple component waveform generation for per subband LBT, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a resource allocation for an uplink transmission by the UE, the resource allocation indicating a set of subbands of a radio frequency spectrum band, identify a set of waveform components for the uplink transmission based on a waveform generation capability of the UE and the indicated set of subbands, perform an LBT procedure for the set of subbands, select, based on a result of the performed LBT procedure, one or more waveform components of the identified set of waveform components, and transmit a first waveform including the selected one or more waveform components during a first TTI.

The communications manager 815 may also receive an indication of one or more guard band boundaries for a set of subbands of a radio frequency spectrum band, determine a RBG configuration based on the received indication of the one or more guard band boundaries, receive a resource allocation for a downlink transmission, identify, based on the received resource allocation, one or more RBGs of the determined RBG configuration, and receive the downlink transmission on the identified one or more RBGs.

The communications manager 815 may also receive an indication of a reserved resource set for one or more guard band boundaries for a set of subbands of a radio frequency spectrum band, receive a resource allocation indicating a set of RBGs to be used for a first downlink transmission, determine one or more RBGs for the first downlink transmission based on the reserved resource set and the indicated set of RBGs, and receive, on the determined one or more RBGs, the first downlink transmission during a TTI. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 815 as described herein may be implemented to realize one or more potential advantages. One implementation may provide for improved shared spectrum, subband based, medium access. For example, preparation of waveform components of a wideband CC transmission prior to LBT procedure conclusion may reduce channel access latency, which may result in improved system throughput and enhanced system efficiency.

Further, aspects of the present disclosure may allow for waveform component preparation and implementation by devices of varying capabilities, and may provide mechanisms to reduce signaling overhead, which may result in less processing operations of the device 805, improving power savings and increasing battery life.

Figure 9:
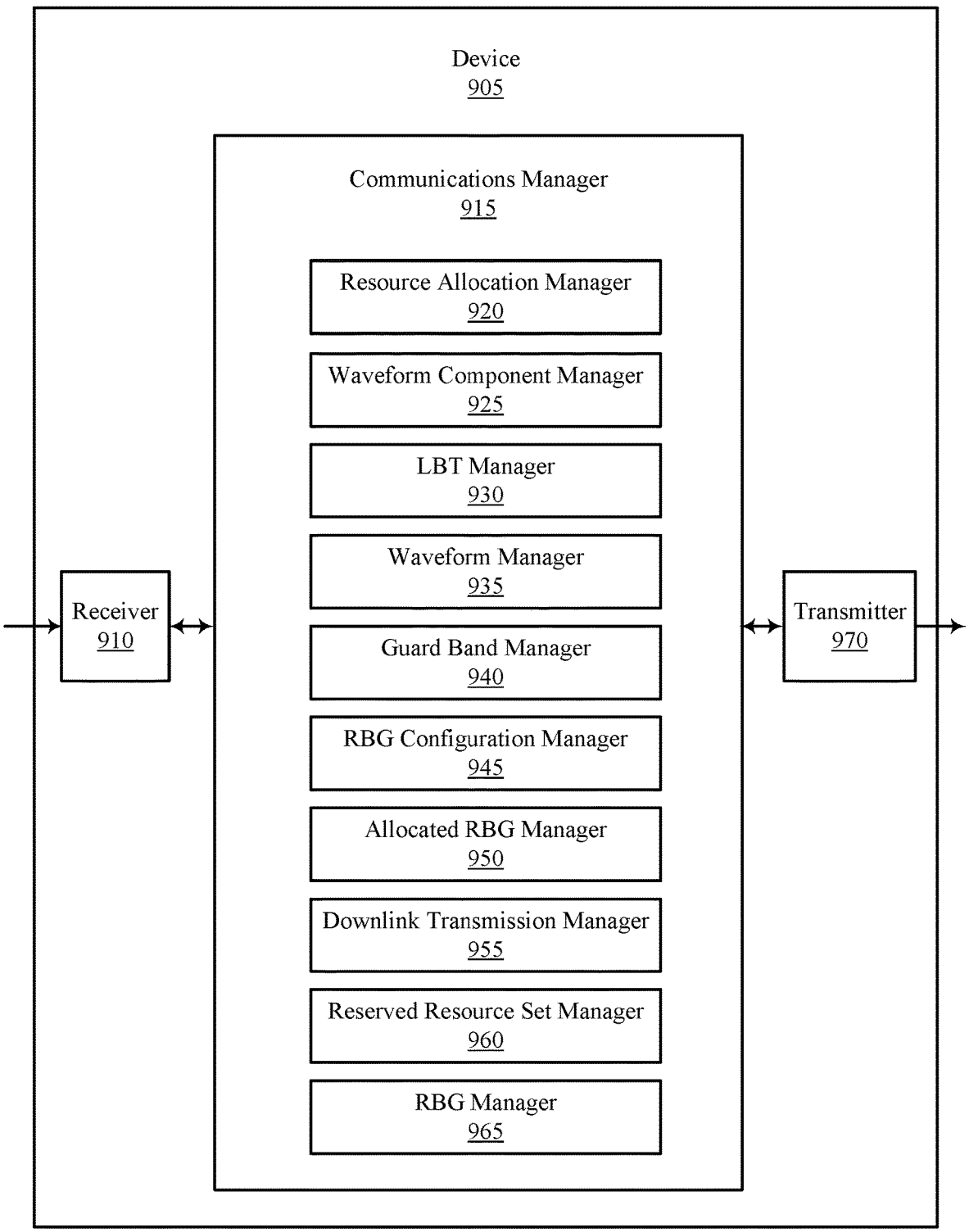

FIG. 9 shows a block diagram 900 of a device 905 that supports multiple component waveform generation for per subband LBT in accordance with aspects of the present disclosure. The device 905 may be an example of aspects of a device 805, or a UE 115 as described herein. The device 905 may include a receiver 910, a communications manager 915, and a transmitter 970. The device 905 may also include a processor. Each of these components may be in communication with one another (e.g., via one or more buses).

The receiver 910 may receive information such as packets, user data, or control information associated with various information channels (e.g., control channels, data channels, and information related to multiple component waveform generation for per subband LBT, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a resource allocation manager 920, a waveform component manager 925, an LBT manager 930, a waveform manager 935, a guard band manager 940, an RBG configuration manager 945, an allocated RBG manager 950, a downlink transmission manager 955, a reserved resource set manager 960, and an RBG manager 965. The communications manager 915 may be an example of aspects of the communications manager 1110 described herein.

The resource allocation manager 920 may receive a resource allocation for an uplink transmission by the UE, the resource allocation indicating a set of subbands of a radio frequency spectrum band. The waveform component manager 925 may identify a set of waveform components for the uplink transmission based on a waveform generation capability of the UE and the indicated set of subbands. The LBT manager 930 may perform an LBT procedure for the set of subbands. The waveform component manager 925 may select, based on a result of the performed LBT procedure, one or more waveform components of the identified set of waveform components. The waveform manager 935 may transmit a first waveform including the selected one or more waveform components during a first TTI.

The guard band manager 940 may receive an indication of one or more guard band boundaries for a set of subbands of a radio frequency spectrum band. The RBG configuration manager 945 may determine a RBG configuration based on the received indication of the one or more guard band boundaries. The resource allocation manager 920 may receive a resource allocation for a downlink transmission. The allocated RBG manager 950 may identify, based on the received resource allocation, one or more RBGs of the determined RBG configuration. The downlink transmission manager 955 may receive the downlink transmission on the identified one or more RBGs.

The reserved resource set manager 960 may receive an indication of a reserved resource set for one or more guard band boundaries for a set of subbands of a radio frequency spectrum band. The resource allocation manager 920 may receive a resource allocation indicating a set of RBGs to be used for a first downlink transmission. The RBG manager 965 may determine one or more RBGs for the first downlink transmission based on the reserved resource set and the indicated set of RBGs. The downlink transmission manager 955 may receive, on the determined one or more RBGs, the first downlink transmission during a TTI.

The transmitter 970 may transmit signals generated by other components of the device 905. In some examples, the transmitter 970 may be collocated with a receiver 910 in a transceiver module. For example, the transmitter 970 may be an example of aspects of the transceiver 1120 described with reference to FIG. 11. The transmitter 970 may utilize a single antenna or a set of antennas.

In some cases, the resource allocation manager 920, the wafeform component manager 925, the LBT manager 930, the waveform manager 935, the guard band manager 940, the RBG configuration manager 945, the allocated RBG manager 950, the downlink transmission manager 955, the reserved resource set manager 960, and the RBG manager 965 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the resource allocation manager 920, the wafeform component manager 925, the LBT manager 930, the waveform manager 935, the guard band manager 940, the RBG configuration manager 945, the allocated RBG manager 950, the downlink transmission manager 955, the reserved resource set manager 960, and the RBG manager 965 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 10:
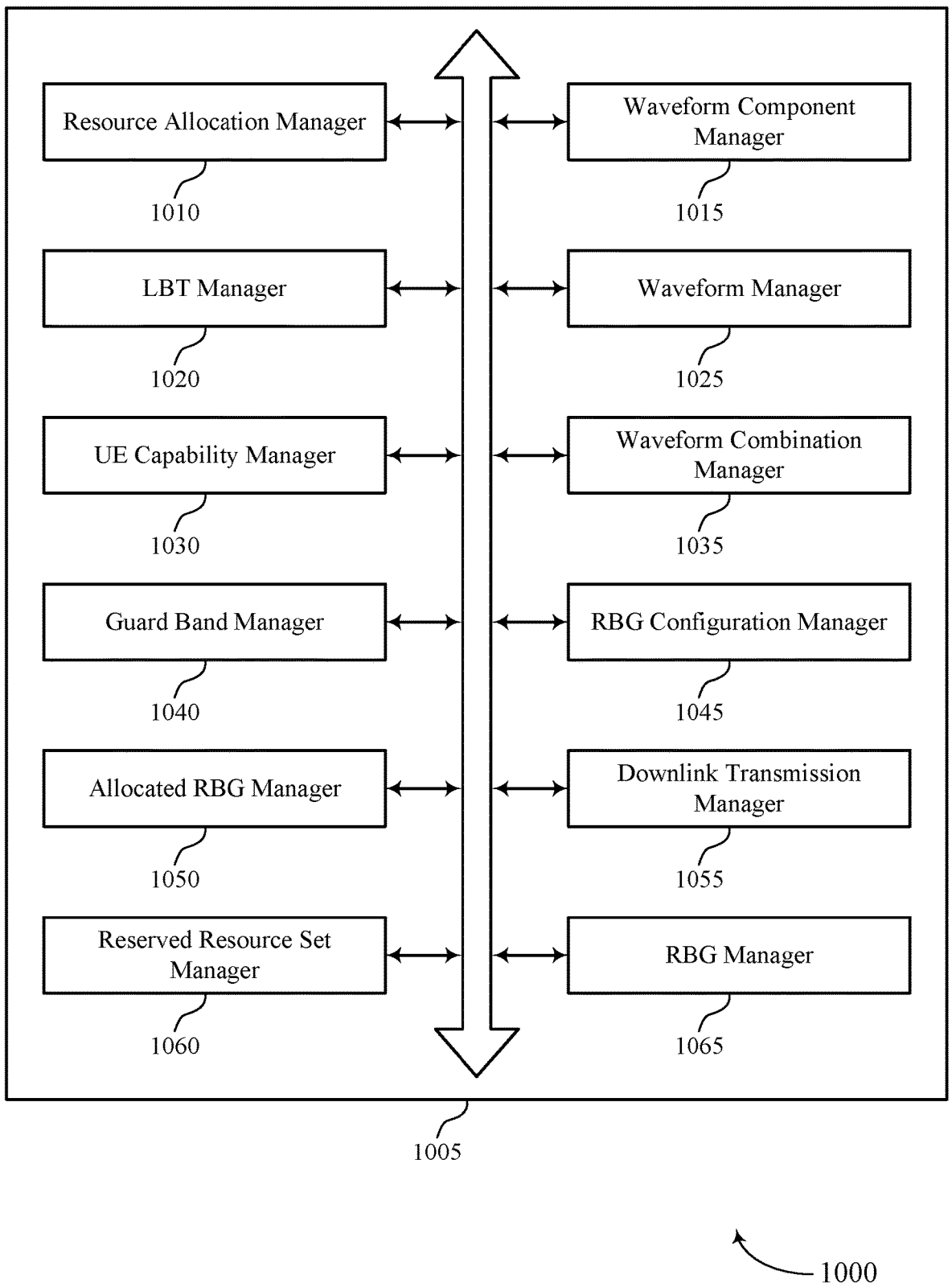
FIG. 10 shows a block diagram of a communications manager that supports multiple component waveform generation for per subband LBT in accordance with aspects of the present disclosure.

FIG. 10 shows a block diagram 1000 of a communications manager 1005 that supports multiple component waveform generation for per subband LBT in accordance with aspects of the present disclosure. The communications manager 1005 may be an example of aspects of a communications manager 815, a communications manager 915, or a communications manager 1110 described herein. The communications manager 1005 may include a resource allocation manager 1010, a waveform component manager 1015, an LBT manager 1020, a waveform manager 1025, a UE capability manager 1030, a waveform combination manager 1035, a guard band manager 1040, an RBG configuration manager 1045, an allocated RBG manager 1050, a downlink transmission manager 1055, a reserved resource set manager 1060, and an RBG manager 1065. Each of these modules may communicate, directly or indirectly, with one another (e.g., via one or more buses).

The resource allocation manager 1010 may receive a resource allocation for an uplink transmission by the UE, the resource allocation indicating a set of subbands of a radio frequency spectrum band. In some examples, the resource allocation manager 1010 may receive a resource allocation for a downlink transmission. In some examples, the resource allocation manager 1010 may receive a resource allocation indicating a set of resRBGs to be used for a first downlink transmission. In some cases, a first bit in the resource allocation assigns the first RBG and a second bit in the resource allocation assigns the second RBG.

The waveform component manager 1015 may identify a set of waveform components for the uplink transmission based on a waveform generation capability of the UE and the indicated set of subbands. In some examples, the waveform component manager 1015 may determine, according to the waveform generation capability, the resource allocation for the uplink transmission, and an LBT requirement for the uplink transmission, a set of waveform components to pre-generate before the LBT procedure is performed. In some examples, the waveform component manager 1015 may select, based on a result of the performed LBT procedure, one or more waveform components of the identified set of waveform components. In some examples, the waveform component manager 1015 may identify the selected one or more waveform components based on the identified set of subbands. In some examples, the waveform component manager 1015 may select, for each subband of the set of subbands, a waveform component of the identified set of waveform components that corresponds to the subband. In some examples, the waveform component manager 1015 may select, for each subband of the first subset of the set of subbands that pass the LBT procedure, a waveform component of the identified set of waveform components that corresponds to the subband. In some examples, the waveform component manager 1015 may exclude, for each subband of the second subset of the plurality of subbands that fail the listen before talk procedure, a waveform component of the identified plurality of waveform components that corresponds to the subband. In some examples, the waveform component manager 1015 may exclude, for each subband of the second subset of the set of subbands that fail the LBT procedure, a waveform component of the identified set of waveform components that corresponds to one or more guard bands adjacent to the subband. In some examples, the waveform component manager 1015 may select, for each set of adjacent subbands of the first subset of the set of subbands that pass the LBT procedure, a waveform component of the identified set of waveform components that corresponds to a guard band between the set of adjacent subbands. In some examples, the waveform component manager 1015 may identify data for the uplink transmission from an upper layer. In some examples, the waveform component manager 1015 may encode the identified data. In some examples, the waveform component manager 1015 may modulate the encoded data to generate the set of waveform components. In some examples, the waveform component manager 1015 may store the generated set of waveform components in a memory of the UE prior to determining the result of the LBT procedure performed for the set of subbands.

In some cases, the waveform generation capability represents at least a number of waveform components that the UE is capable of generating. In some cases, each waveform component of the set of waveform components corresponds to allocated resources of the resource allocation in a subband of the set of subbands, or allocated resources of the resource allocation in a guard band between two subbands of the set of subbands, or a combination thereof. In some cases, the set of waveform components include a first waveform component, where the first waveform component includes two contiguous subbands of the set of subbands and a guard band between the two contiguous subbands. In some cases, the set of waveform components include, for each subband of the set of subbands, a waveform component corresponding to the subband and exclusive of a guard band.

The LBT manager 1020 may perform a LBT procedure for the set of subbands. In some examples, the LBT manager 1020 may identify a set of subbands of the set of subbands that are associated with a successful result of the performed LBT procedure. In some examples, determining that the two contiguous subbands are associated with a successful result of the performed LBT procedure, where the selected one or more waveform components includes the first waveform component based on the determining. In some examples, the LBT manager 1020 may identify that the set of subbands pass the performed listen before talk procedure. In some examples, the LBT manager 1020 may identify that a first subset of the set of subbands pass the LBT procedure and a second subset of the set of subbands fail the LBT procedure.

The waveform manager 1025 may transmit a first waveform including the selected one or more waveform components during a first TTI. The guard band manager 1040 may receive an indication of one or more guard band boundaries for a set of subbands of a radio frequency spectrum band. In some examples, the guard band manager 1040 may identify, based on the identified indication for the one or more guard band boundaries, one or more RBs associated with a guard band. In some examples, the guard band manager 1040 may receive RRC signaling including the indication of the one or more guard band boundaries for the set of subbands.

The RBG configuration manager 1045 may determine a RBG configuration based on the received indication of the one or more guard band boundaries. In some examples, the RBG configuration manager 1045 may identify, based on the received indication of the one or more guard band boundaries, a RBG of the identified one or more RBGs associated with a guard band. In some examples, splitting the RBG associated with the guard band boundary into a first RBG including one or more RBs of the RBG in a subband region and a second RBG including one or more RBs of the RBG in a guard band, where the determined RBG configuration includes the first RBG and the second RBG.

In some examples, the RBG configuration manager 1045 may reduce the size of the RBG associated with the guard band boundary to include one or more RBs of the RBG that are in a subband region. In some examples, the RBG configuration manager 1045 may collect one or more continuous RBs of the RBG in a guard band into a second set of RBGs using a same RBG size with one bit in the resource allocation for each new RBG in the second set of RBGs. In some examples, the RBG configuration manager 1045 may identify one or more RBGs including the one or more RBs. In some examples, the RBG configuration manager 1045 may drop the identified one or more RBGs, where the determined RBG configuration excludes the dropped one or more RBGs.

The allocated RBG manager 1050 may identify, based on the received resource allocation, one or more RBGs of the determined RBG configuration.

The downlink transmission manager 1055 may receive the downlink transmission on the identified one or more RBGs. In some examples, the downlink transmission manager 1055 may receive, on the determined one or more RBGs, the first downlink transmission during a TTI.

The reserved resource set manager 1060 may receive an indication of a reserved resource set for one or more guard band boundaries for a set of subbands of a radio frequency spectrum band. In some examples, the reserved resource set manager 1060 may receive an indication that the reserved resource set is unallocated to the UE during the TTI, where the one or more RBGs for the first downlink transmission are determined based on the received indication that the reserved resource set is unallocated. In some examples, the reserved resource set manager 1060 may receive an indication that the reserved resource set is allocated to the UE during a TTI, where the one or more RBGs for the first downlink transmission are determined based on the received indication that the reserved resource set is allocated.

The RBG manager 1065 may determine one or more RBGs for the first downlink transmission based on the reserved resource set and the indicated set of RBGs. In some examples, the RBG manager 1065 may remove the reserved resource set from the indicated set of RBGs.

The UE capability manager 1030 may transmit, to the base station, a UE capability report indicating the waveform generation capability of the UE.

The waveform combination manager 1035 may combine the selected one or more waveform components, where the first waveform is based on the combining. In some examples, the waveform combination manager 1035 may include a waveform component corresponding to a resource in a guard band in one waveform component of the identified set of waveform components for the uplink transmission based on a first subband adjacent the guard band and a second subband adjacent the guard band being included in the one waveform component.

In some cases, the resource allocation manager 1010, the waveform component manager 1015, the LBT manager 1020, the waveform manager 1025, the UE capability manager 1030, the waveform combination manager 1035, the guard band manager 1040, the RBG configuration manager 1045, the allocated RBG manager 1050, the downlink transmission manager 1055, the reserved resource set manager 1060, and the RBG manager 1065 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the resource allocation manager 1010, the waveform component manager 1015, the LBT manager 1020, the waveform manager 1025, the UE capability manager 1030, the waveform combination manager 1035, the guard band manager 1040, the RBG configuration manager 1045, the allocated RBG manager 1050, the downlink transmission manager 1055, the reserved resource set manager 1060, and the RBG manager 1065 discussed herein.

Figure 11:
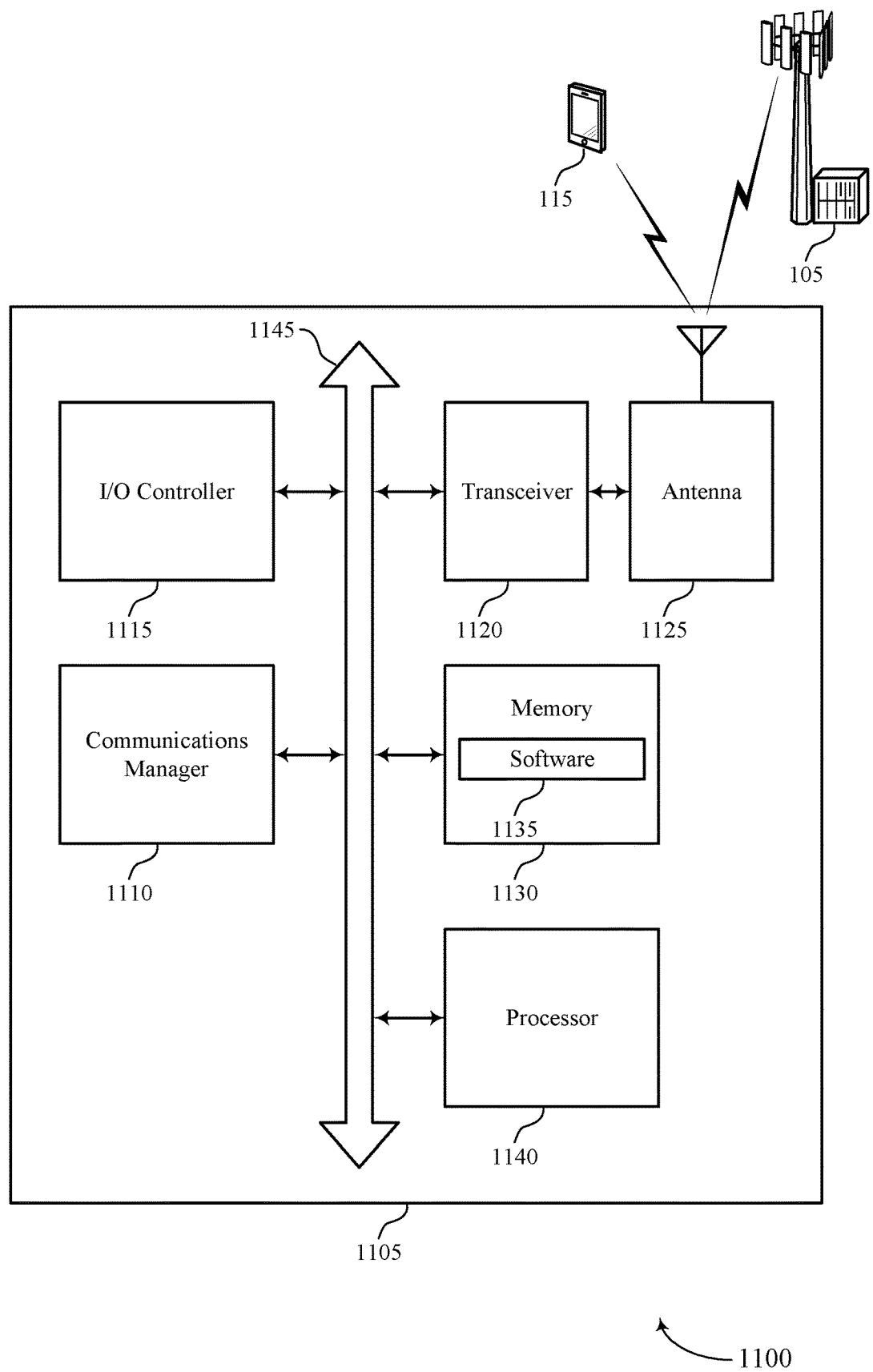
FIG. 11 shows a diagram of a system including a device that supports multiple component waveform generation for per subband LBT in accordance with aspects of the present disclosure.

FIG. 11 shows a diagram of a system 1100 including a device 1105 that supports multiple component waveform generation for per subband LBT in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a resource allocation for an uplink transmission by the UE, the resource allocation indicating a set of subbands of a radio frequency spectrum band, identify a set of waveform components for the uplink transmission based on a waveform generation capability of the UE and the indicated set of subbands, perform an LBT procedure for the set of subbands, select, based on a result of the performed LBT procedure, one or more waveform components of the identified set of waveform components, and transmit a first waveform including the selected one or more waveform components during a first TTI.

The communications manager 1110 may also receive an indication of one or more guard band boundaries for a set of subbands of a radio frequency spectrum band, determine a RBG configuration based on the received indication of the one or more guard band boundaries, receive a resource allocation for a downlink transmission, identify, based on the received resource allocation, one or more RBGs of the determined RBG configuration, and receive the downlink transmission on the identified one or more RBGs.

The communications manager 1110 may also receive an indication of a reserved resource set for one or more guard band boundaries for a set of subbands of a radio frequency spectrum band, receive a resource allocation indicating a set of RBGs to be used for a first downlink transmission, determine one or more RBGs for the first downlink transmission based on the reserved resource set and the indicated set of RBGs, and receive, on the determined one or more RBGs, the first downlink transmission during a TTI.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code or software 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting multiple component waveform generation for per subband LBT).

The software 1135 may include instructions to implement aspects of the present disclosure, including instructions to support wireless communications. The software 1135 may be stored in a non-transitory computer-readable medium such as system memory or other type of memory. In some cases, the software 1135 may not be directly executable by the processor 1140 but may cause a computer (e.g., when compiled and executed) to perform functions described herein.

Figure 12:
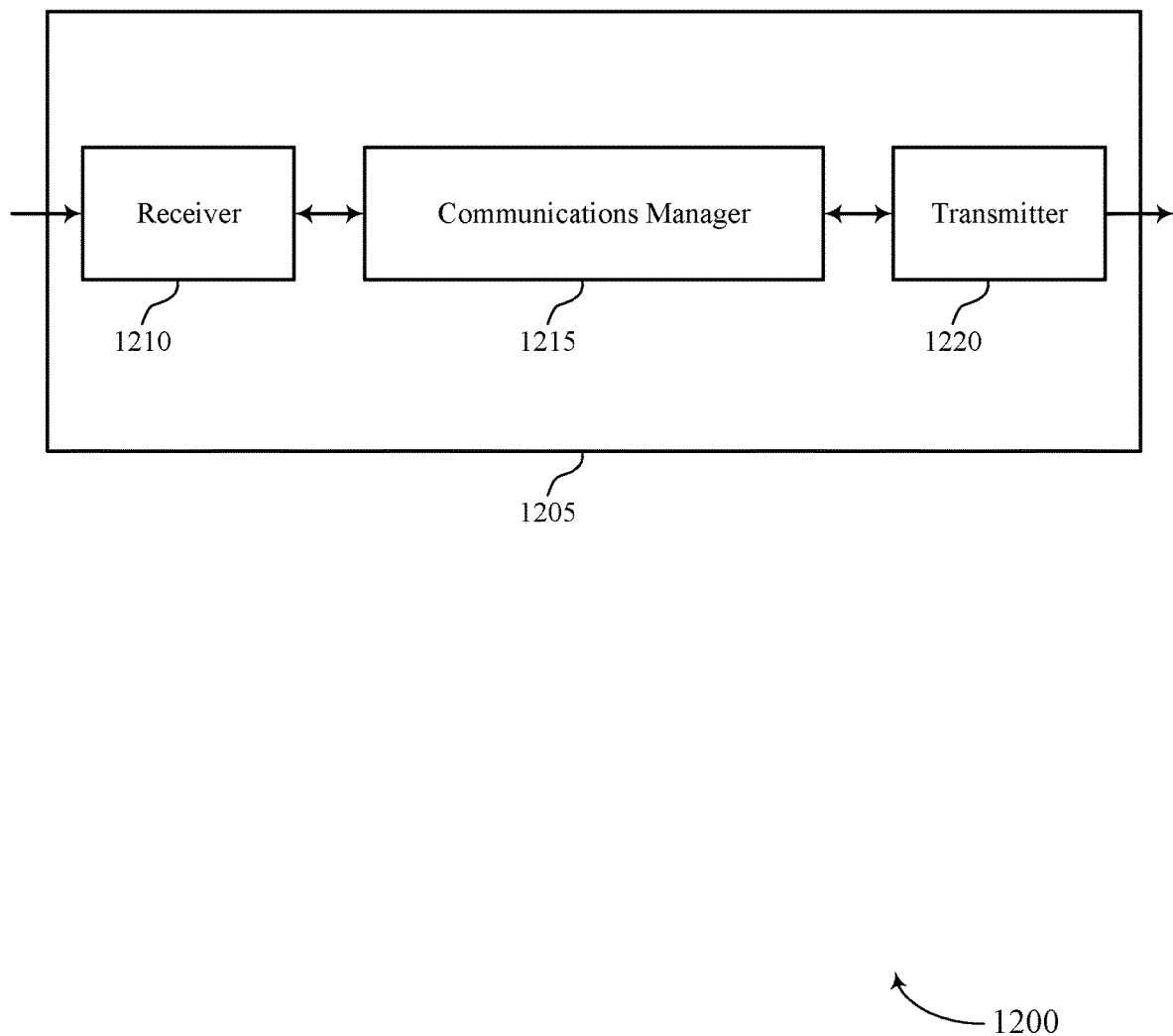
FIGS. 12 and 13 show block diagrams of devices that support multiple component waveform generation for per subband LBT in accordance with aspects of the present disclosure.

FIG. 12 shows a block diagram 1200 of a device 1205 that supports multiple component waveform generation for per subband LBT in accordance with aspects of the present disclosure. The device 1205 may be an example of aspects of a base station 105 as described herein. The device 1205 may include a receiver 1210, a communications manager 1215, and a transmitter 1220. The device 1205 may also include one or more processors, memory coupled with the one or more processors, and instructions stored in the memory that are executable by the one or more processors to enable the one or more processors to perform the waveform generation features discussed herein. Each of these components may be in communication with one another (e.g., via one or more buses).

The receiver 1210 may receive information such as packets, user data, or control information associated with various information channels (e.g., control channels, data channels, and information related to multiple component waveform generation for per subband LBT, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may receive a UE capability report indicating a waveform generation capability of the UE, transmit a resource allocation indicating a set of subbands for an uplink transmission, identify, based on the waveform generation capability of the UE and the transmitted resource allocation, a set of uplink waveform hypotheses, and receive the uplink transmission based on at least one of the identified set of uplink waveform hypotheses.

The communications manager 1215 may also identify a set of subbands for a downlink transmission, identify a set of waveform components for the downlink transmission based on a waveform generation capability of the base station and the identified set of subbands, perform an LBT procedure for the set of subbands, select, based on a result of the performed LBT procedure, one or more waveform components of the identified set of waveform components, and transmit a first waveform including the selected one or more waveform components during a first TTI.

The communications manager 1215 may also identify a RBG configuration based on one or more guard band boundaries for a set of subbands of a radio frequency spectrum band, transmit a resource allocation to a UE, where the resource allocation indicates, based on the identified RBG configuration, one or more RBGs for a downlink transmission for the UE, and transmit, to the UE, the downlink transmission on the indicated one or more RBGs.

The communications manager 1215 may also transmit, to a UE, an indication of a reserved resource set for one or more guard band boundaries for a set of subbands of a radio frequency spectrum band, determine one or more RBGs for a first downlink transmission for the UE, transmit a resource allocation indicating a set of RBGs to be used for the first downlink transmission, the resource allocation based on the indicated reserved resource set and the determined one or more resourRBGs, and transmit, on the determined one or more RBGs, the first downlink transmission during a TTI. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
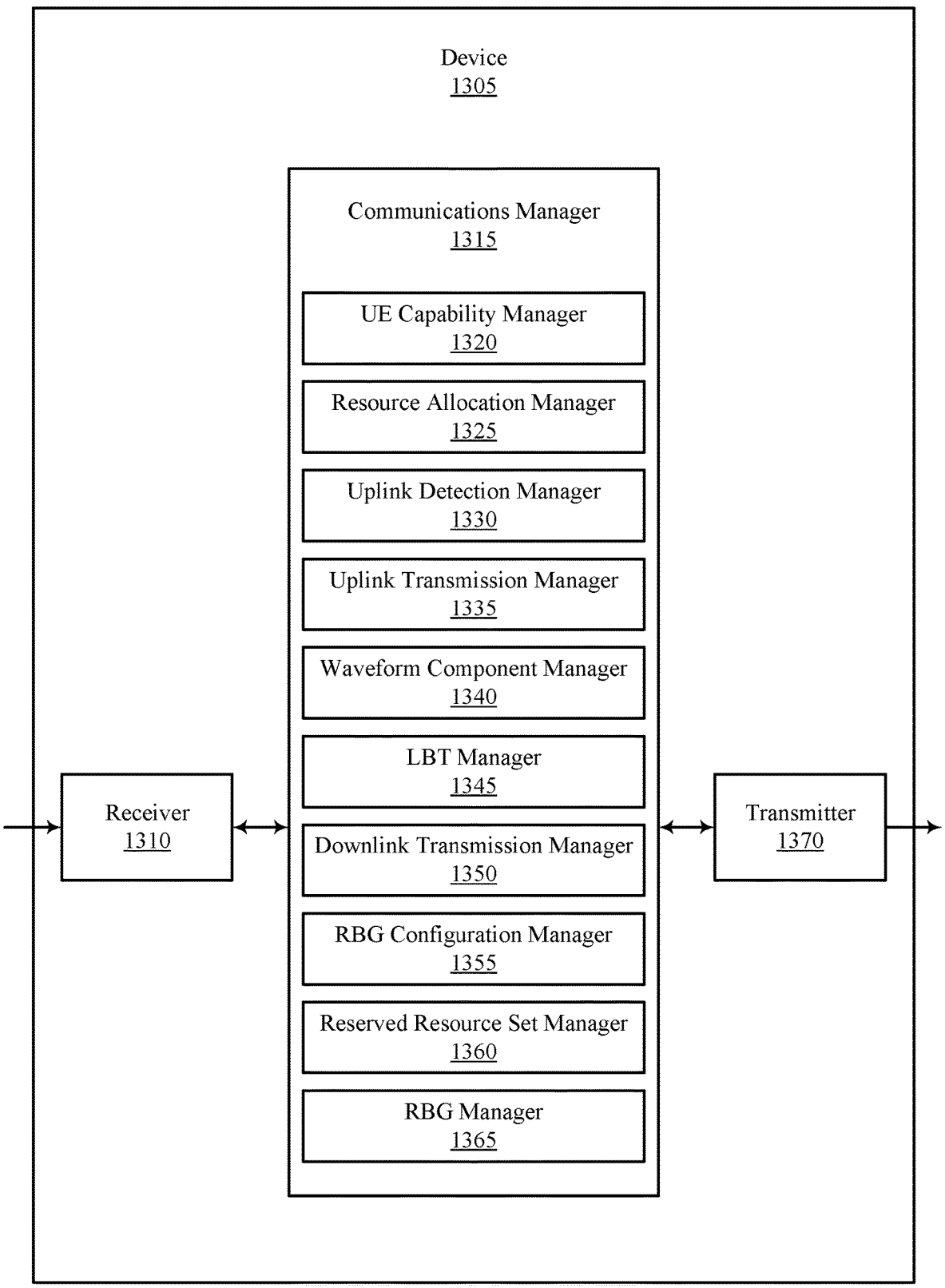

FIG. 13 shows a block diagram 1300 of a device 1305 that supports multiple component waveform generation for per subband LBT in accordance with aspects of the present disclosure. The device 1305 may be an example of aspects of a device 1205, or a base station 105 as described herein. The device 1305 may include a receiver 1310, a communications manager 1315, and a transmitter 1370. The device 1305 may also include a processor. Each of these components may be in communication with one another (e.g., via one or more buses).

The receiver 1310 may receive information such as packets, user data, or control information associated with various information channels (e.g., control channels, data channels, and information related to multiple component waveform generation for per subband LBT, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a UE capability manager 1320, a resource allocation manager 1325, an uplink detection manager 1330, an uplink transmission manager 1335, a waveform component manager 1340, an LBT manager 1345, a downlink transmission manager 1350, an RBG configuration manager 1355, a reserved resource set manager 1360, and an RBG manager 1365. The communications manager 1315 may be an example of aspects of the communications manager 1510 described herein.

The UE capability manager 1320 may receive a UE capability report indicating a waveform generation capability of the UE. The resource allocation manager 1325 may transmit a resource allocation indicating a set of subbands for an uplink transmission. The uplink detection manager 1330 may identify, based on the waveform generation capability of the UE and the transmitted resource allocation, a set of uplink waveform hypotheses. The uplink transmission manager 1335 may receive the uplink transmission based on at least one of the identified set of uplink waveform hypotheses. The resource allocation manager 1325 may identify a set of subbands for a downlink transmission.

The waveform component manager 1340 may identify a set of waveform components for the downlink transmission based on a waveform generation capability of the base station and the identified set of subbands. The LBT manager 1345 may perform an LBT procedure for the set of subbands. The waveform component manager 1340 may select, based on a result of the performed LBT procedure, one or more waveform components of the identified set of waveform components. The downlink transmission manager 1350 may transmit a first waveform including the selected one or more waveform components during a first TTI.

The RBG configuration manager 1355 may identify a RBG configuration based on one or more guard band boundaries for a set of subbands of a radio frequency spectrum band. The resource allocation manager 1325 may transmit a resource allocation to a UE, where the resource allocation indicates, based on the identified RBG configuration, one or more RBGs for a downlink transmission for the UE. The downlink transmission manager 1350 may transmit, to the UE, the downlink transmission on the indicated one or more RBGs.

The reserved resource set manager 1360 may transmit, to a UE, an indication of a reserved resource set for one or more guard band boundaries for a set of subbands of a radio frequency spectrum band. The RBG manager 1365 may determine one or more RBGs for a first downlink transmission for the UE. The resource allocation manager 1325 may transmit a resource allocation indicating a set of RBGs to be used for the first downlink transmission, the resource allocation based on the indicated reserved resource set and the determined one or more RBGs. The downlink transmission manager 1350 may transmit, on the determined one or more RBGs, the first downlink transmission during a TTI.

The transmitter 1370 may transmit signals generated by other components of the device 1305. In some examples, the transmitter 1370 may be collocated with a receiver 1310 in a transceiver module. For example, the transmitter 1370 may be an example of aspects of the transceiver 1520 described with reference to FIG. 15. The transmitter 1370 may utilize a single antenna or a set of antennas.

In some cases, the UE capability manager 1320, the resource allocation manager 1325, the uplink detection manager 1330, the uplink transmission manager 1335, the waveform component manager 1340, the LBT manager 1345, the downlink transmission manager 1350, the RBG configuration manager 1355, the reserved resource set manager 1360, and the RBG manager 1365 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the UE capability manager 1320, the resource allocation manager 1325, the uplink detection manager 1330, the uplink transmission manager 1335, the waveform component manager 1340, the LBT manager 1345, the downlink transmission manager 1350, the RBG configuration manager 1355, the reserved resource set manager 1360, and the RBG manager 1365 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 14:
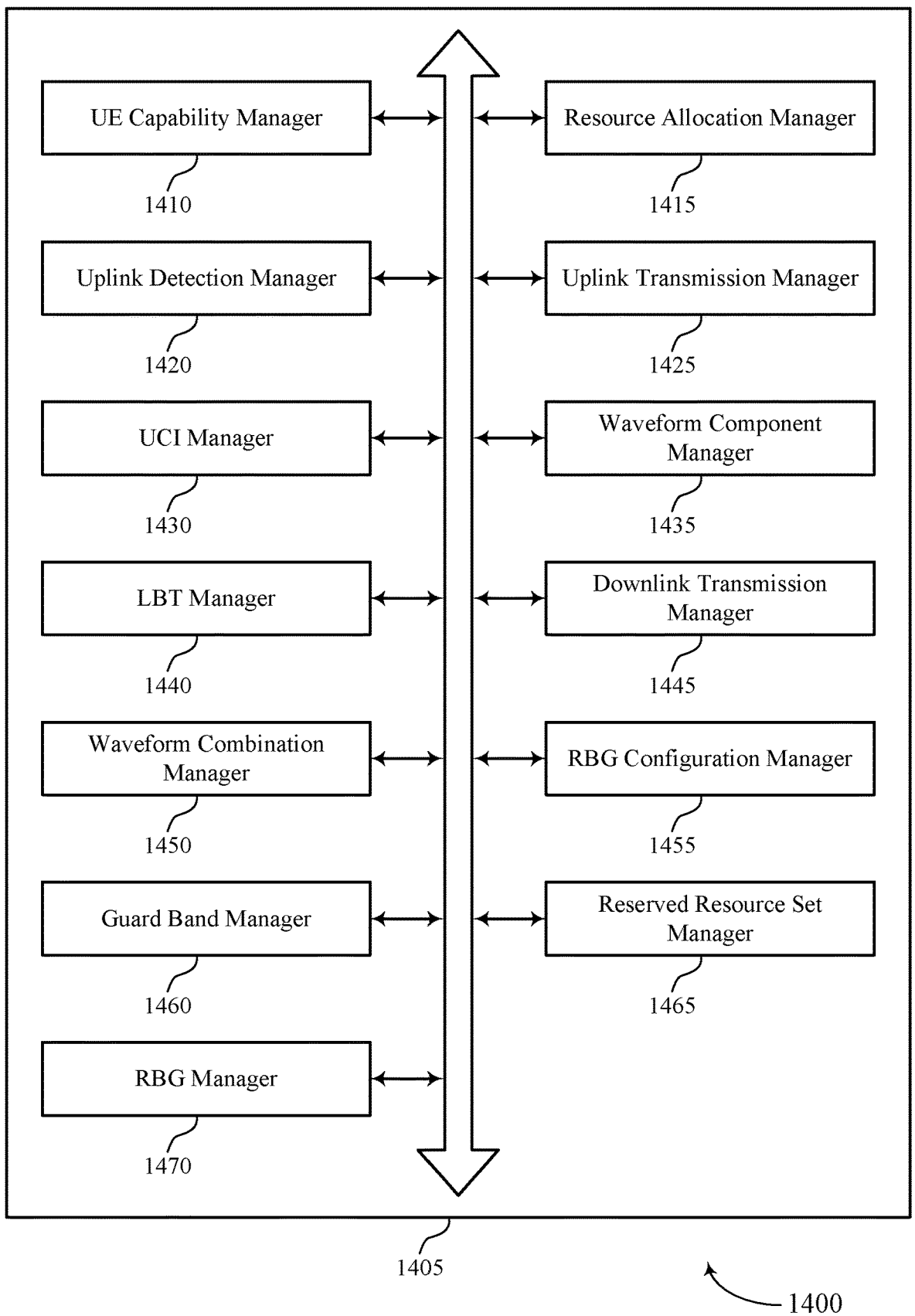
FIG. 14 shows a block diagram of a communications manager that supports multiple component waveform generation for per subband LBT in accordance with aspects of the present disclosure.

FIG. 14 shows a block diagram 1400 of a communications manager 1405 that supports multiple component waveform generation for per subband LBT in accordance with aspects of the present disclosure. The communications manager 1405 may be an example of aspects of a communications manager 1215, a communications manager 1315, or a communications manager 1510 described herein. The communications manager 1405 may include a UE capability manager 1410, a resource allocation manager 1415, an uplink detection manager 1420, an uplink transmission manager 1425, an UCI manager 1430, a waveform component manager 1435, an LBT manager 1440, a downlink transmission manager 1445, a waveform combination manager 1450, an RBG configuration manager 1455, a guard band manager 1460, a reserved resource set manager 1465, and an RBG manager 1470. Each of these modules may communicate, directly or indirectly, with one another (e.g., via one or more buses).

The UE capability manager 1410 may receive a UE capability report indicating a waveform generation capability of the UE.

The resource allocation manager 1415 may transmit a resource allocation indicating a set of subbands for an uplink transmission. In some examples, the resource allocation manager 1415 may identify a set of subbands for a downlink transmission. In some examples, the resource allocation manager 1415 may transmit a resource allocation to a UE, where the resource allocation indicates, based on the identified RBG configuration, one or more RBGs for a downlink transmission for the UE. In some examples, the resource allocation manager 1415 may transmit a resource allocation indicating a set of RBGs to be used for the first downlink transmission, the resource allocation based on the indicated reserved resource set and the determined one or more RBGs. In some cases, a first bit in the resource allocation assigns the first RBG and a second bit in the resource allocation assigns the second RBG. In some cases, a length of the resource allocation is based on the identified RBG configuration.

The uplink detection manager 1420 may identify, based on the waveform generation capability of the UE and the transmitted resource allocation, a set of uplink waveform hypotheses. In some examples, the uplink detection manager 1420 may divide the set of subbands into one or more groups based on the waveform generation capability of the UE, where the set of uplink waveform hypotheses is identified based on the one or more groups. In some examples, the uplink detection manager 1420 may perform, on each subband of the set of subbands, a blind detection procedure on the subband. In some examples, the uplink detection manager 1420 may identify the set of uplink waveform hypotheses based on the waveform generation capability of the UE, the transmitted resource allocation, and a set of waveform component generation rules.

The uplink transmission manager 1425 may receive the uplink transmission based on at least one of the identified set of uplink waveform hypotheses. In some examples, the uplink transmission manager 1425 may identify one or more guard bands for the uplink transmission based on the performed blind detection procedure and the set of uplink waveform hypotheses.

The waveform component manager 1435 may identify a set of waveform components for the downlink transmission based on a waveform generation capability of the base station and the identified set of subbands. In some examples, the waveform component manager 1435 may transmit, to the UE, an indication of the waveform component generation rules. In some examples, the waveform component manager 1435 may determine, according to the waveform generation capability, a resource allocation for the downlink transmission, and an LBT requirement for the downlink transmission, a set of waveform components to pre-generate before the LBT procedure is performed. In some examples, the waveform component manager 1435 may select, based on a result of the performed LBT procedure, one or more waveform components of the identified set of waveform components. In some examples, the waveform component manager 1435 may identify the selected one or more waveform components based on the identified set of subbands.

In some examples, the waveform component manager 1435 may include a waveform component corresponding to a resource in a guard band in one waveform component of the identified set of waveform components for the downlink transmission based on a first subband adjacent the guard band and a second subband adjacent the guard band being included in the one waveform component. In some examples, the waveform component manager 1435 may identify data for the uplink transmission from an upper layer. In some examples, the waveform component manager 1435 may encode the identified data. In some examples, the waveform component manager 1435 may modulate the encoded data to generate the set of waveform components. In some examples, the waveform component manager 1435 may store the generated set of waveform components in a memory of the base station prior to determining the result of the LBT procedure performed for the set of subbands. In some cases, the waveform generation capability represents at least a number of waveform components that the base station is capable of generating.

In some cases, each waveform component of the set of waveform components corresponds to allocated resources of the resource allocation in a subband of the set of subbands, or allocated resources of the resource allocation in a guard band between two subbands of the set of subbands, or a combination thereof. In some cases, the set of waveform components include a first waveform component, where the first waveform component includes two contiguous subbands of the set of subbands and a guard band between the two contiguous subbands. In some cases, the set of waveform components include, for each subband of the set of subbands, a waveform component corresponding to the subband and exclusive of a guard band.

The LBT manager 1440 may perform an LBT procedure for the set of subbands. In some examples, the LBT manager 1440 may identify a set of subbands of the set of subbands that are associated with a successful result of the performed LBT procedure. In some examples, determining that the two contiguous subbands are associated with a successful result of the performed LBT procedure, where the selected one or more waveform components includes the first waveform component based on the determining.

The downlink transmission manager 1445 may transmit a first waveform including the selected one or more waveform components during a first transmission time interval. In some examples, the downlink transmission manager 1445 may transmit, to the UE, the downlink transmission on the indicated one or more RBGs. In some examples, the downlink transmission manager 1445 may transmit, on the determined one or more RBGs, the first downlink transmission during a TTI.

The RBG configuration manager 1455 may identify a RBG configuration based on one or more guard band boundaries for a set of subbands of a radio frequency spectrum band.

The reserved resource set manager 1465 may transmit, to a UE, an indication of a reserved resource set for one or more guard band boundaries for a set of subbands of a radio frequency spectrum band. In some examples, the reserved resource set manager 1465 may transmit an indication that the reserved resource set is unallocated to the UE during the TTI. In some examples, the reserved resource set manager 1465 may transmit an indication that the reserved resource set is allocated to the UE during a TTI, where the one or more RBGs for the first downlink transmission are determined based on the received indication that the reserved resource set is allocated.

The RBG manager 1470 may determine one or more RBGs for a first downlink transmission for the UE. In some examples, the RBG manager 1470 may exclude the reserved resource set from the set of RBGs to determine the one or more RBG.

The UCI manager 1430 may receive, from the UE, uplink control information indicating a set of subbands of the set of subbands, where the uplink transmission is received based on the set of the set of subbands.

The waveform combination manager 1450 may combine the selected one or more waveform components, where the first waveform is based on the combining.

The guard band manager 1460 may transmit an indication of the one or more guard band boundaries for the set of subbands. In some examples, the guard band manager 1460 may transmit, in radio resource control signaling, the indication of the one or more guard band boundaries for the set of subbands.

In some cases, the UE capability manager 1410, the resource allocation manager 1415, the uplink detection manager 1420, the uplink transmission manager 1425, the UCI manager 1430, the waveform component manager 1435, the LBT manager 1440, the downlink transmission manager 1445, the waveform combination manager 1450, the RBG configuration manager 1455, the guard band manager 1460, the reserved resource set manager 1465, and the RBG manager 1470 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the UE capability manager 1410, the resource allocation manager 1415, the uplink detection manager 1420, the uplink transmission manager 1425, the UCI manager 1430, the waveform component manager 1435, the LBT manager 1440, the downlink transmission manager 1445, the waveform combination manager 1450, the RBG configuration manager 1455, the guard band manager 1460, the reserved resource set manager 1465, and the RBG manager 1470 discussed herein.

Figure 15:
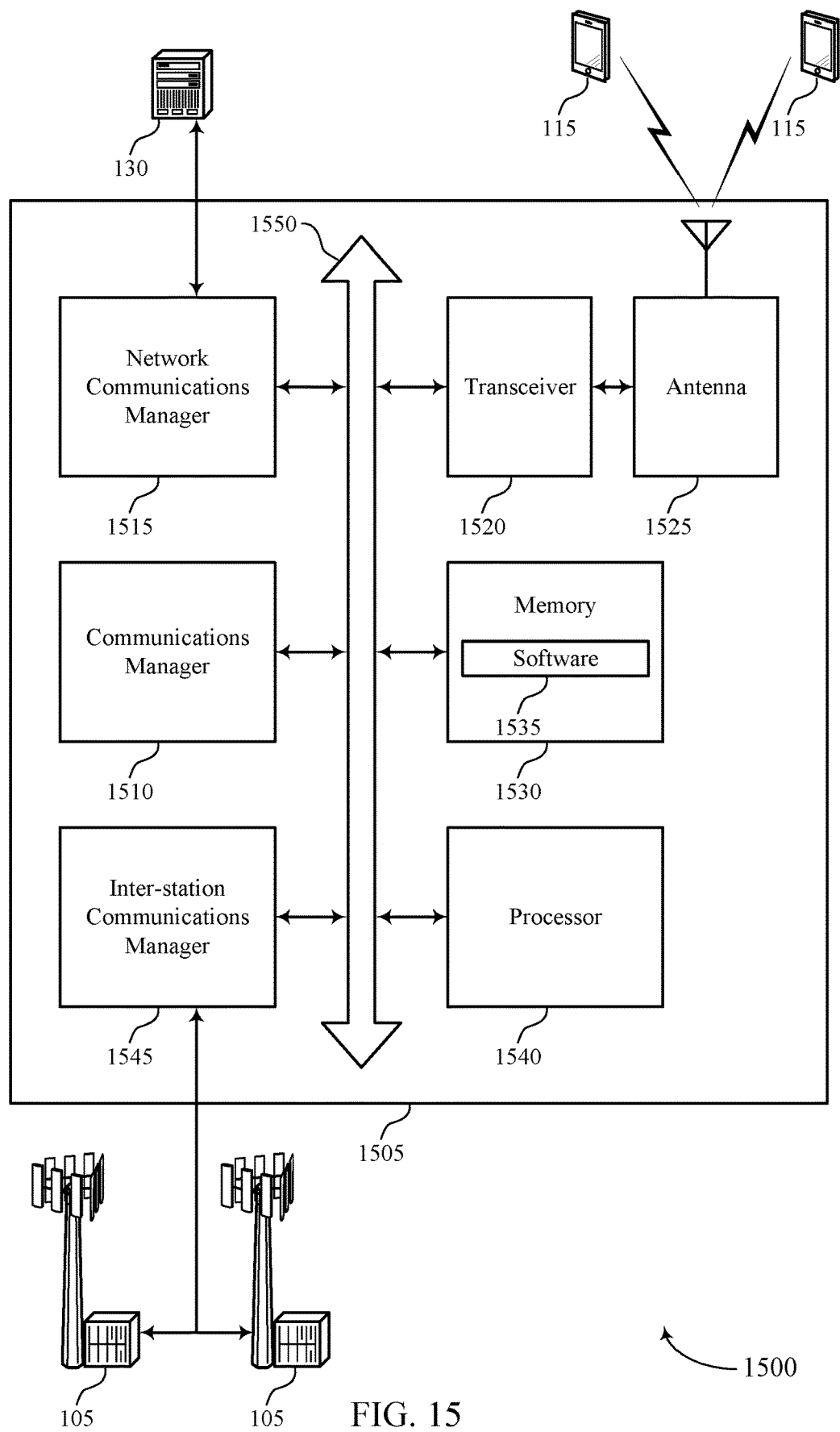
FIG. 15 shows a diagram of a system including a device that supports multiple component waveform generation for per subband LBT in accordance with aspects of the present disclosure.

FIG. 15 shows a diagram of a system 1500 including a device 1505 that supports multiple component waveform generation for per subband LBT in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may receive a UE capability report indicating a waveform generation capability of the UE, transmit a resource allocation indicating a set of subbands for an uplink transmission, identify, based on the waveform generation capability of the UE and the transmitted resource allocation, a set of uplink waveform hypotheses, and receive the uplink transmission based on at least one of the identified set of uplink waveform hypotheses.

The communications manager 1510 may also identify a set of subbands for a downlink transmission, identify a set of waveform components for the downlink transmission based on a waveform generation capability of the base station and the identified set of subbands, perform an LBT procedure for the set of subbands, select, based on a result of the performed LBT procedure, one or more waveform components of the identified set of waveform components, and transmit a first waveform including the selected one or more waveform components during a first TTI.

The communications manager 1510 may also identify a RBG configuration based on one or more guard band boundaries for a set of subbands of a radio frequency spectrum band, transmit a resource allocation to a UE, where the resource allocation indicates, based on the identified RBG configuration, one or more RBGs for a downlink transmission for the UE, and transmit, to the UE, the downlink transmission on the indicated one or more RBGs.

The communications manager 1510 may also transmit, to a UE, an indication of a reserved resource set for one or more guard band boundaries for a set of subbands of a radio frequency spectrum band, determine one or more RBGs for a first downlink transmission for the UE, transmit a resource allocation indicating a set of RBGs to be used for the first downlink transmission, the resource allocation based on the indicated reserved resource set and the determined one or more resoRBGs, and transmit, on the determined one or more RBGs, the first downlink transmission during a TTI.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code or software 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting multiple component waveform generation for per subband LBT).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The software 1535 may include instructions to implement aspects of the present disclosure, including instructions to support wireless communications. The software 1535 may be stored in a non-transitory computer-readable medium such as system memory or other type of memory. In some cases, the software 1535 may not be directly executable by the processor 1540 but may cause a computer (e.g., when compiled and executed) to perform functions described herein.

Figure 16:
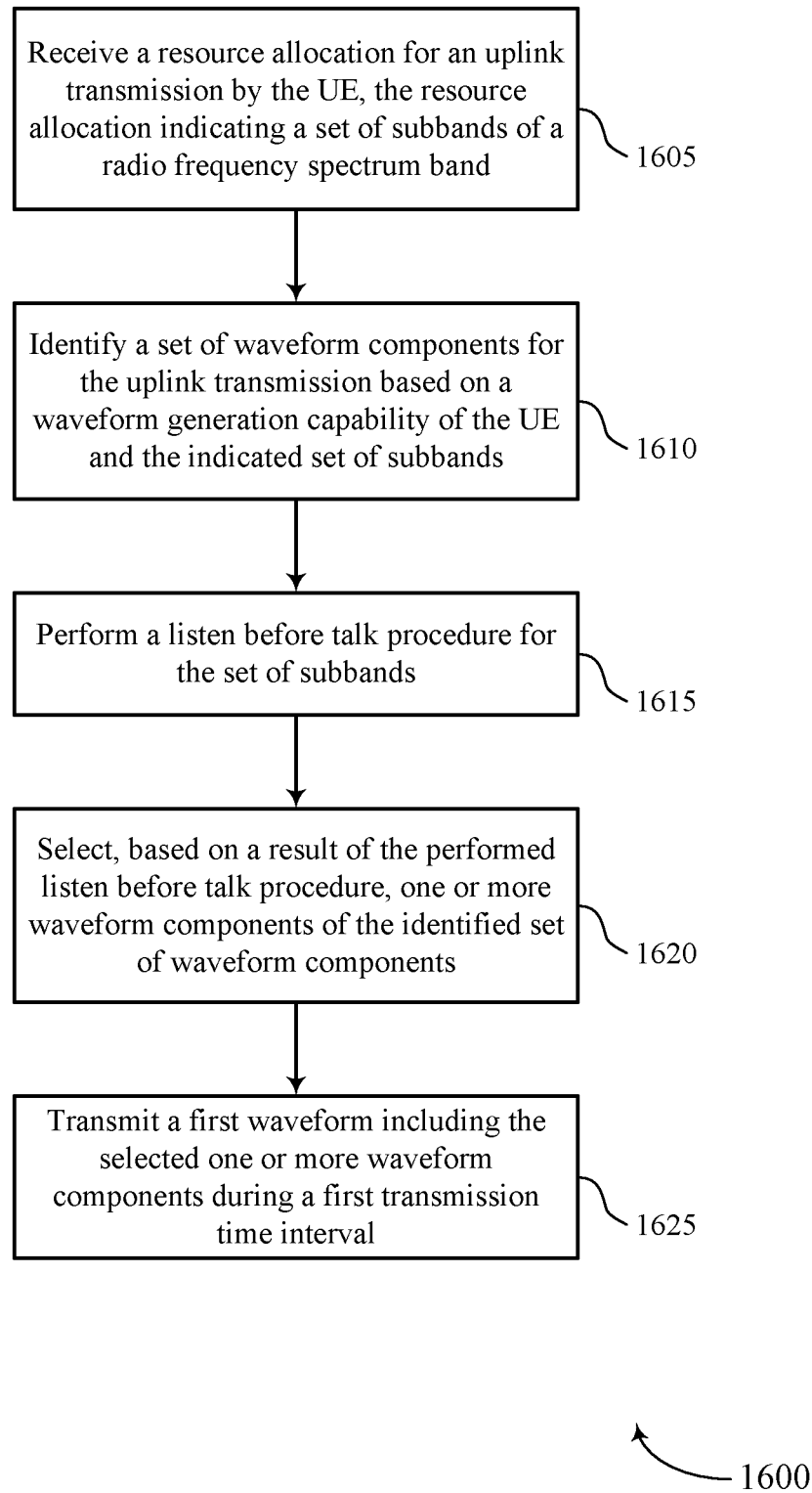
FIGS. 16 through 23 show flowcharts illustrating methods that support multiple component waveform generation for per subband LBT in accordance with aspects of the present disclosure.

FIG. 16 shows a flowchart illustrating a method 1600 that supports multiple component waveform generation for per subband LBT in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may receive a resource allocation for an uplink transmission by the UE, the resource allocation indicating a set of subbands of a radio frequency spectrum band. The operations of 1605 may be performed according to the methods described herein. In some examples, aspects of the operations of 1605 may be performed by a resource allocation manager as described with reference to FIGS. 8 through 11.

At 1610, the UE may identify a set of waveform components for the uplink transmission based on a waveform generation capability of the UE and the indicated set of subbands. The operations of 1610 may be performed according to the methods described herein. In some examples, aspects of the operations of 1610 may be performed by a waveform component manager as described with reference to FIGS. 8 through 11.

At 1615, the UE may perform an LBT procedure for the set of subbands. The operations of 1615 may be performed according to the methods described herein. In some examples, aspects of the operations of 1615 may be performed by an LBT manager as described with reference to FIGS. 8 through 11.

At 1620, the UE may select, based on a result of the performed LBT procedure, one or more waveform components of the identified set of waveform components. The operations of 1620 may be performed according to the methods described herein. In some examples, aspects of the operations of 1620 may be performed by a waveform component manager as described with reference to FIGS. 8 through 11.

At 1625, the UE may transmit a first waveform including the selected one or more waveform components during a first TTI. The operations of 1625 may be performed according to the methods described herein. In some examples, aspects of the operations of 1625 may be performed by a waveform manager as described with reference to FIGS. 8 through 11.

Figure 17:
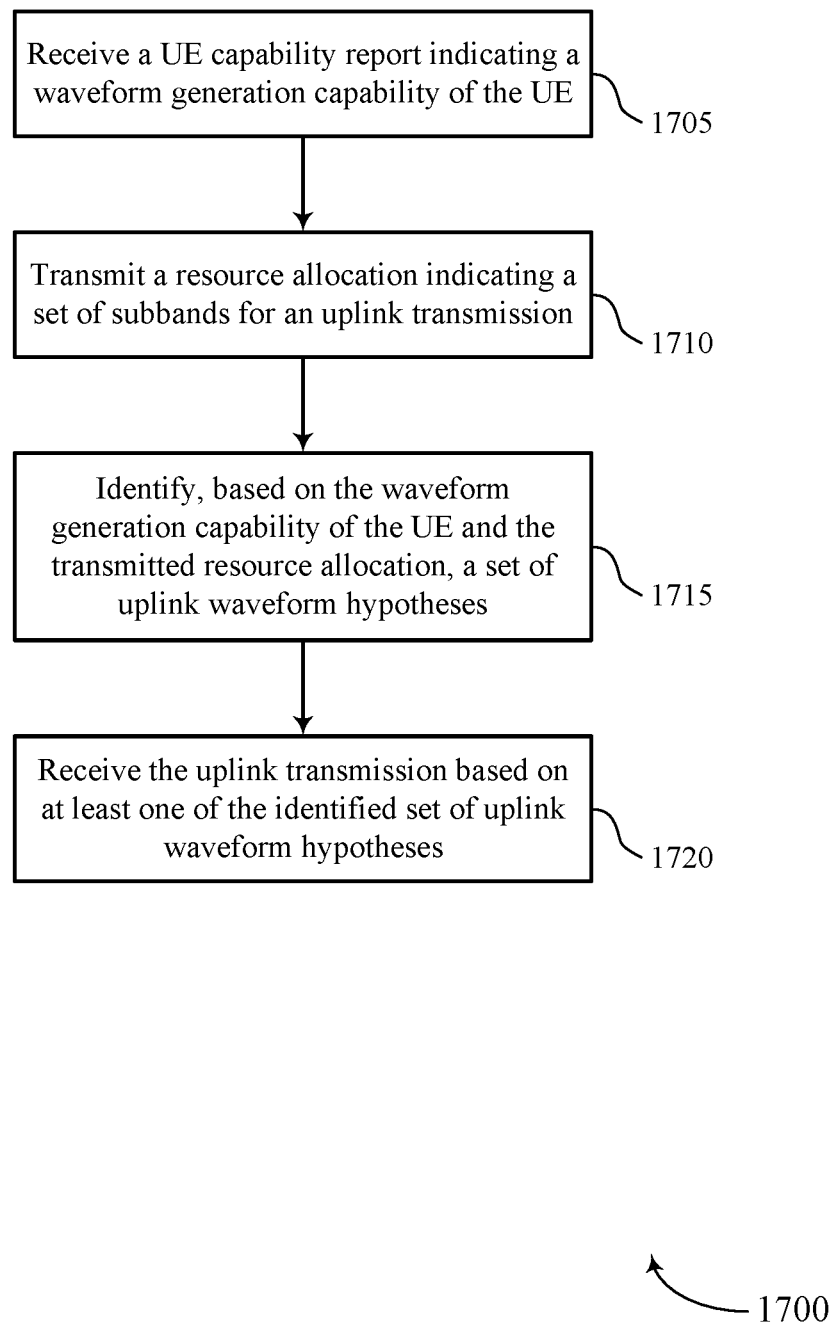

FIG. 17 shows a flowchart illustrating a method 1700 that supports multiple component waveform generation for per subband LBT in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1705, the base station may receive a UE capability report indicating a waveform generation capability of the UE. The operations of 1705 may be performed according to the methods described herein. In some examples, aspects of the operations of 1705 may be performed by a UE capability manager as described with reference to FIGS. 12 through 15.

At 1710, the base station may transmit a resource allocation indicating a set of subbands for an uplink transmission. The operations of 1710 may be performed according to the methods described herein. In some examples, aspects of the operations of 1710 may be performed by a resource allocation manager as described with reference to FIGS. 12 through 15.

At 1715, the base station may identify, based on the waveform generation capability of the UE and the transmitted resource allocation, a set of uplink waveform hypotheses. The operations of 1715 may be performed according to the methods described herein. In some examples, aspects of the operations of 1715 may be performed by an uplink detection manager as described with reference to FIGS. 12 through 15.

At 1720, the base station may receive the uplink transmission based on at least one of the identified set of uplink waveform hypotheses. The operations of 1720 may be performed according to the methods described herein. In some examples, aspects of the operations of 1720 may be performed by an uplink transmission manager as described with reference to FIGS. 12 through 15.

Figure 18:
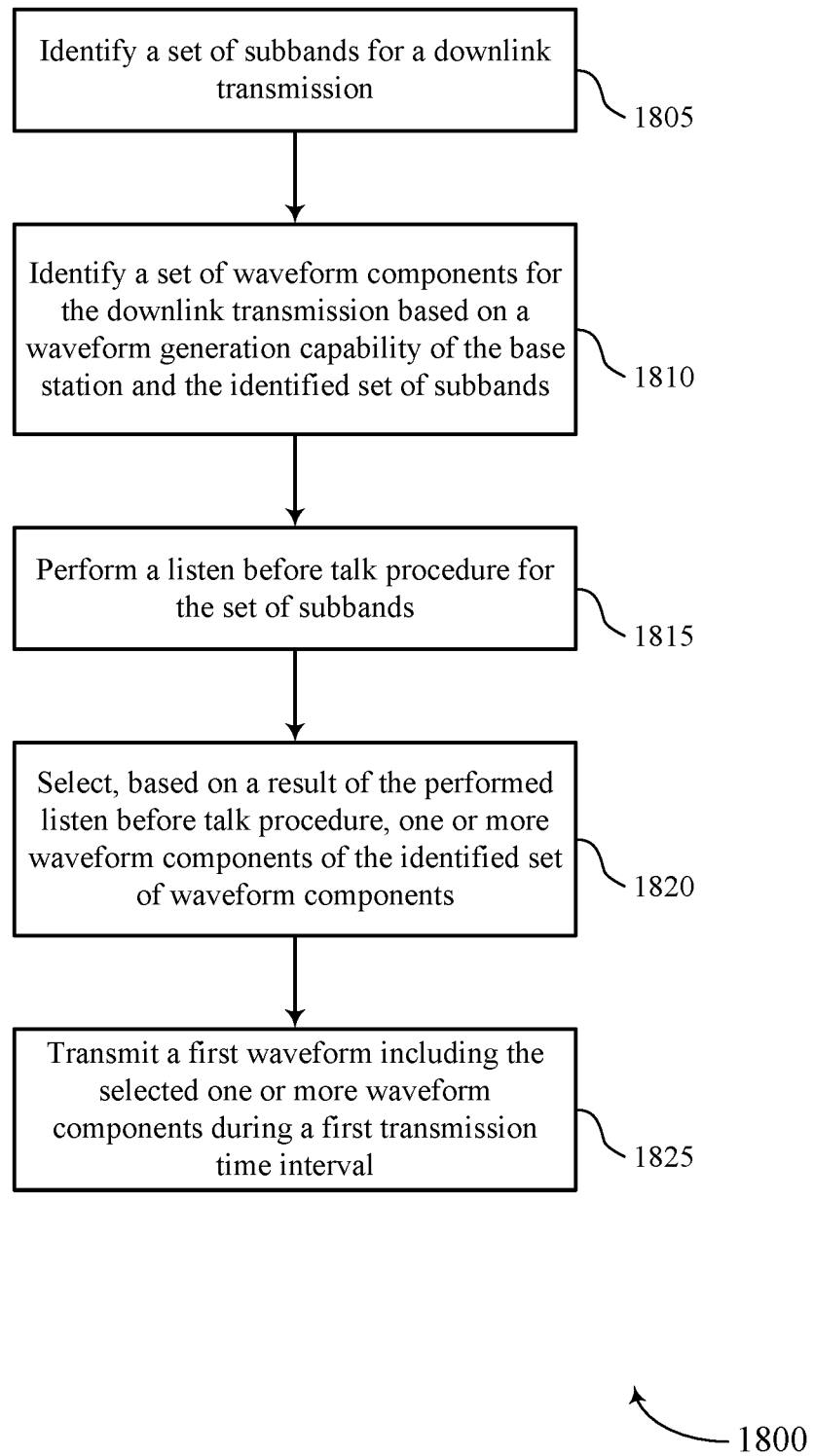

FIG. 18 shows a flowchart illustrating a method 1800 that supports multiple component waveform generation for per subband LBT in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1805, the base station may identify a set of subbands for a downlink transmission. The operations of 1805 may be performed according to the methods described herein. In some examples, aspects of the operations of 1805 may be performed by a resource allocation manager as described with reference to FIGS. 12 through 15.

At 1810, the base station may identify a set of waveform components for the downlink transmission based on a waveform generation capability of the base station and the identified set of subbands. The operations of 1810 may be performed according to the methods described herein. In some examples, aspects of the operations of 1810 may be performed by a waveform component manager as described with reference to FIGS. 12 through 15.

At 1815, the base station may perform an LBT procedure for the set of subbands. The operations of 1815 may be performed according to the methods described herein. In some examples, aspects of the operations of 1815 may be performed by a LBT manager as described with reference to FIGS. 12 through 15.

At 1820, the base station may select, based on a result of the performed LBT procedure, one or more waveform components of the identified set of waveform components. The operations of 1820 may be performed according to the methods described herein. In some examples, aspects of the operations of 1820 may be performed by a waveform component manager as described with reference to FIGS. 12 through 15.

At 1825, the base station may transmit a first waveform including the selected one or more waveform components during a first TTI. The operations of 1825 may be performed according to the methods described herein. In some examples, aspects of the operations of 1825 may be performed by a downlink transmission manager as described with reference to FIGS. 12 through 15.

Figure 19:
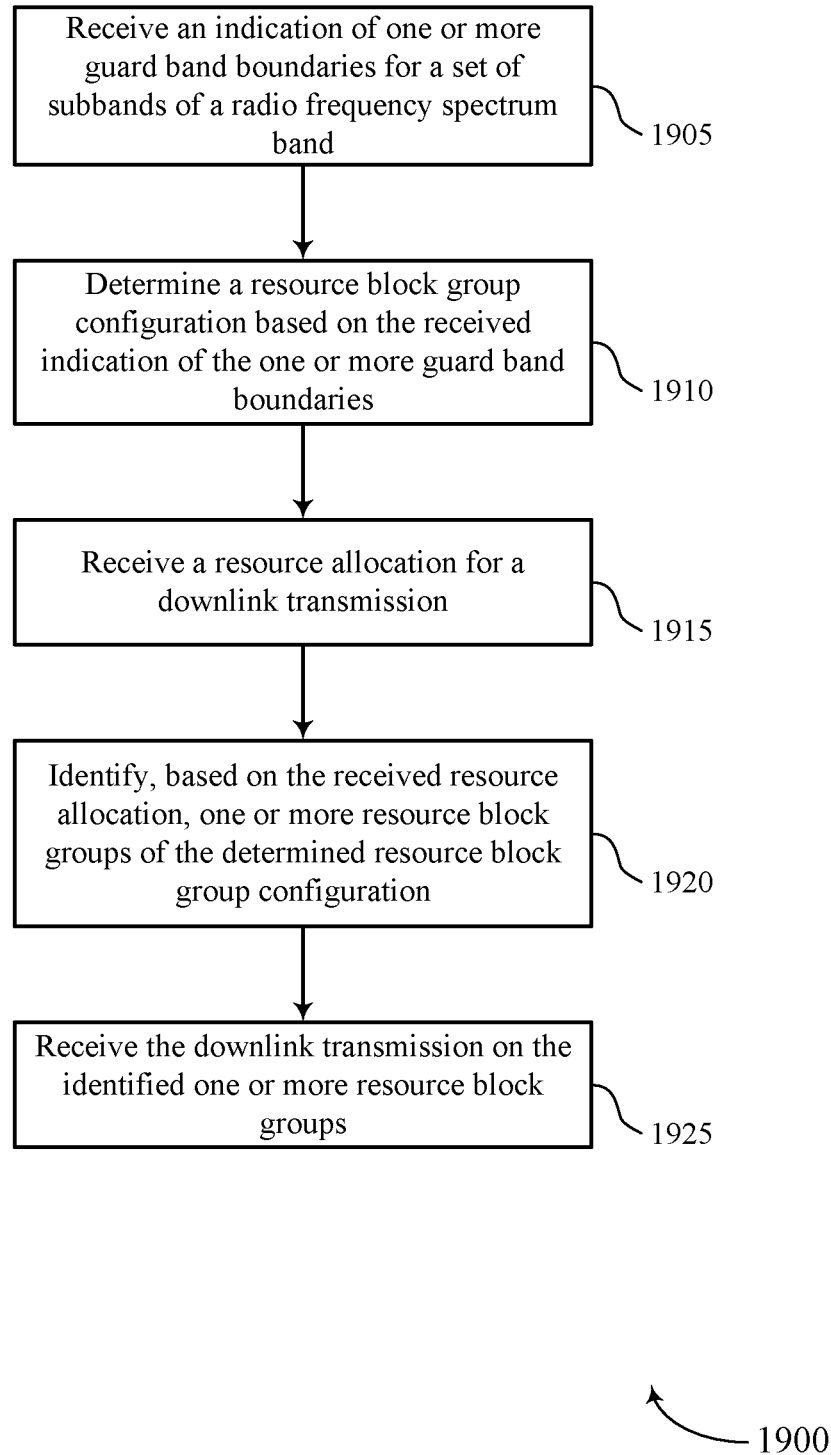

FIG. 19 shows a flowchart illustrating a method 1900 that supports multiple component waveform generation for per subband LBT in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1905, the UE may receive an indication of one or more guard band boundaries for a set of subbands of a radio frequency spectrum band. The operations of 1905 may be performed according to the methods described herein. In some examples, aspects of the operations of 1905 may be performed by a guard band manager as described with reference to FIGS. 8 through 11.

At 1910, the UE may determine a RBG configuration based on the received indication of the one or more guard band boundaries. The operations of 1910 may be performed according to the methods described herein. In some examples, aspects of the operations of 1910 may be performed by an RBG configuration manager as described with reference to FIGS. 8 through 11.

At 1915, the UE may receive a resource allocation for a downlink transmission. The operations of 1915 may be performed according to the methods described herein. In some examples, aspects of the operations of 1915 may be performed by a resource allocation manager as described with reference to FIGS. 8 through 11.

At 1920, the UE may identify, based on the received resource allocation, one or more RBGs of the determined RBG configuration. The operations of 1920 may be performed according to the methods described herein. In some examples, aspects of the operations of 1920 may be performed by an allocated RBG manager as described with reference to FIGS. 8 through 11.

At 1925, the UE may receive the downlink transmission on the identified one or more RBGs. The operations of 1925 may be performed according to the methods described herein. In some examples, aspects of the operations of 1925 may be performed by a downlink transmission manager as described with reference to FIGS. 8 through 11.

Figure 20:
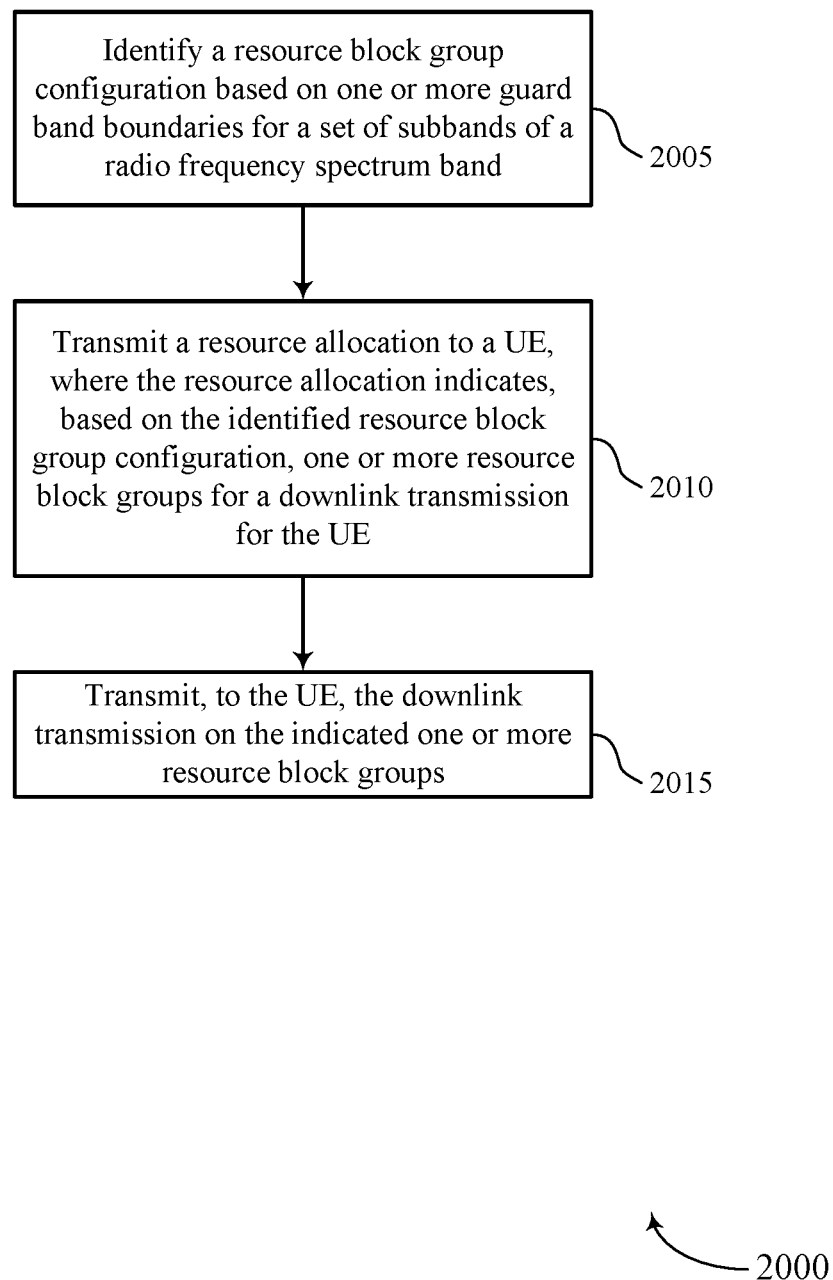

FIG. 20 shows a flowchart illustrating a method 2000 that supports multiple component waveform generation for per subband LBT in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 2005, the base station may identify an RBG configuration based on one or more guard band boundaries for a set of subbands of a radio frequency spectrum band. The operations of 2005 may be performed according to the methods described herein. In some examples, aspects of the operations of 2005 may be performed by an RBG configuration manager as described with reference to FIGS. 12 through 15.

At 2010, the base station may transmit a resource allocation to a UE, where the resource allocation indicates, based on the identified RBG configuration, one or more RBGs for a downlink transmission for the UE. The operations of 2010 may be performed according to the methods described herein. In some examples, aspects of the operations of 2010 may be performed by a resource allocation manager as described with reference to FIGS. 12 through 15.

At 2015, the base station may transmit, to the UE, the downlink transmission on the indicated one or more RBGs. The operations of 2015 may be performed according to the methods described herein. In some examples, aspects of the operations of 2015 may be performed by a downlink transmission manager as described with reference to FIGS. 12 through 15.

Figure 21:
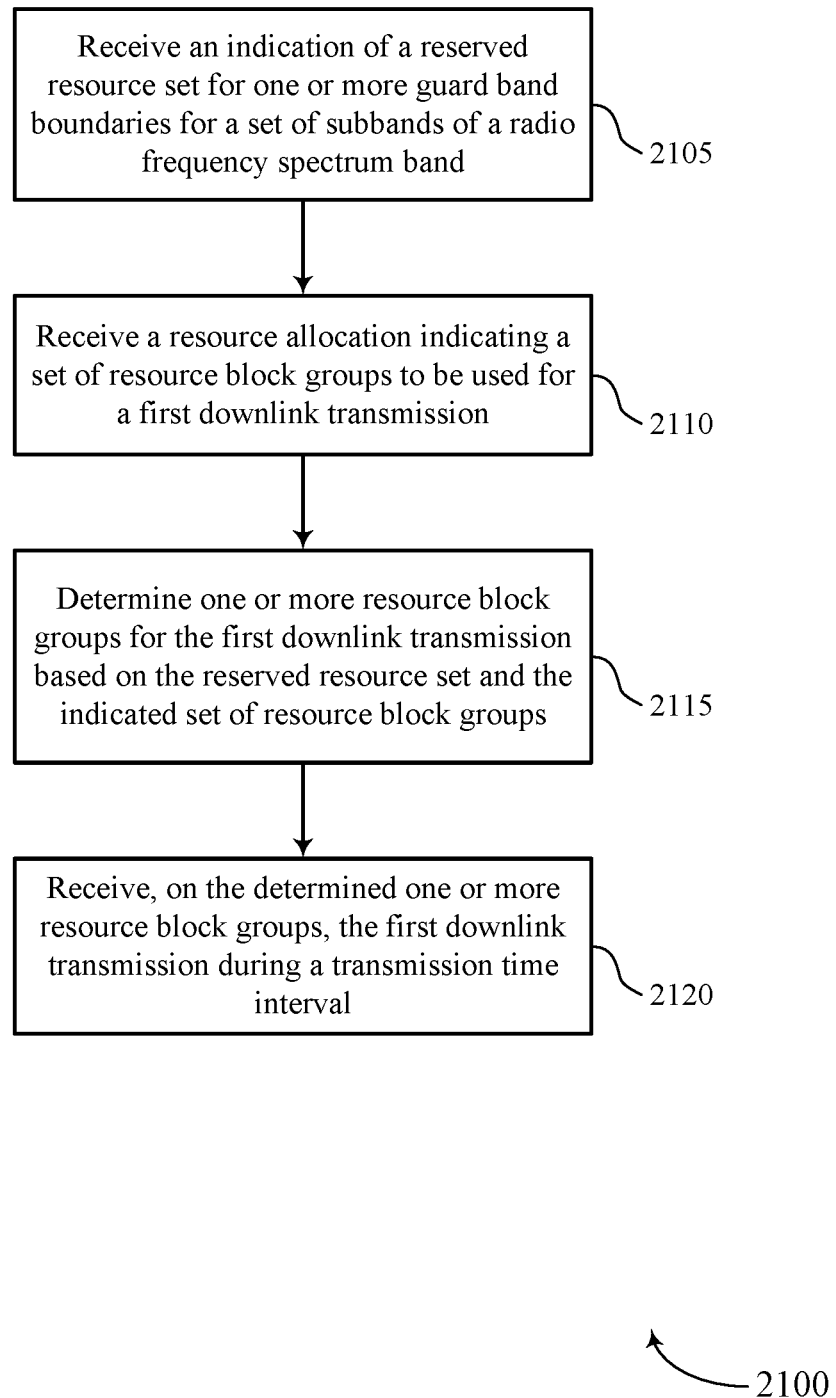

FIG. 21 shows a flowchart illustrating a method 2100 that supports multiple component waveform generation for per subband LBT in accordance with aspects of the present disclosure. The operations of method 2100 may be implemented by a UE 115 or its components as described herein. For example, the operations of method 2100 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 2105, the UE may receive an indication of a reserved resource set for one or more guard band boundaries for a set of subbands of a radio frequency spectrum band. The operations of 2105 may be performed according to the methods described herein. In some examples, aspects of the operations of 2105 may be performed by a reserved resource set manager as described with reference to FIGS. 8 through 11.

At 2110, the UE may receive a resource allocation indicating a set of RBGs to be used for a first downlink transmission. The operations of 2110 may be performed according to the methods described herein. In some examples, aspects of the operations of 2110 may be performed by a resource allocation manager as described with reference to FIGS. 8 through 11.

At 2115, the UE may determine one or more RBGs for the first downlink transmission based on the reserved resource set and the indicated set of RBGs. The operations of 2115 may be performed according to the methods described herein. In some examples, aspects of the operations of 2115 may be performed by an RBG manager as described with reference to FIGS. 8 through 11.

At 2120, the UE may receive, on the determined one or more RBGs, the first downlink transmission during a TTI. The operations of 2120 may be performed according to the methods described herein. In some examples, aspects of the operations of 2120 may be performed by a downlink transmission manager as described with reference to FIGS. 8 through 11.

Figure 22:
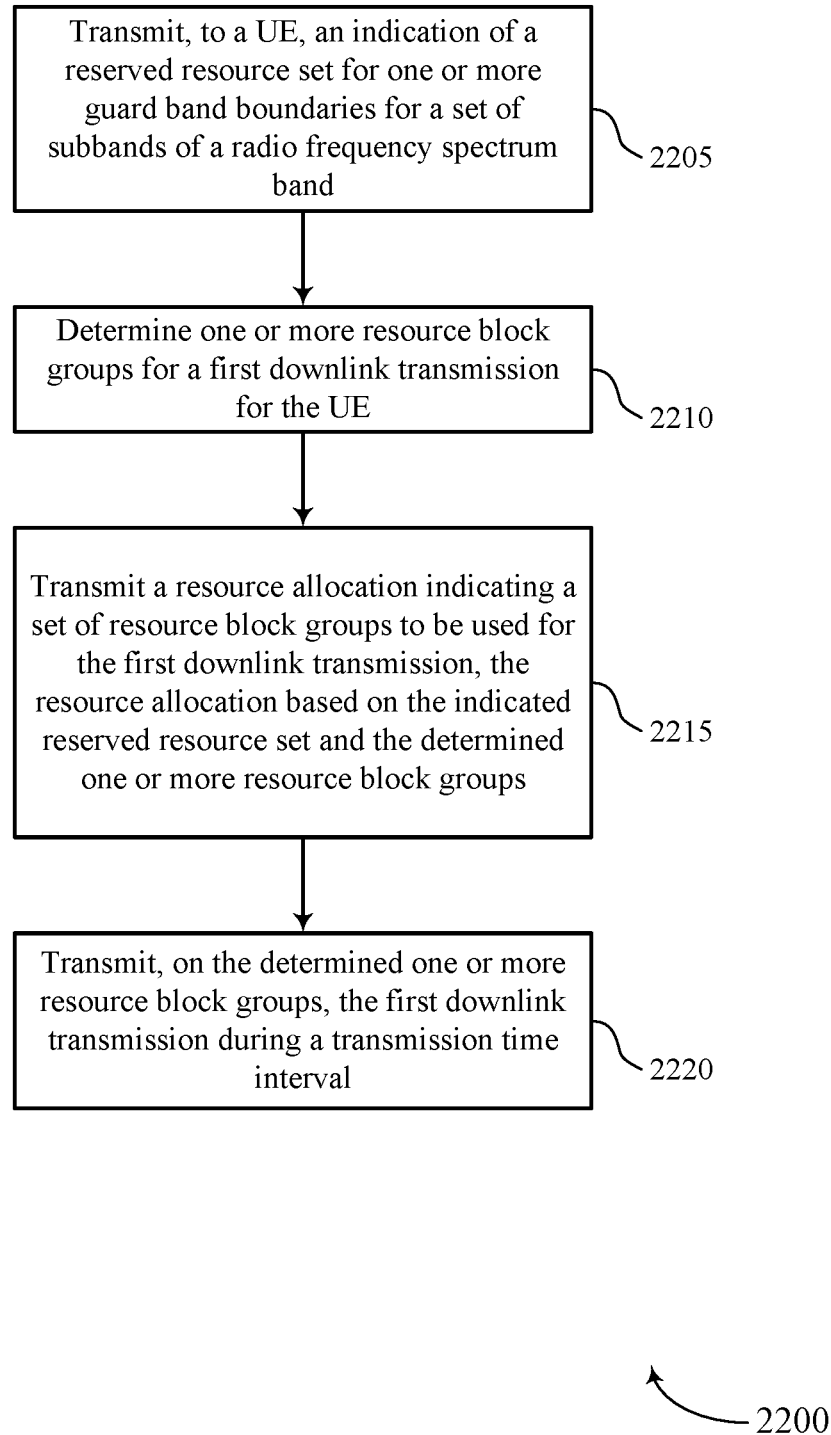

FIG. 22 shows a flowchart illustrating a method 2200 that supports multiple component waveform generation for per subband LBT in accordance with aspects of the present disclosure. The operations of method 2200 may be implemented by a base station 105 or its components as described herein. For example, the operations of method 2200 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 2205, the base station may transmit, to a UE, an indication of a reserved resource set for one or more guard band boundaries for a set of subbands of a radio frequency spectrum band. The operations of 2205 may be performed according to the methods described herein. In some examples, aspects of the operations of 2205 may be performed by a reserved resource set manager as described with reference to FIGS. 12 through 15.

At 2210, the base station may determine one or more RBGs for a first downlink transmission for the UE. The operations of 2210 may be performed according to the methods described herein. In some examples, aspects of the operations of 2210 may be performed by an RBG manager as described with reference to FIGS. 12 through 15.

At 2215, the base station may transmit a resource allocation indicating a set of RBGs to be used for the first downlink transmission, the resource allocation based on the indicated reserved resource set and the determined one or more RBGs. The operations of 2215 may be performed according to the methods described herein. In some examples, aspects of the operations of 2215 may be performed by a resource allocation manager as described with reference to FIGS. 12 through 15.

At 2220, the base station may transmit, on the determined one or more RBGs, the first downlink transmission during a TTI. The operations of 2220 may be performed according to the methods described herein. In some examples, aspects of the operations of 2220 may be performed by a downlink transmission manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Figure 23:
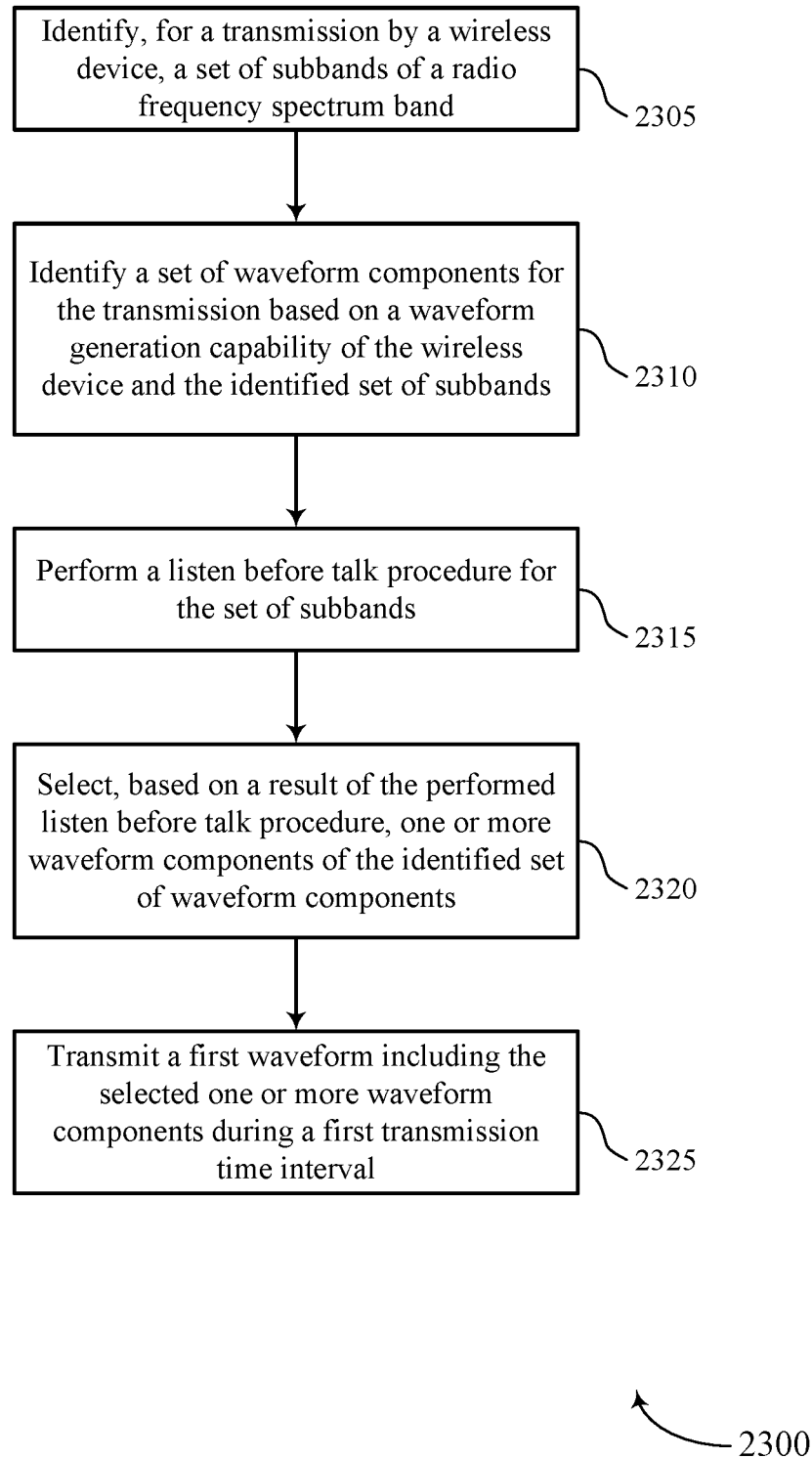

FIG. 23 shows a flowchart illustrating a method 2300 that supports multiple component waveform generation for per subband LBT in accordance with aspects of the present disclosure. The operations of method 2300 may be implemented by a wireless device (e.g., a UE 115 or a base station 105) or its components as described herein. For example, the operations of method 2300 may be performed by a communications manager as described with reference to FIGS. 8 through 11. Additionally or alternatively, the operations of method 2300 may be performed by a communications manager as described with reference to FIGS. 12 through 15. In some examples, a wireless device may execute a set of instructions to control the functional elements of the wireless device to perform the functions described herein. Additionally or alternatively, a wireless device may perform aspects of the functions described herein using special-purpose hardware.

At 2305, the wireless device may identify, for a transmission by the wireless device, a set of subbands of a radio frequency spectrum band. The operations of 2305 may be performed according to the methods described herein. In some examples, aspects of the operations of 2305 may be performed by a resource allocation manager as described with reference to FIGS. 8 through 15.

At 2310, the wireless device may identify a set of waveform components for the transmission based on a waveform generation capability of the wireless device and the identified set of subbands. The operations of 2310 may be performed according to the methods described herein. In some examples, aspects of the operations of 2310 may be performed by a waveform component manager as described with reference to FIGS. 8 through 15.

At 2315, the wireless device may perform an LBT procedure for the set of subbands. The operations of 2315 may be performed according to the methods described herein. In some examples, aspects of the operations of 2315 may be performed by an LBT manager as described with reference to FIGS. 8 through 15.

At 2320, the wireless device may select, based on a result of the performed LBT procedure, one or more waveform components of the identified set of waveform components. The operations of 2320 may be performed according to the methods described herein. In some examples, aspects of the operations of 2320 may be performed by a waveform component manager as described with reference to FIGS. 8 through 15.

At 2325, the wireless device may transmit a first waveform including the selected one or more waveform components during a first TTI. The operations of 2325 may be performed according to the methods described herein. In some examples, aspects of the operations of 2325 may be performed by a waveform manager as described with reference to FIGS. 8 through 11 or a downlink transmission manager as described with reference to FIGS. 12 through 15.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless device, comprising:
   identifying, for a transmission by the wireless device, a plurality of subbands of a radio frequency spectrum band;
   identifying, prior to determining a result of a listen before talk procedure performed for the identified plurality of subbands, a plurality of waveform components for the transmission based at least in part on a waveform generation capability of the wireless device and the identified plurality of subbands;
   performing the listen before talk procedure for the plurality of subbands;
   selecting, based at least in part on the result of the performed listen before talk procedure, one or more waveform components of the identified plurality of waveform components; and
   transmitting a first waveform comprising the selected one or more waveform components during a first transmission time interval.

2. The method of claim 1, wherein the waveform generation capability represents at least a number of waveform components that the wireless device is capable of generating.

3. The method of claim 1, further comprising:
   transmitting, to a second wireless device, a user equipment (UE) capability report indicating the waveform generation capability of the wireless device, wherein the wireless device is a UE.

4. The method of claim 1, further comprising:
   determining, according to the waveform generation capability, a resource allocation for an uplink transmission, and a listen before talk requirement for the uplink transmission, a set of waveform components to pre-generate before the listen before talk procedure is performed.

5. The method of claim 1, further comprising:
determining, according to the waveform generation capability, a resource allocation for a downlink transmission, and a listen before talk requirement for the downlink transmission, a set of waveform components to pre-generate before the listen before talk procedure is performed.

6. The method of claim 1, wherein each waveform component of the plurality of waveform components corresponds to allocated resources of a resource allocation in a subband of the plurality of subbands, or allocated resources of the resource allocation in a guard band between two subbands of the plurality of subbands, or a combination thereof.

7. The method of claim 1, further comprising:
identifying a set of subbands of the plurality of subbands that are associated with a successful result of the performed listen before talk procedure;
identifying the selected one or more waveform components based at least in part on the identified set of subbands; and
combining the selected one or more waveform components, wherein the first waveform is based at least in part on the combining.

8. The method of claim 7, further comprising:
including a waveform component corresponding to a resource in a guard band in one waveform component of the identified plurality of waveform components for an uplink transmission based at least in part on a first subband adjacent the guard band and a second subband adjacent the guard band being included in the one waveform component.

9. The method of claim 7, further comprising:
including a waveform component corresponding to a resource in a guard band in one waveform component of the identified plurality of waveform components for a downlink transmission based at least in part on a first subband adjacent the guard band and a second subband adjacent the guard band being included in the one waveform component.

10. The method of claim 1, wherein the plurality of waveform components comprise a first waveform component, wherein the first waveform component comprises two contiguous subbands of the plurality of subbands and a guard band between the two contiguous subbands.

11. The method of claim 10, further comprising:
determining that the two contiguous subbands are associated with a successful result of the performed listen before talk procedure, wherein the selected one or more waveform components comprises the first waveform component based at least in part on the determining.

12. The method of claim 1, wherein the plurality of waveform components comprise, for each subband of the plurality of subbands, a waveform component corresponding to the subband and exclusive of a guard band.

13. The method of claim 1, wherein identifying the plurality of waveform components for the transmission comprises:
identifying data for an uplink or downlink transmission from an upper layer;
encoding the identified data; and
modulating the encoded data to generate the plurality of waveform components; and
storing the generated plurality of waveform components in a memory of the wireless device prior to determining the result of the listen before talk procedure performed for the plurality of subbands.

14. The method of claim 1, wherein selecting the one or more waveform components of the identified plurality of waveform components comprises:
identifying that the plurality of subbands pass the performed listen before talk procedure; and
selecting, for each subband of the plurality of subbands, a waveform component of the identified plurality of waveform components that corresponds to the subband.

15. The method of claim 1, wherein selecting the one or more waveform components of the identified plurality of waveform components comprises:
identifying that a first subset of the plurality of subbands pass the listen before talk procedure and a second subset of the plurality of subbands fail the listen before talk procedure; and
selecting, for each subband of the first subset of the plurality of subbands that pass the listen before talk procedure, a waveform component of the identified plurality of waveform components that corresponds to the subband.

16. The method of claim 15, wherein selecting the one or more waveform components of the identified plurality of waveform components further comprises:
excluding, for each subband of the second subset of the plurality of subbands that fail the listen before talk procedure, a waveform component of the identified plurality of waveform components that corresponds to the subband; and
excluding, for each subband of the second subset of the plurality of subbands that fail the listen before talk procedure, a waveform component of the identified plurality of waveform components that corresponds to one or more guard bands adjacent to the subband.

17. The method of claim 15, wherein selecting the one or more waveform components of the identified plurality of waveform components further comprises:
selecting, for each set of adjacent subbands of the first subset of the plurality of subbands that pass the listen before talk procedure, a waveform component of the identified plurality of waveform components that corresponds to a guard band between the set of adjacent subbands.

18. An apparatus for wireless communication at a wireless device, comprising:
a processor;
memory coupled with the processor; and
instructions stored in the memory and executable by the processor to cause the apparatus to:
identify, for a transmission by the wireless device, a plurality of subbands of a radio frequency spectrum band;
identify, prior to determining a result of a listen before talk procedure performed for the identified plurality of subbands, a plurality of waveform components for the transmission based at least in part on a waveform generation capability of the wireless device and the identified plurality of subbands;
perform the listen before talk procedure for the plurality of subbands;
select, based at least in part on the result of the performed listen before talk procedure, one or more waveform components of the identified plurality of waveform components; and
transmit a first waveform comprising the selected one or more waveform components during a first transmission time interval.

19. The apparatus of claim 18, wherein the waveform generation capability represents at least a number of waveform components that the wireless device is capable of generating.

20. The apparatus of claim 18, wherein the instructions are further executable by the processor to cause the apparatus to:
transmit, to a second wireless device, a user equipment (UE) capability report indicating the waveform generation capability of the wireless device, wherein the wireless device is a UE.

21. The apparatus of claim 18, wherein the instructions are further executable by the processor to cause the apparatus to:
determine, according to the waveform generation capability, a resource allocation for an uplink transmission, and a listen before talk requirement for the uplink transmission, a set of waveform components to pre-generate before the listen before talk procedure is performed.

22. The apparatus of claim 18, wherein the instructions are further executable by the processor to cause the apparatus to:
determine, according to the waveform generation capability, a resource allocation for a downlink transmission, and a listen before talk requirement for the downlink transmission, a set of waveform components to pre-generate before the listen before talk procedure is performed.

23. The apparatus of claim 18, wherein each waveform component of the plurality of waveform components corresponds to allocated resources of a resource allocation in a subband of the plurality of subbands, or allocated resources of the resource allocation in a guard band between two subbands of the plurality of subbands, or a combination thereof.

24. The apparatus of claim 18, wherein the instructions are further executable by the processor to cause the apparatus to:
identify a set of subbands of the plurality of subbands that are associated with a successful result of the performed listen before talk procedure;
identify the selected one or more waveform components based at least in part on the identified set of subbands; and
combine the selected one or more waveform components, wherein the first waveform is based at least in part on the combining.

25. The apparatus of claim 24, wherein the instructions are further executable by the processor to cause the apparatus to:
include a waveform component corresponding to a resource in a guard band in one waveform component of the identified plurality of waveform components for an uplink transmission based at least in part on a first subband adjacent the guard band and a second subband adjacent the guard band being included in the one waveform component.

26. The apparatus of claim 24, wherein the instructions are further executable by the processor to cause the apparatus to:
include a waveform component corresponding to a resource in a guard band in one waveform component of the identified plurality of waveform components for a downlink transmission based at least in part on a first subband adjacent the guard band and a second subband adjacent the guard band being included in the one waveform component.

27. The apparatus of claim 18, wherein:
the plurality of waveform components comprise a first waveform component, the first waveform component comprises two contiguous subbands of the plurality of subbands and a guard band between the two contiguous subbands.

28. The apparatus of claim 27, wherein the instructions are further executable by the processor to cause the apparatus to:
determine that the two contiguous subbands are associated with a successful result of the performed listen before talk procedure, wherein the selected one or more waveform components comprises the first waveform component based at least in part on the determining.

29. An apparatus for wireless communication at a wireless device, comprising:
means for identifying, for a transmission by the wireless device, a plurality of subbands of a radio frequency spectrum band;
means for identifying, prior to determining a result of a listen before talk procedure performed for the identified plurality of subbands, a plurality of waveform components for the transmission based at least in part on a waveform generation capability of the wireless device and the identified plurality of subbands;
means for performing the listen before talk procedure for the plurality of subbands;
means for selecting, based at least in part on the result of the performed listen before talk procedure, one or more waveform components of the identified plurality of waveform components; and
means for transmitting a first waveform comprising the selected one or more waveform components during a first transmission time interval.

30. A non-transitory computer-readable medium storing code for wireless communication at a wireless device, the code comprising instructions executable by a processor to:
identify, for a transmission by the wireless device, a plurality of subbands of a radio frequency spectrum band;
identify, prior to determining a result of a listen before talk procedure performed for the identified plurality of subbands, a plurality of waveform components for the transmission based at least in part on a waveform generation capability of the wireless device and the identified plurality of subbands;
perform the listen before talk procedure for the plurality of subbands;
select, based at least in part on the result of the performed listen before talk procedure, one or more waveform components of the identified plurality of waveform components; and
transmit a first waveform comprising the selected one or more waveform components during a first transmission time interval.

* * * * *